US005495581A

United States Patent [19]
Tsai

[11] Patent Number: 5,495,581

[45] Date of Patent: Feb. 27, 1996

[54] METHOD AND APPARATUS FOR LINKING A DOCUMENT WITH ASSOCIATED REFERENCE INFORMATION USING PATTERN MATCHING

[76] Inventor: Irving Tsai, 435 E. 70th St., New York, N.Y. 10021

[21] Appl. No.: 137,718

[22] Filed: Oct. 15, 1993

Related U.S. Application Data

[63] Continuation-in-part of Ser. No. 124,381, Sep. 17, 1993, which is a continuation of Ser. No. 918,150, Jul. 24, 1992, abandoned.

[51] Int. Cl.[6] .............................. H04N 1/00; G06F 17/00

[52] U.S. Cl. .......................... 395/154; 358/400; 379/100; 364/419.19

[58] Field of Search ............................ 235/375; 424/311, 424/312, 313; 395/153, 154, 159, 161, 145, 2.79, 2.87, 2.85; 364/419.19; 379/100; 358/400; 382/10

[56] References Cited

U.S. PATENT DOCUMENTS

| | | | |
|---|---|---|---|
| 3,396,478 | 8/1968 | Genin | 434/312 |
| 3,397,467 | 8/1968 | Genin et al. | 434/312 |
| 3,540,133 | 11/1970 | Davidge et al. | 434/312 |
| 3,696,525 | 10/1972 | Cleary | 434/311 |
| 4,270,853 | 6/1981 | Hatada et al. | 354/76 |
| 4,760,606 | 7/1988 | Losnick et al. | 382/48 |
| 4,954,969 | 9/1990 | Tsumura | 395/160 |
| 5,084,769 | 1/1992 | Miura | 358/403 |
| 5,109,439 | 4/1992 | Froessl | 382/61 |
| 5,127,003 | 6/1992 | Doll, Jr. et al. | 370/110.1 |
| 5,202,828 | 4/1993 | Vertelney et al. | 364/419 |
| 5,241,671 | 8/1993 | Reed et al. | 395/600 |
| 5,243,149 | 9/1993 | Comerford et al. | 178/18 |

FOREIGN PATENT DOCUMENTS

| | | |
|---|---|---|
| 147369 | 9/1982 | Japan . |
| 260970 | 10/1989 | Japan . |
| 182153 | 8/1991 | Japan . |
| 2253 | 1/1992 | Japan . |
| 117755 | 4/1992 | Japan . |

OTHER PUBLICATIONS

Patent Abstracts of Japan, vol. 16, No. 367, E1245, Abstract No. 04–117755, Morita, Apr. 17, 1992.

Patent Abstracts of Japan, vol. 15, No. 434, E1129, Abstract No. 03–182153, Fujiwara, Aug. 8, 1991.

IEEE Cat. No. CH2228–5/85/0000/0158, 1985, Ruiz, "Voice and Telephony Applications for the Office Workstation", pp. 158–163.

Voice I/O Systems Applications Conference, Sep. 16–18, 1986, Proceedings AVOS '86, Ades, "Voice Annotation and Editing in a Workstation Environment", pp. 13–28.

(List continued on next page.)

*Primary Examiner*—David M. Huntley
*Attorney, Agent, or Firm*—Weil, Gotshal & Manges

[57] ABSTRACT

The present invention comprises an apparatus for linking a document with reference information associated therewith comprising a device for receiving an electronic representation of a document image, the document having a portion to be linked to electronic reference information, wherein the portion is designated by a predetermined attribute of the received document image; a device for electronically scanning the electronic representation of the document image to locate said predetermined attribute of the document image; a device for identifying the linked portion of the document based on the location of the predetermined attribute; a device for acquiring the electronic reference information associated with the linked portion; a device for correlating the linked portion of the document with the associated electronic reference information; and a device for providing a pointer from the linked portion in the document to each piece of electronic reference information associated therewith.

In one embodiment of the invention, the received document image may be transmitted using standard facsimile protocols and the electronic reference information may be acquired as audio information transmitted using standard voice channel telephony.

20 Claims, 51 Drawing Sheets

OTHER PUBLICATIONS

ACM Transactions on Office Information Systems, Oct. 1986, vol. 4, No. 4, Christodoulakis et al., "Multimedia Document Presentation, Information Extraction, and Document Formation in MINOS: A Model and a System", pp. 345–383.

Patent Abstracts of Japan, vol. 10, No. 111, p. 451, Abstract No. 60–242567, Mikawa, Dec. 2, 1985.

Patent Abstracts of Japan, vol. 13, No. 37, p. 819, Abstract No. 63–234447, Sawa, Sep. 29, 1988.

FIG. 12
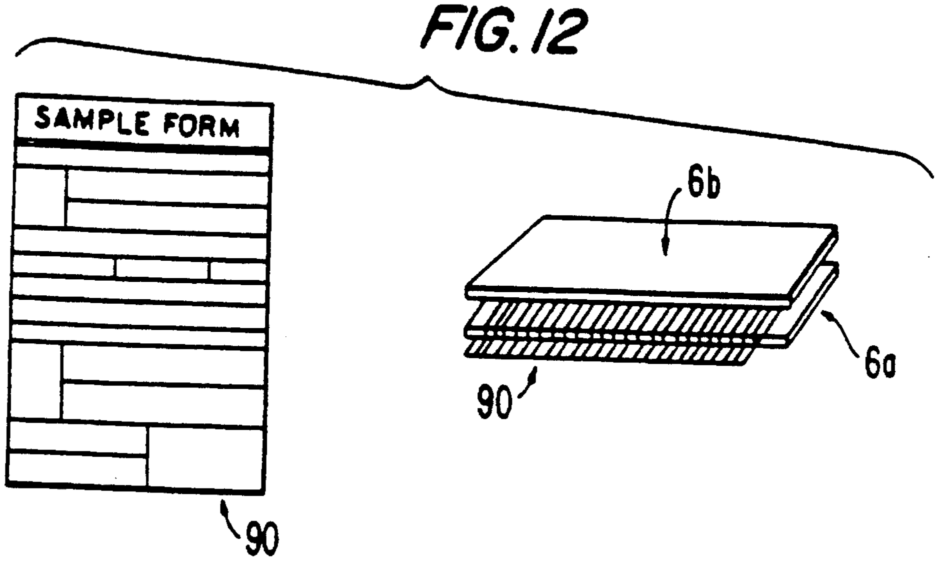
FIG. 13
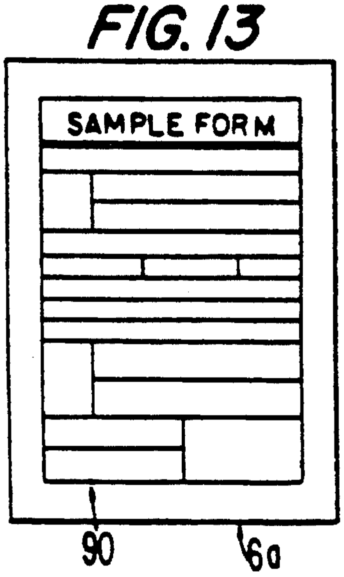
FIG. 14
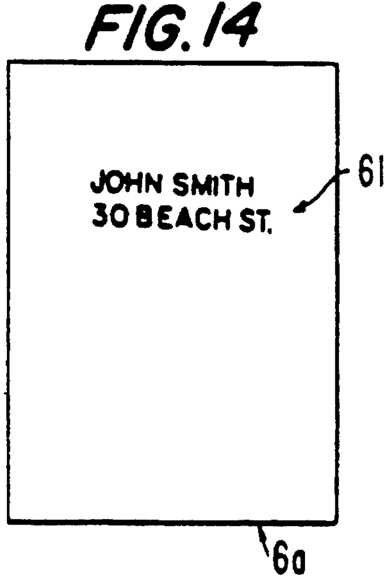
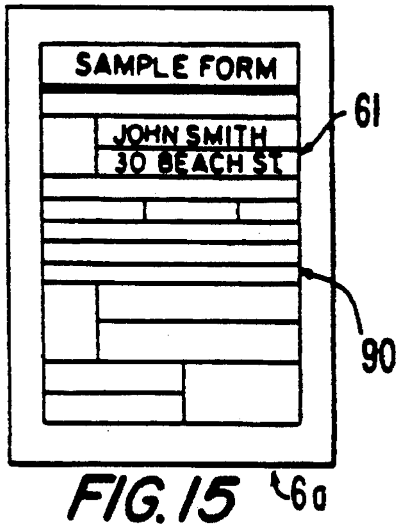
FIG. 15
FIG. 16
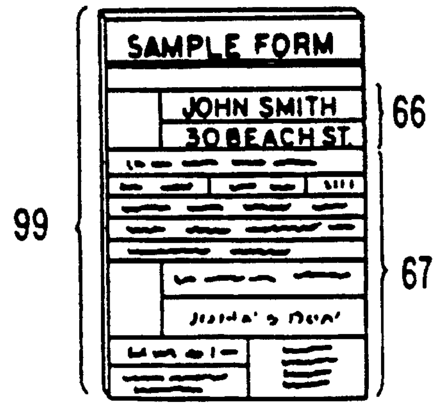

| NAR(p) | NAR(a) | NAR(b1,b2) | NAR(c) ... | NAR(n1,..,nm) |
|---|---|---|---|---|
| Location(p,1) | Location(a,1) | Location(b,1) | Location(c,1) | Location(n,1) |
| | | Location(b,2) | | |
| | | | | ⋮<br>Location(n,m) |

METHOD AND APPARATUS FOR LINKING A DOCUMENT WITH ASSOCIATED REFERENCE INFORMATION USING PATTERN MATCHING

This application is a continuation-in-part of Ser. No. 08/124,381, filed Sep. 17, 1993, which is a continuation of Ser. No. 07/918,150, filed Jul. 24, 1992, abandoned.

BACKGROUND OF THE INVENTION

1. Field of the Invention

The present invention relates to a method and apparatus for linking a document with associated reference information. More specifically, the present invention relates to a method and apparatus for receiving document images and linking the received image with electronic reference information, wherein the image is communicated using standard, existing equipment that otherwise would not have this capability. For example, a standard fax machine may be used to convey a document having a portion electronically linked to electronic audio information. The present application is a continuation-in-part of U.S. patent application Ser. No. 08/124,381, filed Sep. 17, 1993, which is a continuation of U.S. Ser. No. 07/918,150, filed Jul. 24, 1992, now abandoned, which is a continuation of U.S. Ser. No. 07/840,808, filed Feb. 25, 1992, now abandoned.

SUMMARY OF THE INVENTION

The present invention solves this and other problems associated with prior art linked documents. The present invention comprises an apparatus for linking a document with reference information associated therewith comprising means for receiving an electronic representation of a document image, said document having a portion to be linked to electronic reference information, wherein said portion is designated by a predetermined attribute of the received document image; means for electronically scanning the electronic representation of the document image to locate said predetermined attribute of the document image; means for identifying the linked portion of the document based on the location of said predetermined attribute; means for acquiring the electronic reference information associated with the linked portion; means for correlating the linked portion of the document with the associated electronic reference information; and means for providing a pointer from the linked portion in the document to each piece of electronic reference information associated therewith.

In one embodiment of the invention, the received document image may be transmitted using standard facsimile protocols and the electronic reference information may be acquired as audio information transmitted using standard voice channel telephony.

BRIEF DESCRIPTION OF THE DRAWINGS:

A detailed description of preferred embodiments of the invention will be made with reference to the accompanying drawings, wherein like numerals designate corresponding parts in the several figures.

FIG. 12 illustrates an embodiment specially adapted for "forms handling"—that is, the computer assisted completion of forms, wherein a form (or application) is being inserted between an image forming element and a reflective back-layer.

FIG. 13 is a view of a "blank form" as seen through the image forming member.

FIG. 14 illustrates an image forming member bearing information pertinent to completion of the "blank form" generated on it.

FIG. 15 depicts the information appearing in FIG. 14 superimposed on the "blank form".

FIG. 16 shows a "completed form" that was created by the apparatus of an embodiment of the present invention.

FIGS. 1–32 illustrate an embodiment of a portable computer constructed specifically to permit data to be "printed" by using a display screen with a copier.

FIG. 43*a* shows examples of systems the apparatus may communicate with.

DESCRIPTION OF THE PREFERRED EMBODIMENT

The following detailed description is of the best presently contemplated mode of carrying out the invention. This description is not to be taken in a limiting sense, but is made merely for the purpose of illustrating the general principles of the invention. The scope of the invention is best defined by the appended claims.

The general form of the invention comprises a device capable of generating an image derived from an electrical representation of an image. The device possessing the capacity to be mounted or otherwise placed in such relationship relative to a copier that said copier can reproduce the image onto a substrate such as paper.

The electrical signals defining the image may originate from a computer, magnetic storage device, optical storage device, or from any kind of source or electronic apparatus capable of generating, manipulating, storing, or conveying electrical signals representing displayable information. The internal components and the manner of operation of these devices are well known in the art and, in the interest of simplifying the present disclosure, will not be discussed in the present disclosure.

Embodiments of the invention, in a sense, can be likened to "electronic paper" since it is usually a sheet of paper, bearing an image on it, that is placed on a copier for the purpose of being duplicated. Embodiments of the present invention, however, permit images to be easily altered or manipulated as they are of electrical origin. The function of the copier is to transform the "electronic paper" image into one on "real paper", or one on other suitable substrates As those skilled in the art of electronic information display are aware, there are numerous means by which an image, emanating from an electrical signal representative of that image, may be fashioned. Numerous strategies embraced by that technological family may be applicable to the reduction to practice of the present invention. Examples of potential image forming systems are: liquid crystal devices, gas plasma devices, fluorescent displays, cathode ray tubes, electrophoretic displays, and filed emission displays. The particular image forming technology used to implement the invention will influence the additional components needed to enable the image forming element to function as intended; impact the resolution, contrast, and quality of the printed output; and affect the overall configuration of the apparatus. For instance, electrophoretic displays would not require back-lighting. The aforementioned considerations are appreciable to those skilled in the art.

Figure 1:
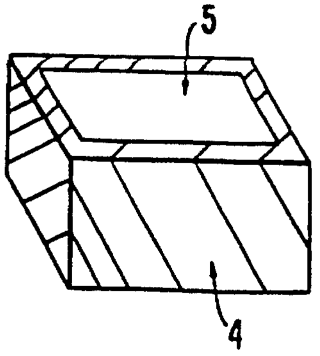
FIG. 1 illustrates a known copying apparatus in schematic form.
Figure 2:
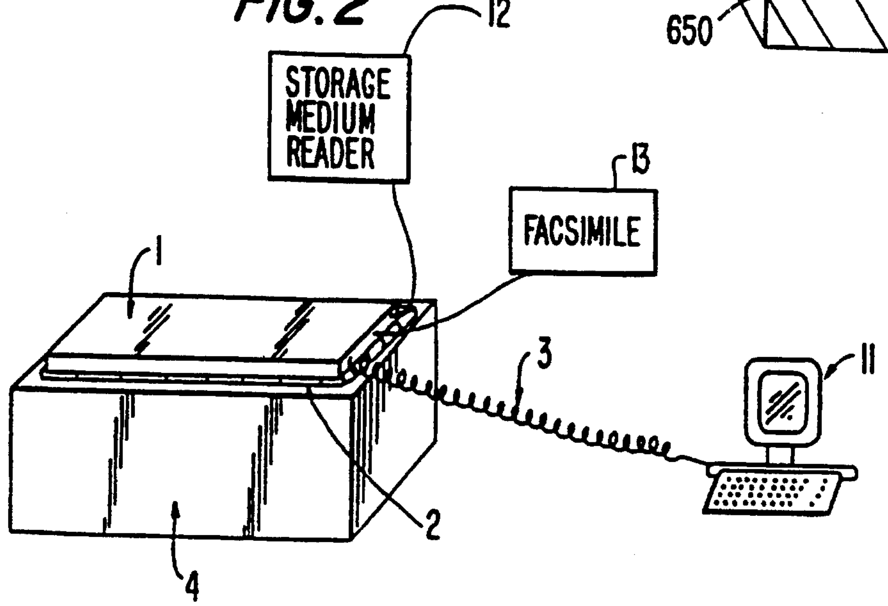
FIG. 2 depicts a preferred embodiment of the present invention mounted on top of the window of the copying apparatus illustrated in FIG. 1.

Depicted in FIG. 1 is a representation of a known copying apparatus, such as a copier. The known copying apparatus includes a body 4 and a copier window 5. In one embodiment, the invention is in the form of an image-forming tablet. As shown in FIG. 2, the image-forming tablet 1 may be placed on top of a conventional copier like an ordinary document, with the copier window 5, shown in FIG. 1, immediately beneath the tablet 1. An electrical cable 3 may be used to convey the signal representative of the image to the tablet 1 from a signal source 11. As described above, the signal source 11 may include a variety of devices, such as a computer, a magnetic storage device, an optical storage device, etc.. A light shield 2 may serve to reduce the leakage of ambient light through the copier window 5, and may be constructed of any suitable, compliant material.

Figure 3:
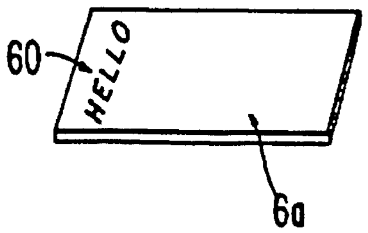
FIG. 3 illustrates a preferred embodiment of the image-forming components of the present invention.

An image forming element of the liquid crystal variety is pictured in FIG. 3. The liquid crystal image forming element includes a liquid crystal image forming layer 6*a*, capable of forming an image 60 (in this particular example, a set of alphabetical characters assembled into the word "Hello").

Figure 4:
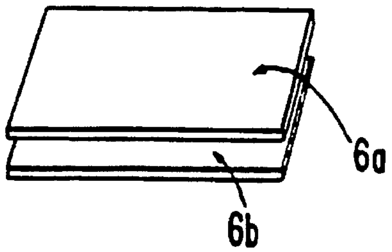
FIG. 4 illustrates a reflective layer that is disposed adjacent to or near the image-forming element of FIG. 3.

FIG. 4 illustrates a reflective back-layer 6*b* which may be provided adjacent to the liquid crystal image forming layer 6*a*. For purposes of clarity, the liquid crystal image forming layer 6*a* and the reflective back-layer 6*b* are depicted as being spatially separated by a significant distance in FIG. 4. However, in most embodiments of the invention these layers would be relatively closely disposed to each other.

The reflective back-layer 6b may be applied directly to the back surface of the liquid crystal image forming layer 6a in the form of a coating. A primary function of the reflective back-layer 6b is to provide an albedo in the non-imaged areas of the liquid crystal layer 6a that is optically distinct from the imaged areas of the liquid crystal layer. Non-imaged areas of the liquid crystal layer 6a are substantially optically transparent to radiation of wavelengths within the domain of concern. It is also possible to substitute for the reflective back-layer 6b an active, light emitting source, such as an electroluminescent panel. Back-lighting, however, increases the power consumption level.

Figure 5:
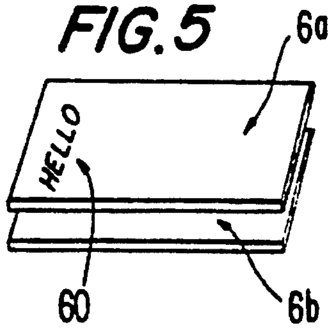
FIG. 5 illustrates the structures shown in FIG. 4 with an image present on the image-forming member (in this particular example, a set of alphabetical characters assembled into the word "Hello").

FIG. 5 depicts the elements of FIG. 4 with the inclusion of an alphabetic character string formed on the liquid crystal layer 6a.

Figure 6:
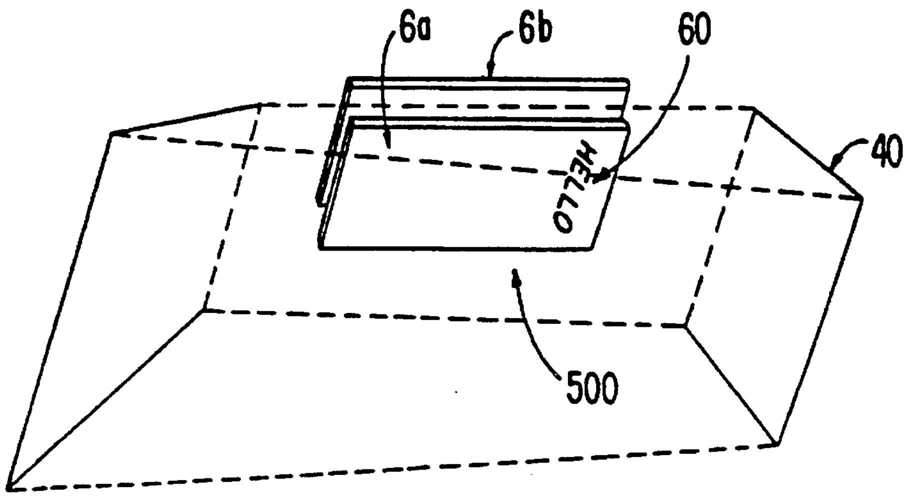
FIG. 6 is a perspective view from below the copier window of the structure in FIG. 5, when the illustrated embodiment of the present invention is mounted on the copy board of a copier.

FIG. 6 shows a schematic view from beneath the copier window 500 of an ordinary copying apparatus 40. The structures illustrated in FIG. 5 are shown positioned on top of the copier window 500, in the manner that they would be during the process of duplicating the image 60 formed by the image forming layer 6a.

Figure 7:
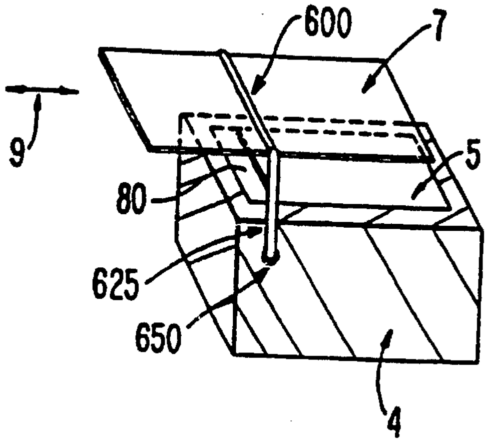
FIG. 7 illustrates an embodiment of the invention that can be used with copiers possessing moving copy-boards, which are common to many low cost "personal" copiers.

The tablet shaped embodiment of the invention described above is fully capable of being used with low cost "personal" copiers possessing moving copy boards. An embodiment of the invention specially adapted for use with such copiers is illustrated in FIG. 7. As depicted in FIG. 7, the imaging element along with its supporting members is in the form of a strip 600. The strip 600 may be held in place by a structural support 625, which in turn may be mounted to the body of the copier 4 by a fastener 650. Beneath the copier window 5 can be seen that part of the copier 80 which is sensing the pattern formed by the strip 600 for reproduction onto a substrate. Interposed between the image forming element 600 and the copier window 5 is a transparent copy board 7 which is the part of the copying apparatus that undergoes translational motion, and is the member upon which any document to be copied is ordinarily placed.

FIG. 7 is intended to demonstrate one configuration of the present invention that may be used in conjunction with low cost "personal" copiers possessing moving copy boards. It will be recognized by those skilled in the art that numerous alternative configurations are possible for such use.

Figure 8:
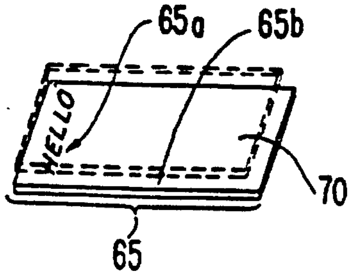
FIG. 8 illustrates an alternate embodiment to that depicted in FIG. 5 in which the image-forming element is of the emissive variety.

FIG. 8 illustrates an embodiment of the invention in which the image forming element is of the emissive variety; that is, of the type which emits radiation, e.g., light. Such an image forming element may, for example, employ a fluorescent display, a gas plasma display, etc. The image forming element 65, during the course of operation, may include one or more portions 65a that are not emitting light and one or more portions 65b that are emitting light. It is the sum of the non-light emitting areas 65b that collectively comprises the image to be printed.

In FIG. 8 the non-emitting areas 65a are seen to compose the character string "HELLO" against the background of emitting areas 65b. The photoconductor of a copier will be discharged by the light emitting portions 65b, to leave behind on the photoconductor a latent image charge pattern substantially identical to that defined by regions 65a. Also shown in FIG. 8 is an anti-reflective layer 70. The function of this anti-reflective layer is to reduce the amount of light emanating from the copier's internal light source that is back-reflected off of the surface of the image forming member of the apparatus of the present invention. In practice the anti-reflective layer is more likely to be present as a surface coating on the image forming member. An anti-reflective layer may be included in other embodiments, such as those employing liquid crystal components.

Figure 9:
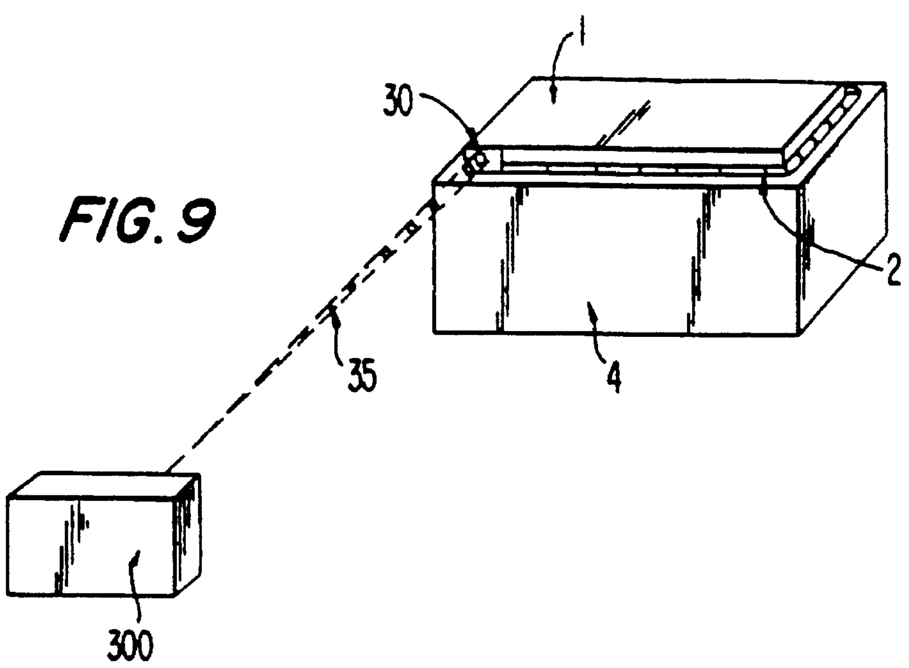
FIG. 9 illustrates an embodiment of the invention in which the signal representative of the image to be printed is transmitted to the image-forming member by an "intangible mechanism" such as an infra-red beam, rf-signal, etc. (in contrast to a cable or electrical wire).

FIG. 9 is a diagrammatic representation of an arrangement where the electrical signals defining the image to be printed are transmitted by an infrared beam, rf-carrier, or other "intangible medium" from a source 300 to the apparatus of the present invention 1. The point of reception of the information-bearing signal is shown as 30. The "intangible medium" that substitutes for the electrical cable or connector is indicated by 35. The copying apparatus is designated as 4; and the webbing which shields ambient light from leaking through the tablet/copier interface is identified as 2.

Figure 11:
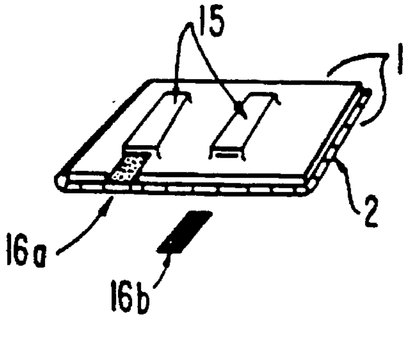
FIG. 11 illustrates an installation of two different and optional Device Emulation Modules, which impart to the apparatus additional capabilities such as facsimile machine emulation.
Figure 17E:
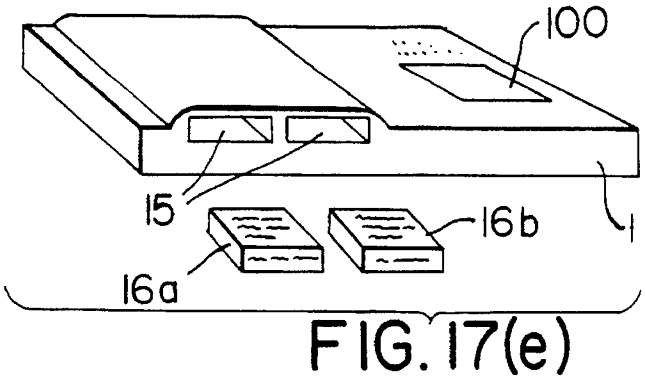
FIG. 17*e* shows a copier-print apparatus with receiving means 15 for receiving user-installable option modules 16*a* and 16*b*, which are used to extend the functional capabilities of the apparatus.
Figure 17D:
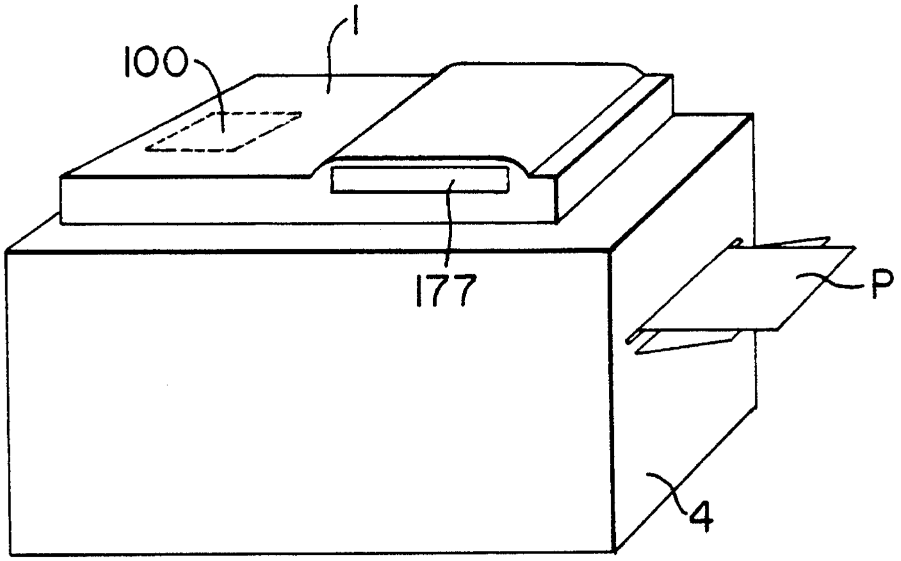
FIG. 17*d* shows a copier-print apparatus 1 on top of a photocopier. The apparatus 1 has a display console 100, and a receiving means 177 for receiving the modules shown in FIGS. 17*a–c*.
Figure 17A:
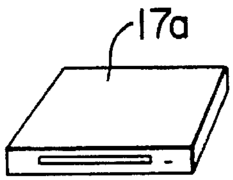
FIG. 17*a* shows a module insertable into the apparatus 1 for reading a data storage medium comprising a first format.
Figure 17B:
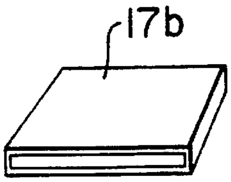
FIG. 17*b* shows a module insertable into the apparatus 1 for reading a data storage medium comprising a second format.
Figure 17C:
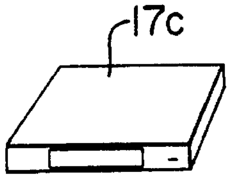
FIG. 17*c* shows a module insertable into the apparatus 1 for reading a data storage medium comprising a third format.

FIG. 11 illustrates the installation of two Device Emulation Modules into "Module Bays", 15 In FIG. 11, a first module, 16a, is designed to perform a first function, and a second module, 16b, designed to perform a second, different function. An example of a function which a module 16a or 16b may perform is that of facsimile machine emulation, as described in further detail below. Whereas two Modules are shown in FIG. 11, the apparatus of the present invention is not restricted to this number. Also, while some embodiments contain data storage devices such as disk drives, these are not represented in FIG. 11.

Some embodiments incorporate into the apparatus the means to read directly from data storage media such as magnetic diskettes, magnetic tapes, or optical discs. This facility permits text or graphical information to be directly loaded into the apparatus and obviates the need for connection to another device such as a computer. As some embodiments of the invention may be powered by batteries, certain versions, especially when coupled with the capability to read directly from data storage media are highly self-contained and portable: requiring for operation only a conventional copier and a diskette (for instance) containing material to be printed.

An embodiment specially adapted for "forms printing" includes a modification to the spacing between image forming element 6a and reflective back-layer 6b (which were discussed earlier in connection with FIGS. 4 through 6).

As illustrated in FIG. 12, a blank form 90 is inserted between members 6a and 6b, with the front of the blank form facing 6a. The actual spacing between members 6a and 6b may be changeable so as to accommodate forms of different thicknesses; and means may be provided to adjust the spacing to suit the inserted form. Additional means may be provided to alter the relative positions of layers 6a and 6b to facilitate insertion and removal of blank forms, as well as to insure their proper alignment within the tablet.

FIG. 13 demonstrates how blank form 90 would appear viewed through image forming member 6a, which is the copier's perspective during the reproduction process. FIG. 14 depicts the image forming member, 6a, with alphanumeric information, 61, generated on it. In the illustrated example, the information comprises two data fields that are pertinent to completion of blank form 90: a name, and a street address. The information may be derived from a software package such as a data base manager, a spreadsheet, or a word processor. FIG. 15 portrays the visual overlay that results when blank form 90 is situated behind image forming member 6a, and displayable information is present on member 6a.

Exhibited in FIG. 16 is the printed output of a copier that has been used in combination with the tablet of an embodiment of the present invention operating in "forms printing" mode. It can be seen that the original blank form, 90, has been duplicated and that the data discussed in connection with FIGS. 14 and 15 have been imprinted on the replica; they are indicated by 66. Other information, 67, relevant to the completion of blank form 90 has, in a similar manner, likewise been imprinted. The "filled out form" output by the copier is labeled 99.

In addition to serving as a portable conversion device that enables a conventional copier to function as an electronic printer, high speed printing matching and even exceeding the capability of dedicated electronic printers can be achieved by using the present invention in concert with high performance copying equipment. Further, other benefits provided by such equipment including large volume printing, and elaborate paper handling facilities like collation and stapling can be conveniently tapped.

Not only do embodiments of the present invention permit an ordinary copier to be utilized as a computer printer, but it also enables the conventional copier to function as a "receiving end" facsimile printer. In one embodiment a facsimile module can be plugged into the tablet to enable fax data transmitted over standard telephone lines to be intercepted, interpreted, and converted into displayable form. Once present on the image forming member, the graphical data can be reproduced by a copier. Further, it should be noted that the facsimile information can be directly viewed off of the image forming member, and thus need not be printed unless desired. In this manner the present invention provides for both "optical fax" and conventional "hard copy fax", and permits the user to inspect a transmitted document in entirety before deciding whether all or only portions are to be printed. Variations on this theme include embodiments possessing document scanning capabilities, so that data transmission is possible, in addition to data reception. Other embodiments are equipped with storage means so that incoming data can be saved, then printed in a time-shifted fashion at another moment.

Figure 10:
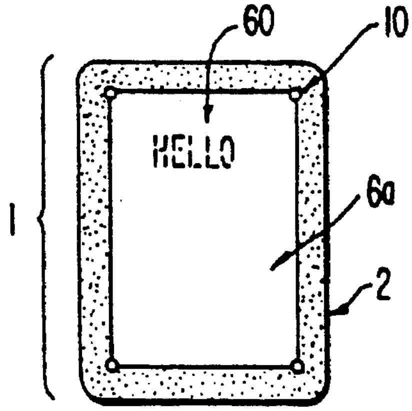
FIG. 10 illustrates one possible arrangement of photodetectors on an image forming tablet.

Embodiments of the invention may possess means to detect when a copier has completed its scan cycle; that is, when an image to be duplicated has been successfully captured by the copier. An example of a detection means is a photosensor 10 shown in FIG. 10. Shortly after the photosensor 10 detects the flash from the copier's source of illumination, the next image, or page, is formed on the image forming member. With the next image present, the succeeding copy cycle prints the next page of information. Multiple copies of each page are handled by counting the number of flashes emanating from the copier; when the count reaches the number of copies desired for that page, the next page is formed on the image forming member. The copier must be set to the total number of pages that are to be printed.

In practice it is convenient to employ four photodetectors positioned approximately at the corners of the image forming tablet. After all four photodetectors register exposure to the copier's source of illumination, "page flipping" on the image forming member takes place. "Page flipping" does not take place if all of the photodetectors do not register an exposure, since such a situation may be the result of an error condition: for example, the page on the image forming member may not have been completely scanned by the copier. As would be clear to individuals skilled in the art of circuit design, the above-described operation is easily accomplished by simple logic circuitry; which is preferably incorporated .into the tablet of the present invention. The method described for controlling "page flipping" applies to copiers with scanning light sources and copiers with flash type light sources with equal facility. Manual "page flipping" is also possible, but requires the sustained presence of an operator. Furthermore, it will be recognized that other types of detection means for detecting when a copying operation is being, or has been, performed may be employed (e.g., thermal sensors, current or voltage sensors, etc.).

While the placement of an image forming element of one of the kinds described herein within an otherwise typical, dedicated copying tablet is possible, it has not been the objective here to propose device modifications. In contrast, the goal of the present invention is to make use of existing conventional, dedicated copying equipment to print images created or stored in an electronic format that heretofore has necessitated the use of an tablet such as a "computer printer".

Examples of Option Modules, which provide device emulation means, are discussed in greater detail below in connection with FIGS. 17 through 32. The following discussion is divided into two parts. First, examples of some general features and operational characteristics of a tablet featuring option modules are presented. Second, a treatment of some of the technical considerations involved for reducing this aspect of the invention to practice is provided.

I. EXAMPLES OF SOME OPTION MODULE CHARACTERISTICS

It is recognized that different computer platforms have different strengths. Individuals skilled in the use of more than one type of machine may feel inclined to migrate from one piece of equipment to another in an effort to maximally utilize available resources. This is especially true at universities and in research settings. One of the problems encountered by people who employ a multiplicity of platforms in their work is the need to return to each of the platforms used in order to produce hard copy. This may mean returning to a number of different and geographically segregated sites. Another problem is that the software originally used to create each portion of the whole work must still be present (or available) on each of the platforms used. When hardware is shared among many users, it is not uncommon for software to be erased by people seeking to free-up disk space. This means having to re-install applications software—a potentially time consuming process.

One of the primary objectives of the present invention is to provide hard copy of electronic format information arising from diverse origins. Another objective is to provide hard copy of electronic format information arising from diverse origins in a manner that is flexible and accessible, even to people with nontechnical backgrounds. Yet another objective of the present invention is to accomplish the above goals in a fashion that is economical and user-customizable. These and other objectives are facilitated by Option Modules.

Prior to the advent of the present invention, in order to obtain hard copy of information generated by a particular type of equipment, one needed to return to, and to employ, that specific type of equipment. For instance, a diagram drawn on an Apple Macintosh computer would typically necessitate the use of an Apple Macintosh computer in order for a printout to be produced. A document written on a Smith Corona dedicated word processor would require the application of such a unit for print out to be obtained. A photograph taken by a still video camera would customarily make use of a video-floppy disk printer to make the journey from electrical signals to ink on paper. Because the inventory of equipment that generates electronic format data is enormous, and continuing to grow, the complexity of producing hard copy is also increasing.

The present invention employs an ordinary copier as a source of a print engine. It then builds on this with the support of Option Modules which, by providing device emulation means, transforms an ordinary copier into a universal print engine. Furthermore, because the user interface has been tailored to people having non-technical backgrounds, information generated on a variety of computer platforms and devices is made accessible even to those who do not know how to operate the equipment that originally created the information.

Because a modular approach is employed, users can customize a tablet in accordance with the present invention to suit their particular printing needs. For example, one who only uses an Apple Macintosh computer can install a Macintosh-only option module for printing out Mac files saved on floppy diskettes. Similarly, for those whose computing needs are met exclusively by IBM/DOS machines, only an IBM/DOS option module need be used. University libraries, on the other end of the spectrum, are likely to have installed more costly multi-platform adapters so that files originating from a range of sources, such as IBM PC's, Macintoshes, Commodore Amiga's, Next Stations, Smith Corona word processors, etc. can all be printed using a library copier. Not only is the modular approach of the present invention functionally adaptable, but it is also economically flexible. Because different copiers can be used in conjunction with a single tablet, the overall system performance can be customized by the user. For example, a tablet might be used with a low cost "personal copier" for ordinary print jobs. The same tablet might later be used with a high speed collating copier to print archival data from a CD-ROM. And still later, that same tablet might be employed, for example, with a "blue print" machine to print an architectural blue print. Thus, the overall system can be tuned to meet specific printing needs by varying the choice of option module and print engine—the latter being conveniently and economically furnished by an ordinary copier.

FIGS. 17(*d*) and (*e*) illustrate an example of a tablet 1 equipped with device emulation module receiving means 15, into which option modules 16*a* and 16*b* may be inserted. Additional receiving means 177 may also be supplied in some embodiments to allow data storage device modules such as 17*a*, 17*b*, or 17*c* to be installed. In FIGS. 17(*a*)–(*c*), the illustrated data storage device module 17*a* comprises a 3.5" floppy diskette drive; the illustrated data storage device module 17*b* comprises an optical storage unit such as a CD-ROM drive; and the illustrated data storage device module 17*c* comprises a tape drive.

The illustrated device emulation controller module 16*a* contains a storage device controller (e.g. an Apple Macintosh 3.5" diskette drive controller, an IBM 5.25" diskette drive controller, a Next machine 3.5" drive controller, etc.) to control the data storage device module 17. Depending on the data storage device module 17 installed in the tablet 1, different storage device controllers may be used. The device emulation controller module 16a may also comprise a "multi-media" storage device controller, capable of controlling a range of storage device types, and thus of providing access to a plurality of data storage formats. If this is the case, then a single device emulation controller module 16*a* would be capable of controlling a plurality of data storage device modules 17. The device emulation controller module 16*a* will incorporate circuitry similar to that which may be currently found in diskette drive adapters, tape drive adapters, CD-ROM adapters, etc.

Also illustrated in FIG. 17(*e*) is a second device emulation module 16*b* which provides the means to translate data from one format into another. The source data format would typically be the "native format" of an applications software package, such as WordPerfect, Lotus 1–2–3, Paradox, etc.. As used herein, the term "native format" means the default data storage format of the applications program that created the data. For instance, , "Publisher's Paintbrush", a popular paint program for IBM-compatible platforms, has "PCX" as a native storage format.

The applications file interpreter module 16*b* operates in concert with the storage device controller present in the device emulation controller module 16*a* and the data storage device module 17. The applications file interpreter module 16*b* enables the tablet 1 to access and then to translate (or interpret) information stored in different native formats on various data storage media into a form that may be displayed on the image display screen of the tablet 1. Once in screen displayable form, such information may be printed, as on plain paper hard copy output P by the copier 4, as illustrated in FIG. 17(*d*).

Additionally shown in FIGS. 17(*d*) and (*e*) is an example of an operator's console 100, which provides a graphical user interface for the apparatus and may be found on the back of the tablet 1. The operator's console 100 may include an ATM-style touch-sensitive operator's console screen, so that intuitive or "natural" operation of the tablet 1 may be facilitated.

Figure 18A:
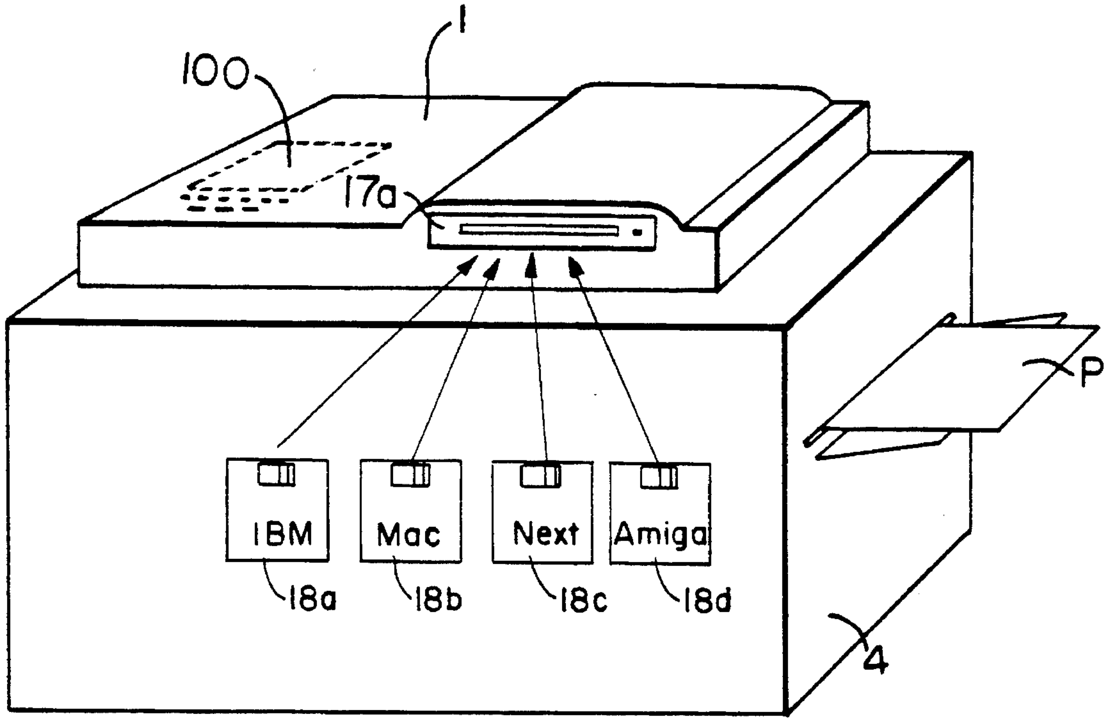
FIG. 18*a* shows a copier-print apparatus capable of using data from a variety of different, and mutually incompatible computer platforms.
Figure 18B:
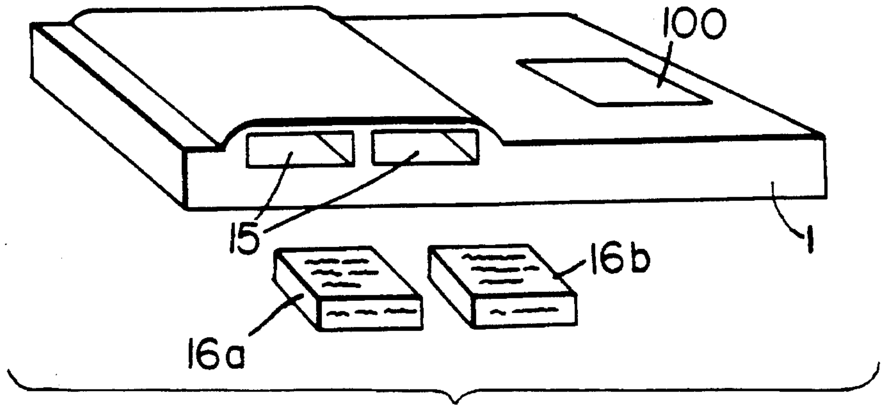
FIG. 18*b* shows the insertion of two modules into the copier-print apparatus.
Figure 19A:
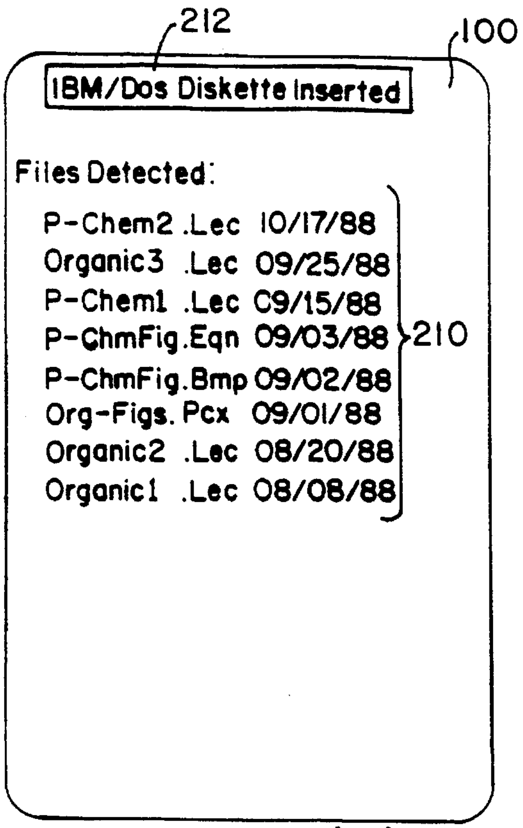
FIGS. 19(*a*)–19(*g*) illustrate an example of a process that might be involved in creating a hard copy of a disk file using a tablet in accordance with the present invention.
Figure 19B:
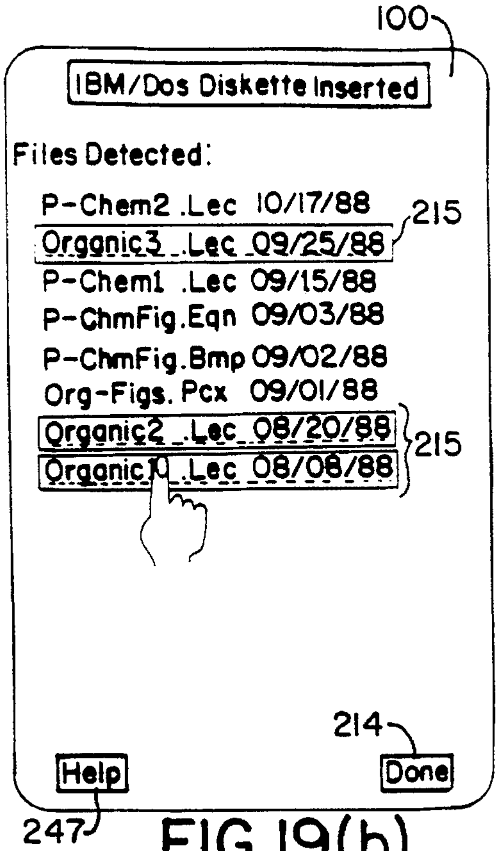
Figure 19C:
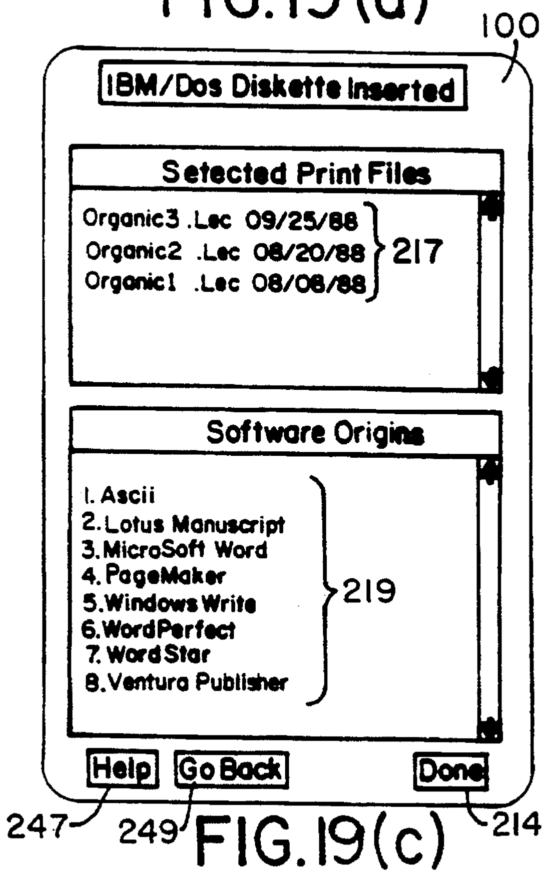
Figure 19D:
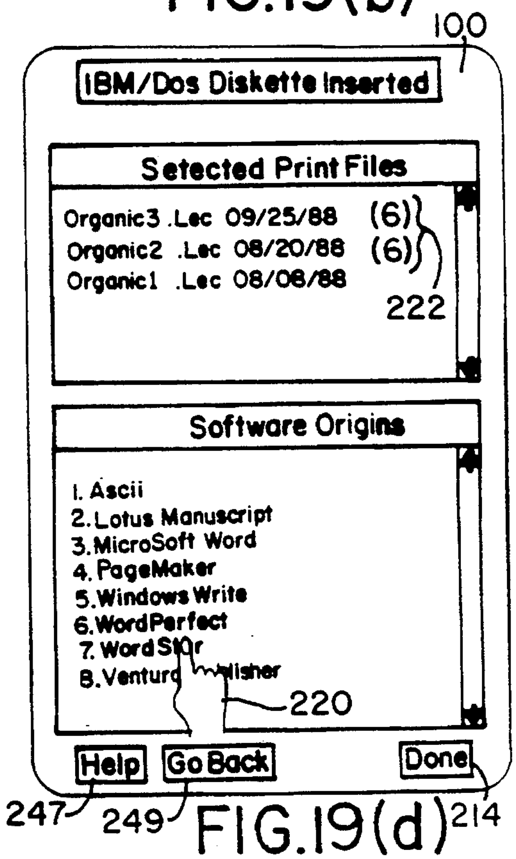
Figure 19E:
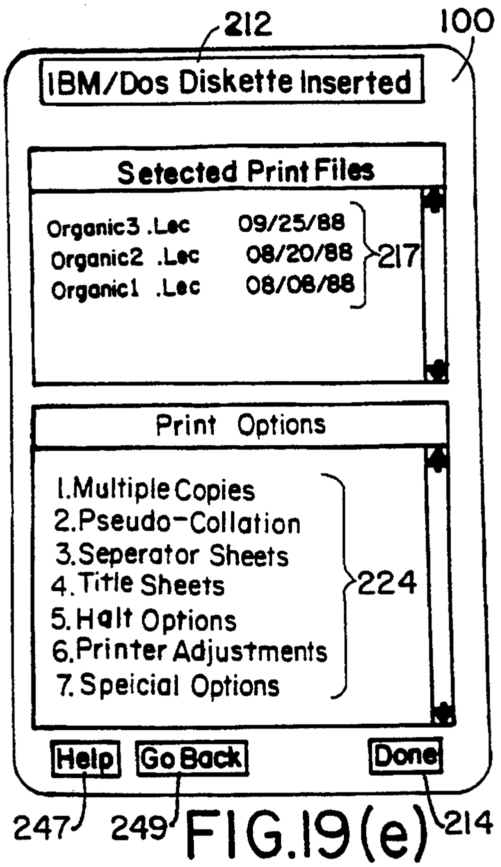
Figure 19F:
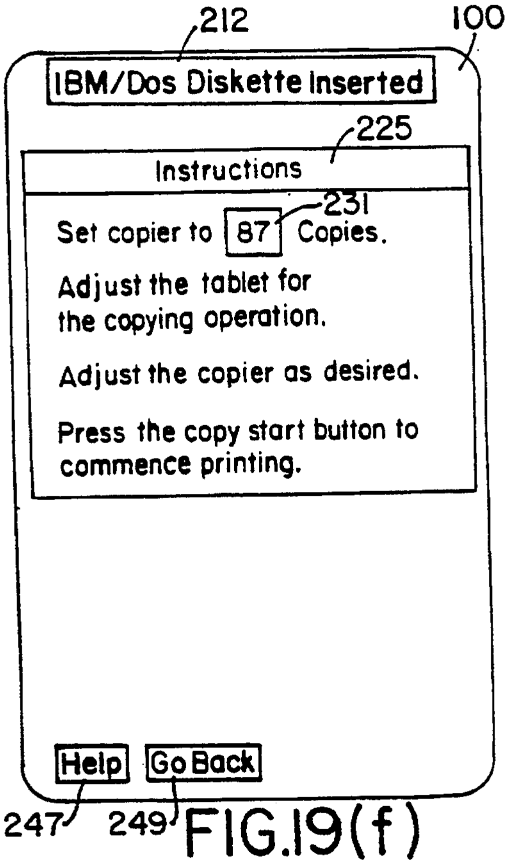
Figure 19G:
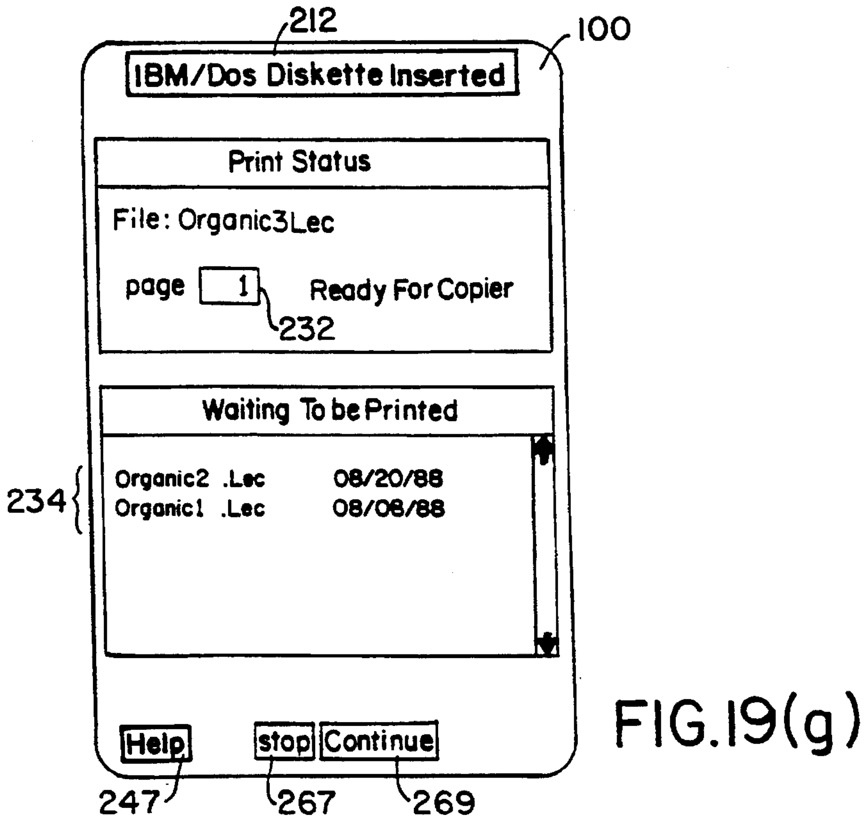

FIG. 18(*a*) illustrates four 3.5" floppy diskettes 18*a*–18*d*, generated by four different computer platforms, that may be inserted into the data storage device module 17*a* of the tablet 1. The illustrated 3.5" floppy diskettes 18*a*–18*d* contain data saved in a variety of different and mutually incompatible formats. For example, the data on the diskette 18*a* was created by an IBM/DOS machine, the data on the diskette 18*b* was created by an Apple Macintosh, the data on the diskette 18*c* was created by a Next machined and the data on the diskette 18*d* was created by a Commodore Amiga.

In the illustrated example, the device emulation controller module 16*a* is preferably a multi-format storage device controller. This eliminates the need to plug in a different, dedicated controller module prior to the insertion of each different type of diskette. If, on the other hand, it is known that the tablet 1 will only be used to reproduce documents stored in, for example, IBM/DOS format, the device emulation controller module 16*a* may be equipped to read only IBM/DOS format diskettes.

Techniques for enabling a device emulation controller module 16*a* to operate as a multi-format storage device controller are well known to those skilled in the art. That is, the capability of reading diskettes of more than one format using a single disk drive are well known. As an example, disk drive controllers that permit both Apple Macintosh and IBM PC diskettes to be read have been available for some time. "Central Point Software, Inc." of Beaverton, Oreg. has long been marketing a hardware adapter board for IBM compatible computers called the "Option Board" (and after 1988, the "Deluxe Option Board") that allows IBM compatible computers to read Apple Macintosh diskettes. There are other, similar diskette drive adapter manufacturers. In a somewhat similar fashion, Apple Macintoshes may also read IBM/DOS diskettes. Thus, the production of a device emulation controller module 16*a* which would enable the tablet 1 to read diskettes from a variety of different platforms, as shown by way of example in FIGS. 18(*a*) and (*b*), would be well within the purview of the skilled artisan.

The file interpreter module 16*b* performs the function of converting data from various source formats into the screen control codes used to generate displayable images on the image display screen 6*a* of the tablet 1. Electronic format data files are generally comprised of two components. First, there is the raw data itself. Second, there is the set of formatting instructions that describe how the raw data is to be made use of. Accessing a data storage medium, such as a magnetic diskette, is only half of the requirement for being able to print native format files saved on native storage media. Interpreting, or translating, the accessed native format file is the other half.

As a familiar example, consider a word processor data file. The file may be composed of the words that constitute the document. The file may also be composed of the formatting commands, or control codes, that describe how the words are to be arranged on each page of the document, how typefaces should appear and in what sizes, whether some words are underlined, and so forth. Similar concepts apply to other types of data files, whether they originate from spread sheet programs, data base managers, paint or draw programs, etc.

The file interpreter module 16*b* provides the means to make sense of the data files. That is, the file interpreter module 16*b* provides the means to apply the formatting rules of different software applications programs to the raw data contained in the data files created by such applications. The result of this action is the creation, in screen displayable form, of information formatted as it was intended to appear by the original author of the data file. The displayed information may subsequently be copied by a copier in accordance with the general principles of the present invention, as previously described.

FIGS. 19(*a*) through 19(*g*) illustrate an example of the process that might be involved in creating a hard copy of a disk file using a tablet in accordance with the present invention. The illustrated process is extremely simple, and may be performed by people with non-technical backgrounds, including people who do not know how to use a computer.

FIGS. 19(*a*) through 19(*g*) illustrate the images that might appear on the operator's console screen 100 to guide a user in obtaining a printout P. The operator's console screen 100 depicted in FIGS. 19(*a*)–19(*g*) is a touch sensitive screen, similar to screens used in some automatic teller machines. The images displayed on the operator's console screen 100 lead the user through the process of selecting and printing files selected from a disk 18*a* inserted into the data storage device module 17*a* of the tablet 1.

The process begins with the insertion of a disk, such as an IBM/DOS format floppy disk, into a data storage device module 17*a* (see, for example, FIG. 18(*a*)). Then, as shown in FIG. 19(*a*), the operator's console screen 100 presents a listing 210 of the files detected on the inserted disk. Platform identification information 212 may also appear at the top of the operator's console screen 100.

As shown in FIG. 19(*b*), the user may select the files to be printed by touching the touch sensitive operator's console screen 100. The selected files appear in highlight boxes 215. To de-select a chosen file, the user might simply touch the selection again. The selection would then toggle off. When the user has completed making selections, the "Done" screen-button 214 may be pressed. If the user is unsure about the procedure, or requires assistance, a "HELP" screen button 247 may be provided.

As shown in FIG. 19(*c*), a list of the selected files 217 may then be displayed, together with a list of applications software origins 219. The user may then indicate what software package was utilized to create the selected files, with the designated software origins being indicated in the form of numerals 222 alongside each selected file (see FIG. 19(*a*)). As illustrated in FIG. 19(*d*), for example, the files "Organic3.LEC" and "Organic2.LEC" represent files created using WordPerfect software. The origin number of these files would therefore be "6.WordPerfect". The file "Organicl.LEC" represents a file created using "Ventura Publisher" software. The origin number of this file would therefore be "8. Ventura Publisher". When the user has completed indicating what software package was utilized to create the selected files, the "Done" screen-button 214 may be pressed. (To return to a previous screen menu, the user may press the "Go Back" screen button 249.)

As shown in FIG. 19(*e*), a variety of print options 224 may then be presented as electives. These include, for example: multiple copies, a feature called "pseudo-collation" (described later in connection with FIG. 23), separator sheets, title sheets, print halt options, printer adjustment options, etc.

As shown in FIG. 19(*f*), the user may be presented with a print pre-commencement advisory screen 225. The advisory screen informs the user of the total number of pages that will be generated, so that the copier may be adjusted accordingly. As shown in FIG. 19(*f*), for example, the total page count is indicated as being 87. This page count includes all page-consuming special features, such as separator sheets. As indicated in the advisory screen 225, printing may be initiated by depressing a copy start button on the copier.

As shown in FIG. 19(*g*), the user may monitor print status during the printing process. The "page number box" 232 displays the page currently being displayed on the image-forming screen of the tablet. This allows the user to know the status of the print job while the print job is taking place. To suspend the printing process, the copy cycle may be interrupted at the copier. Since, in a preferred embodiment, the tablet follows the copier by "watching out" for copy execution via sensors, halting the copier will also place the tablet into suspended operation. Alternatively, a "Stop" screen button 267 may be provided to suspend printing. Resumption of printing may be initiated by depressing a "Continue" screen button 269. FIG. 19(*g*) also shows a listing of files remaining in the print queue 234.

Figure 20A:
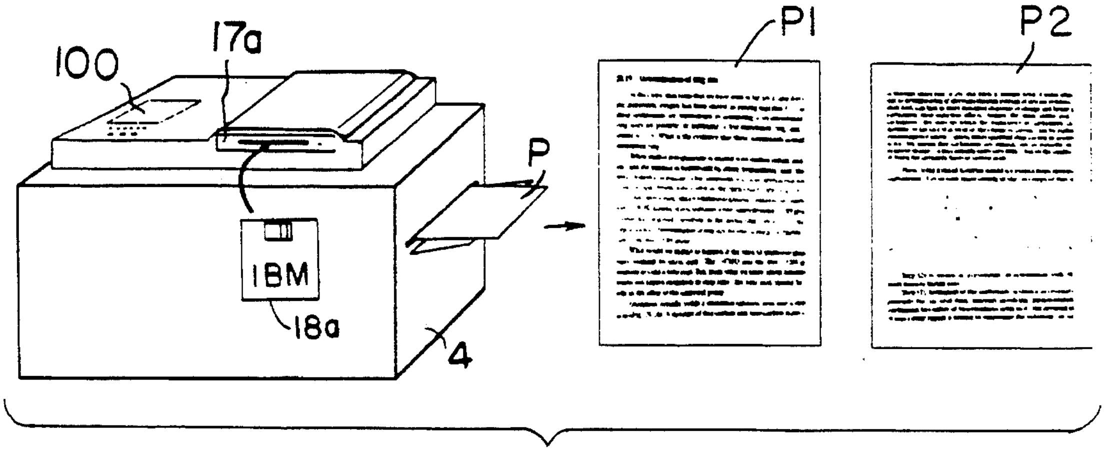
FIGS. 20(*a*)–(*c*) illustrate an example of the versatility afforded by an embodiment of the present invention.
Figure 20B:
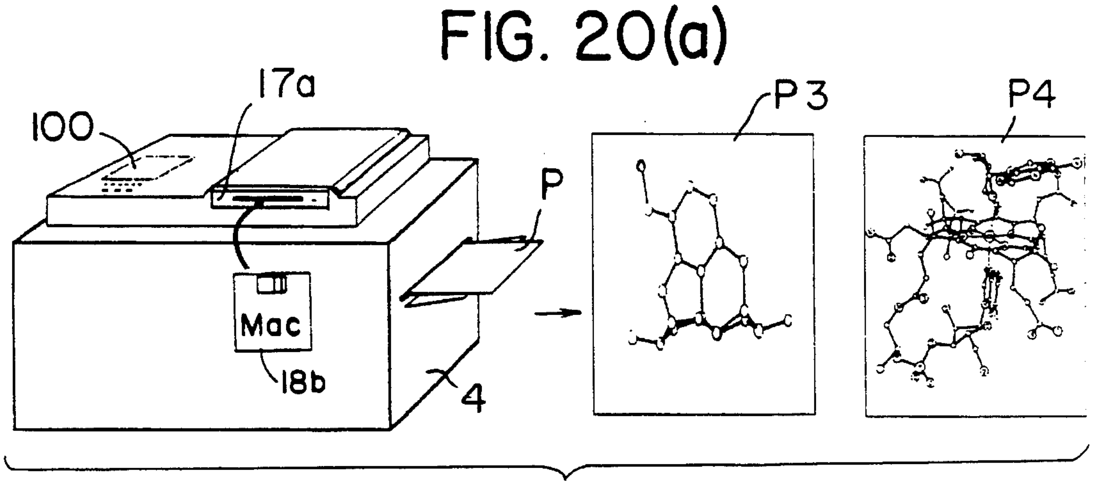
Figure 20C:
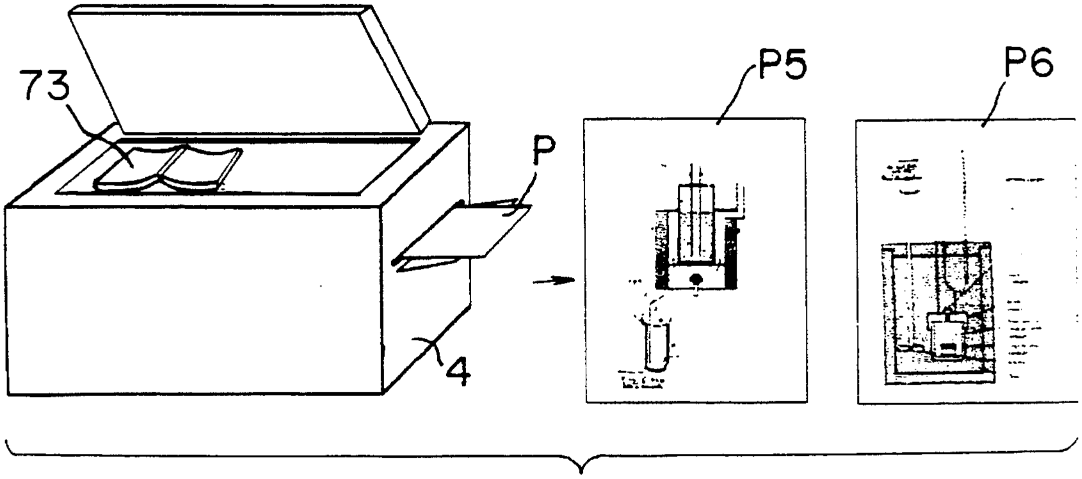

FIGS. 20(*a*)–(*c*) illustrate an example of the versatility afforded by an embodiment of the present invention. FIG. 20(*a*) shows a diskette 18*a* that may be inserted into a data storage device module 17*a* of a tablet 1. The diskette contains a word processor document that was created on an IBM/DOS machine. The hard copy output P1 and P2 produced by the copier 4 comprises text material.

As shown in FIG. 20(*b*), another diskette 18*b* may subsequently be inserted into the same data storage device module 17*a* of the tablet 1. The second diskette 18*b* may contain drawings that were made on another computer platform, such as an Apple Macintosh, using a program such as "Beaker" which is not available to an IBM/DOS platform. The hard copy output P3 and P4 produced by the copier 4 comprises molecular diagrams.

As shown in FIG. 20(*c*), an ordinary textbook 73 may be copied (printed) alongside any of the abovementioned electronic format information. The hard copy output P5 and P6 produced by the copier 4 comprises pages copied directly from the textbook 73.

All of the above printing of hard copies P1–P6 may be accomplished at the same physical site, using the same equipment, and in a "continuous flow" that is both intuitive and user-friendly. Moreover, the present invention brings these capabilities to ordinary users because all of the required equipment is relatively affordable. The copier 4 may be a low-cost "personal copier". Still further, the present invention provides room for growth, as more expensive, higher performance copying equipment can be substituted at a future time. The present invention is therefore highly adaptable to one's needs and resources.

Figure 21:
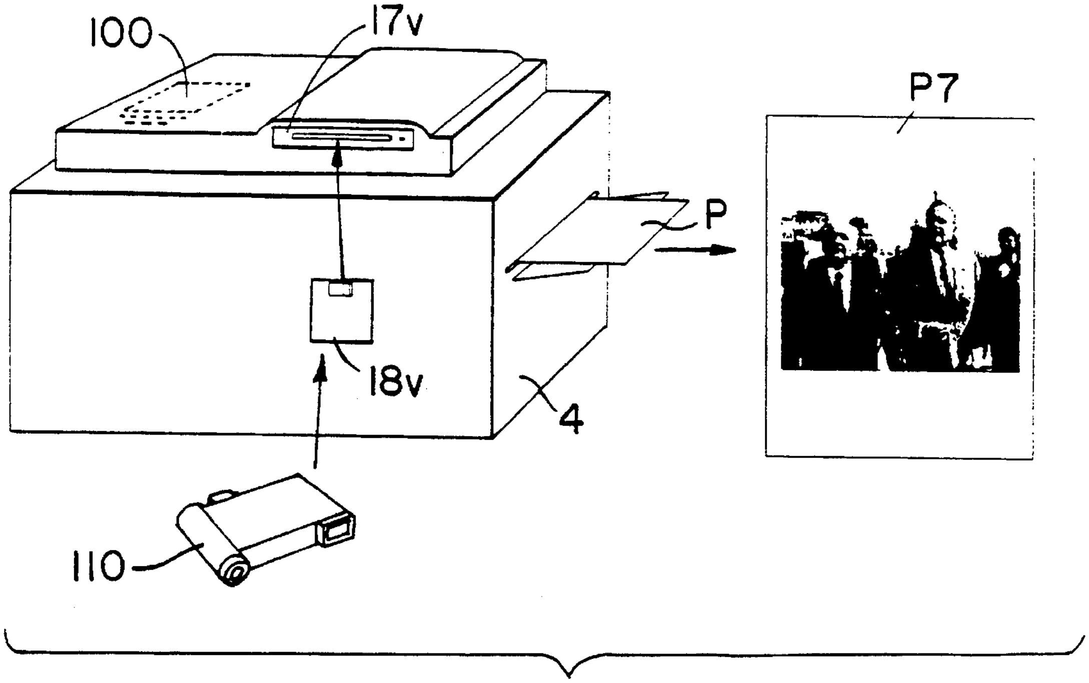
FIG. 21 illustrates an example of the use of a tablet in printing digital photographs taken by an electronic still camera.

FIG. 21 illustrates an example of the use of a tablet 1 in printing digital photographs taken by an electronic still camera 110. The illustrated electronic still camera 110 may store pictures on 2-inch video floppy disks 18 V in a standard format defined by the "Electronic Still Camera Standardization Committee". The data storage device module 17 V may comprise a video floppy disk reader installed in the tablet 1 to enable video floppy disks 18 V to be read and printed. The hard copy output P7 comprises a paper print specimen of a photograph taken by the camera 110. The ability to create rapid photographic proofs in this manner may be desirable to organizations such as news bureaus.

Figure 22:
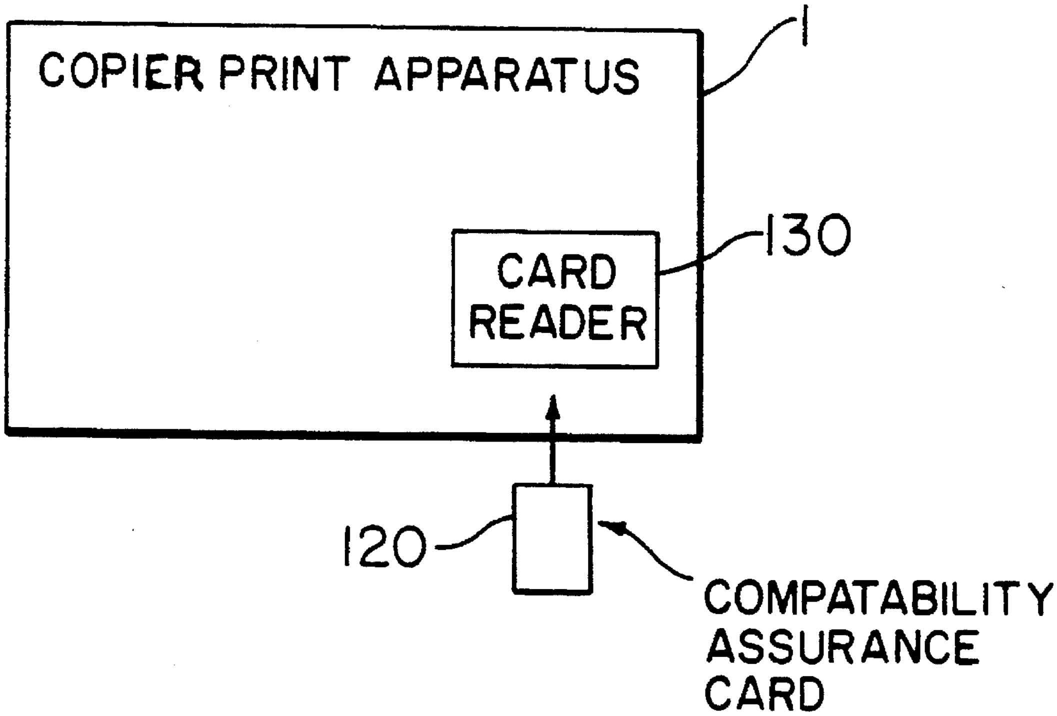
FIG. 22 illustrates an example of the incorporation of a compatibility assurance card reader into a tablet.

FIG. 22 illustrates an example of the incorporation of a compatibility assurance card reader 130 into the tablet 1. One purpose of a compatibility assurance card 120 is to insure that the tablet 1 may be used to print files created by various software packages. Another purpose is to accommodate changes in data storage formats by software manufacturers.

The compatibility assurance card 120 may comprise a credit-card sized element provided by software manufacturers to licensed owners of their products. For example, the manufacturer of a word processing software package might include a compatibility assurance card 120 in the package. The compatibility assurance card 120 may contain information on the data storage convention utilized by the latest release of the software. Each of the formatting and control characters used by the software program when writing data to disk files would be available on the card 120. By inserting the card 120 into the card reader 130, the tablet 1 may download the storage convention information from the card into the memory of the tablet 1. This information may then be used in place of, or as a supplement to, the information contained in an installed file interpreter module 16*b*.

A person who, for instance, utilizes a plurality of software packages in the course of conducting business might be provided with a plurality of compatibility assurance cards. In this fashion, such an individual would be assured of being able to print out data at suitably equipped copiers at field locations, at libraries, post offices, drug stores, etc. It is anticipated that most people would require three or fewer compatibility assurance cards: for example, one for a word processor, one for a spread sheet program, and one for a data base manager.

Compatibility assurance cards 120 may comprise plastic cards similar to credit cards, having a magnetic recording layer in which information such as symbol tables for data file translation may be retained. Compatibility assurance cards 120 may also comprise "smart cards", optical memory cards, or any other type of medium that is cost effective and that is capable of holding the required format translation instructions.

Figure 23:
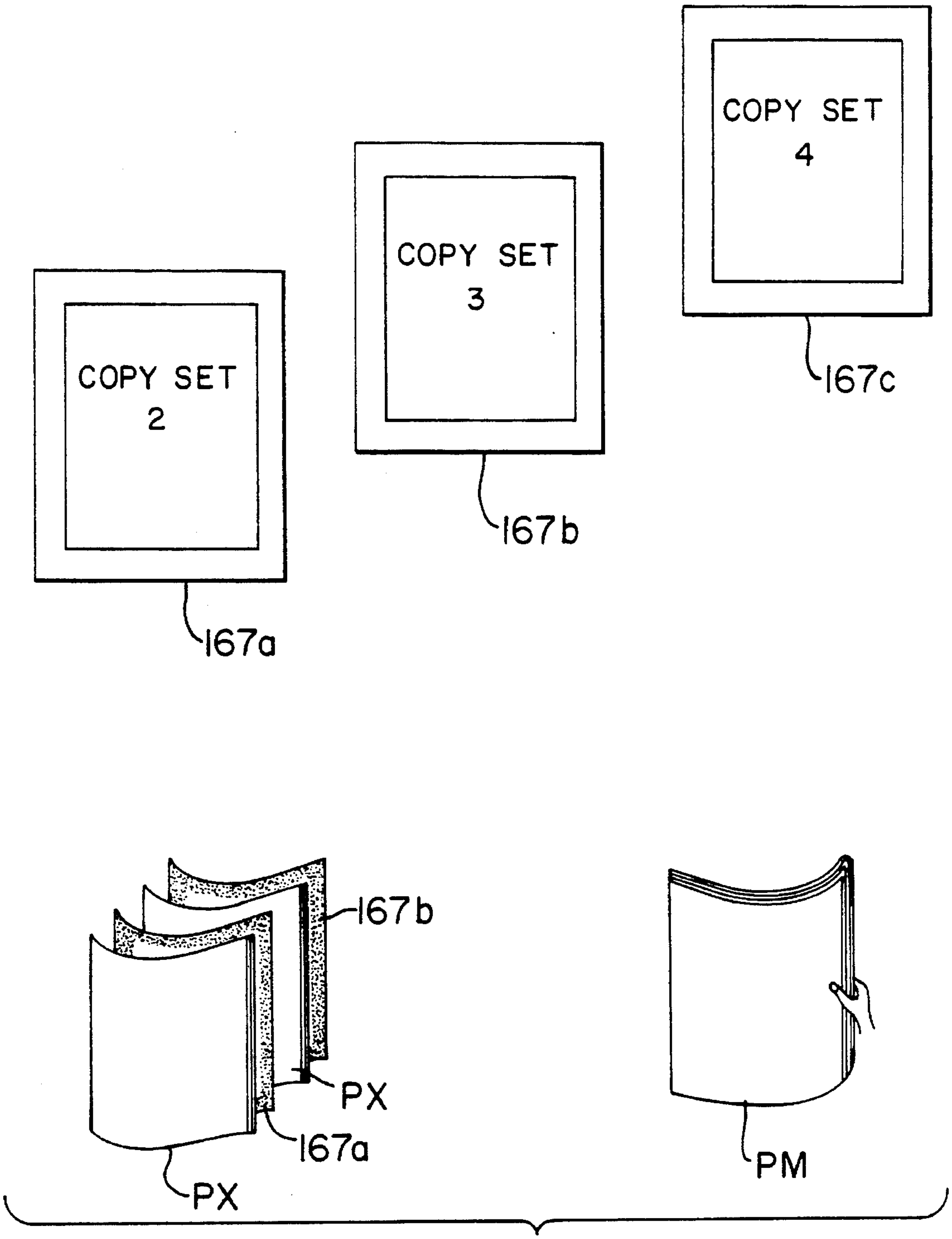
FIG. 23 illustrates an example of a feature referred to as "Pseudo-Collation".

FIG. 23 illustrates an example of a feature referred to as "Pseudo-Collation". "Pseudo-Collation" is a technique that permits low-end copiers that are not equipped with collating capability to simulate the benefits of collation. When a tablet in accordance with the present invention is used to print multiple copies of a single document, the tablet may handle the task as follows: the first document page is displayed and printed, the second document page is displayed and printed, the third document page is displayed and printed, and so on until the final document page is displayed and printed. The routine is then repeated a number of times, depending upon the number of copies desired.

Between displaying the final document page of one copy set and the first document page of the next copy set, a separator page may be displayed to the copier by the tablet. In FIG. 23, for example, the separator pages are illustrated as pages 167*a*, 167*b* and 167*c*. Also shown in FIG. 23 is a page Px preceding the separator page 167*a* and a page Px between the separator pages 167*a* and 167*b*. The pages Px denote complete document copy sets. In the illustrated example the borders of the separator pages 167*a*–167*c* are darkened. When a stack of printed pages Pm is fanned, the dark borders of the separator pages 167*a* and 167*b* facilitate location of the document copy sets preceding and following the separator pages. This allows low-end, non-collating copiers to produce multiple copy sets of documents in a fashion that approximates true collation.

II. EXAMPLES OF SOME TECHNICAL CONSIDERATIONS

Option Modules, which provide device emulation means, supply a mechanism by which users may customize, expand, upgrade, and modify a tablet in accordance with the present invention. For example, a print spooler might be installed to more effectively handle large volume print needs. Option Modules further provide the capability to directly access native format data files on the original medium of the devices that created them. Option Modules enable printout to be obtained using only a copier and a diskette (for example) containing data to be printed. A connection to a computer becomes unnecessary. Using a native format file reader as an illustrative example, examples of some Option Module implementations are discussed below.

Figure 24:
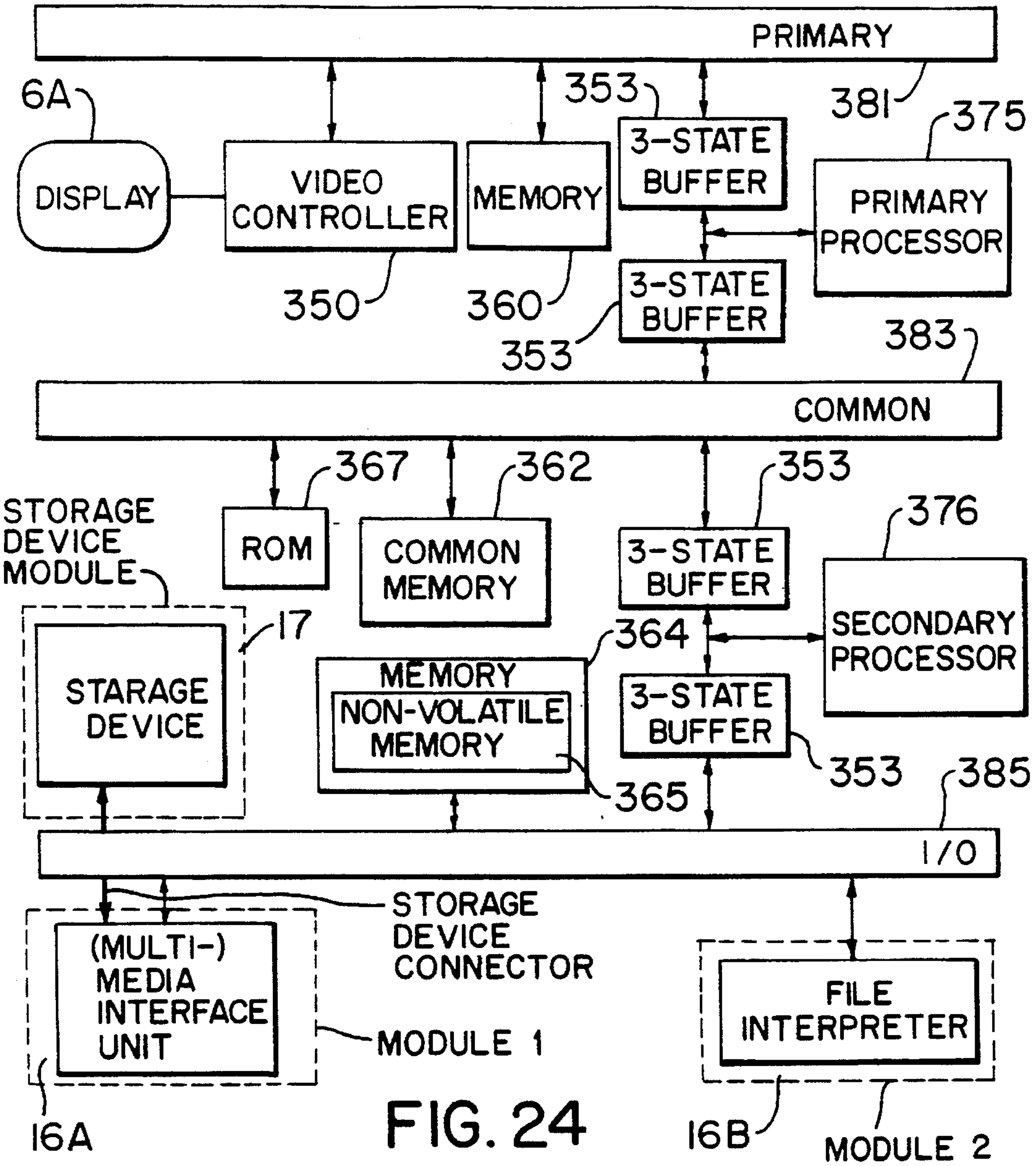
FIG. 24 illustrates an example of a hardware configuration in one embodiment of the present invention.

FIG. 24 illustrates an example of a hardware configuration in one embodiment of the present invention. In the illustrated embodiment, all of the components comprise part of the tablet, with the exception of the device emulation controller module 16*a*, the file interpreter module 16*b*, and the data storage device module 17, all of which are Option Modules.

In the illustrated example, the device emulation controller module 16*a* comprises a "multi-media" controller capable of controlling more than one type of storage device. The device emulation controller module 16*a* may, for instance, be capable of controlling an Apple Macintosh 3.5" diskette drive as well as an IBM/DOS format 3.5" diskette drive. The method of accomplishing this is known in the art. Several computer peripheral manufacturers have long been marketing products that enable a single 3.5" diskette drive to read and write in the storage format of more than a single computer platform. Examples of such manufacturers are numerous, but include Central Point Software of Beaverton, Oreg., and Apple Computer, Inc. of Cupertino, Calif. (for use by Apple). The device emulation controller module 16*a* is connected to the storage device module 17, and is also connected via the I/O bus 385 to the tablet 1.

The file interpreter module 16*b* contains a native format file interpreter. The file interpreter module 16*b* is also plugged into the I/O bus 385 by virtue of being installed into the module receiving bay 15. The file interpreter module 16*b* performs the function of converting native format files into screen displayable form. The file interpreter module 16*b* may comprise a ROM. The ROM may include translation tables and interpreter instructions for translating data, appearing in the native format of various applications software packages, into a single target format. The target format will ordinarily be the screen control codes 305 used by the video controller 350 to generate images on the image display screen 6a of the tablet 1.

As appreciated by persons skilled in the art, the screen control codes 305 may comprise a graphics language, such as PostScript. (The screen control codes 305 may also comprise a bitmap, rather than a true language.) If the screen control language is PostScript, then translation may not even be required in some instances, since certain software programs permit data to be saved in this format as an output option. Techniques for translating data from one storage format into another are known in the art. Many software applications packages provide what are referred to as "Import" and "Export" facilities. These facilities are essentially software translators. Additionally, there are several software manufacturers that specifically market format conversion programs. Examples of such manufacturers are Inset Systems, which produces "HiJaak" and SCC which produces "Software Bridge". The methods of data format conversion are therefore well established in the art.

Returning to FIG. 24, a secondary processor 376 is shown having access to both the I/O bus 385 and the common bus 383. As is standard practice when a single processor has dual bus access, buffers 353 are provided to enable bus selection. The buffers 353 are similarly present for the primary processor 375, which communicates with both the common bus 383 as well as primary bus 381. A memory block 364 is present on the I/O bus 385. A subset of the memory block 364 is reserved for non-volatile memory 365. When a storage medium, such as a diskette, is placed into the data storage device module 17, the device emulation controller module 16i a, under the control of the secondary processor 376, may read data from the medium. The acquired data may be placed into the memory 364. Using format translation rules provided by the file interpreter module 16b, the processor 376 may translate the native format data read from the diskette into the screen control codes (language) used by the video controller 350. The translated screen control codes may be placed into the memory 362 by the secondary processor 376. The primary processor 375 moves the translated screen control codes from the memory 362 into the local memory 360. The video controller 350 is able to access the screen codes from the memory 360 in order to generate images 60 on the image display screen 6a. While the primary processor 375 is moving data from the common memory 362 to the system memory 360, the secondary processor 376 may continue retrieving and translating additional native format data from the data storage device module 17.

Also shown in FIG. 24 is a ROM unit 367, which contains instruction code for controlling basic system operation. An EPROM may be substituted for the ROM unit 367 in some embodiments, so that new system code can be incorporated into the tablet simply by downloading the new code from a diskette into the EPROM. A non-volatile memory block 365 may be used to retain translation instructions which are supplemental to the instructions found in the file interpreter module 16b. The supplemental instructions may be downloaded from data storage media such as diskettes, which may also be accessed using the data storage device module 17. The memory units (e.g. 362, 364, 365) may be used as shadow RAM for instruction code or translation code saved in ROM (e.g. 367, the file interpreter module 16b). This may offer an improvement in overall performance of the tablet.

Figure 25:
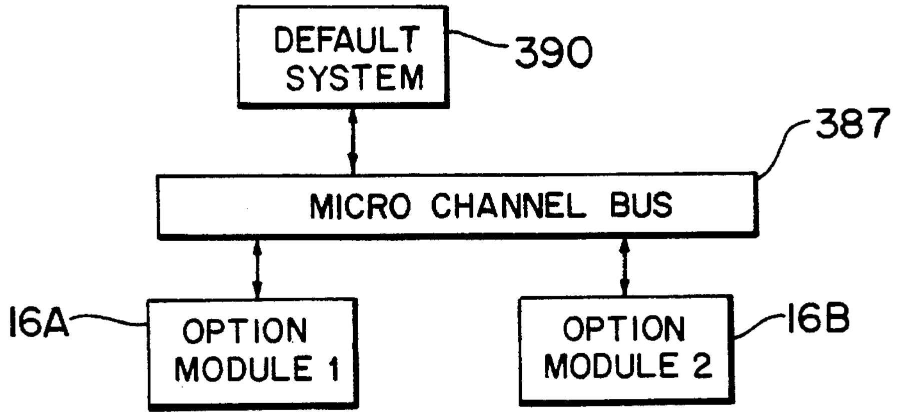
FIG. 25 illustrates an example of the application of MicroChannel Bus architecture by a tablet so that multiple masters can be effectively supported.

FIG. 25 illustrates an example of the application of MicroChannel Bus architecture by the tablet so that multiple masters can be effectively supported. In this configuration either Option Module 1 or Option Module 2 can take control of the overall system from the default system 390 (master). Either Option Module 1 or Option Module 2 can control the function of the tablet. For example, an option module might be installed to operate the tablet as a "printer" that serves a computer network. In the illustrated example, Option Module 1 corresponds to the device emulation controller module 16a and Option Module 2 corresponds to the file interpreter module 16b. However, the present invention does not require that the Option Modules correspond identically to either the device emulation controller 16a or the file interpreter 16b.

Figure 26:
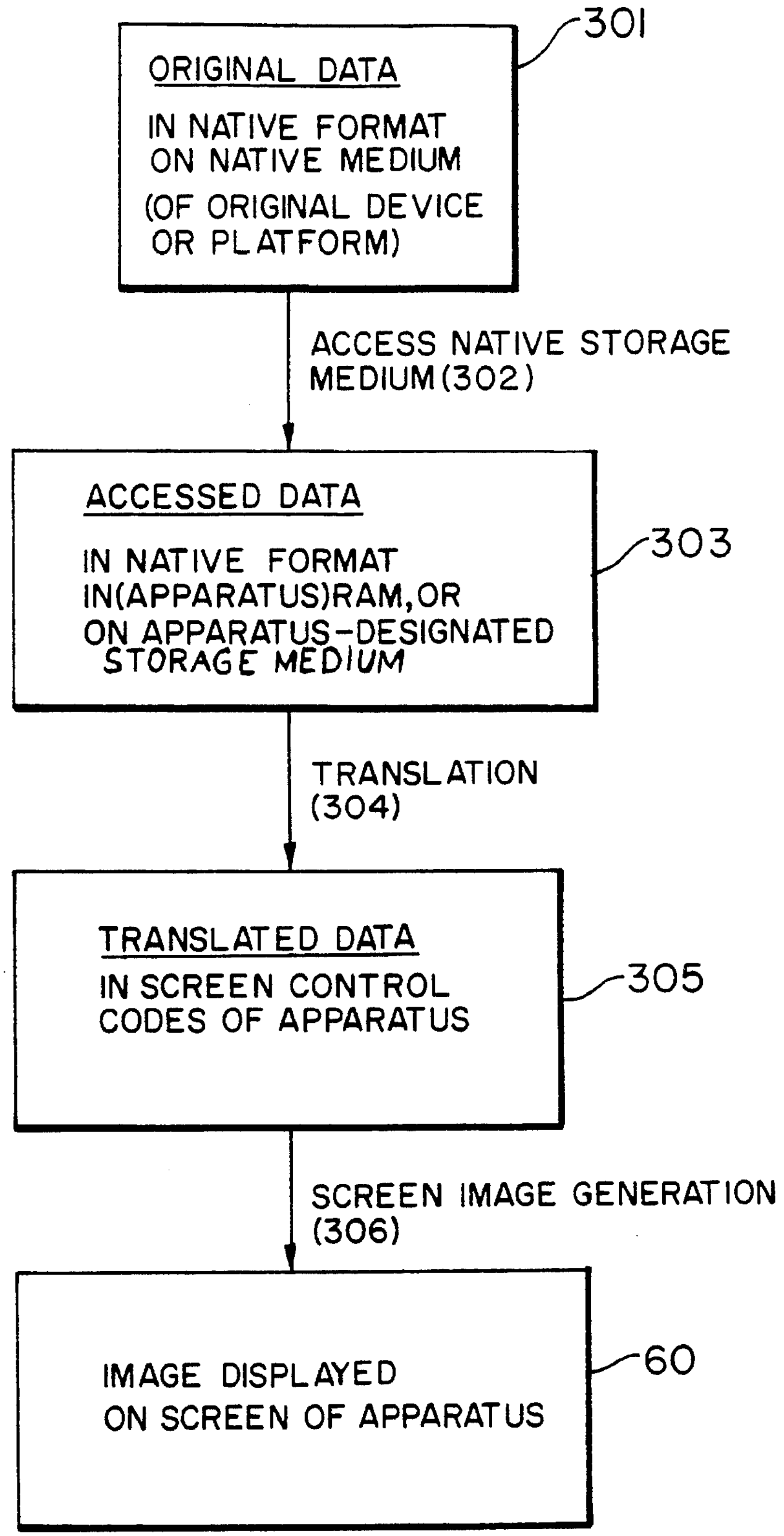
FIG. 26 illustrates an example of a process for obtaining hard copy with a tablet from data created by a software package, that is saved on a medium such as a diskette.

FIG. 26 illustrates an example of a process for obtaining hard copy with a tablet from data created by a software package, that is saved on a medium such as a diskette. In FIG. 26, element 301 represents a storage medium, such as a diskette, that contains a file that was created by an applications program. The data is in the "native" format of the applications program that created it. As used herein, the term "native" means the format customarily employed by the program for the storage of information.

Step 302 denotes the process of accessing a file on the native storage medium. This involves reading the storage medium (which may be, for example, a floppy diskette). Step 302 is accomplished by having a storage device controller, appropriate for the storage format of interest, control the storage device so as to be able to access the storage medium. For example, step 302 might entail employing hardware similar to an IBM/DOS floppy diskette drive "adapter" to control a 3.5" diskette drive, so that data stored on a 3.5" IBM/DOS format diskette may be read. The diskette drive "adapter" of this example may be included in the device emulation controller module 16a, and the 3.5" diskette drive may be furnished by the data storage device module 17. As mentioned earlier, the device controller module 16a may be a "multi-media" storage device controller capable of providing access to the storage media of more than one type of computer platform. Multi-media controllers are familiar in the art, and the manner of their application and construction would be known to skilled artisans.

In FIG. 26, element 303 represents data that has been read into the memory of the tablet. After being read into the tablet, the data may optionally be placed into another storage medium such as, for example, a fixed disk drive connected to the tablet. The data 303 is still in its native format. That is, for example, if the data 303 started out as a WordPerfect document file, it is still in WordPerfect file format.

Step 304 represents the step of translating the native format data into a form that can be displayed on the image forming screen of the tablet. The element 305 represents the screen control codes that the native format data is translated into in step 304. The screen control codes 305 may comprise the instructions of a display language, such as PostScript. The screen control codes 305 may also comprise the bitmap of the image that is to be displayed. In the latter case the screen control codes would not constitute a true language. The screen control codes 305 may also comprise the linguistic elements of numerous other techniques currently available for representing graphical information on display devices, including novel display languages fashioned specifically for use by the tablet.

The process of translating native format data into the screen control codes, or language, used by the tablet, would depend on the choice of screen language adapted by the particular embodiment of the tablet. The principles behind translation, however, are well known to software engineers. "Import" and "Export" functions provided by many software packages perform translation between different file formats. For example, users of Microsoft Word may "Import" documents created by WordPerfect, and edit them using Microsoft Word instead. Similarly, most graphics programs can read and write "BMP", "PCX", and "TIFF" file formats, regardless of the native format of the program itself. In addition to the "Import" and "Export" features built into most applications programs, are the software packages that specifically provide the service of format conversion. Examples are "HiJaak" by Inset Systems, and "Software Bridge" by SCC. The principles governing format conversion are thus familiar in the art.

Step 306 of FIG. 26 represents the step of image generation by the video hardware 350 of the tablet. An image 60 is displayed on the image display screen of the tablet. The process by which an image may be generated from data and displayed by video hardware is ubiquitously well known. The graphics adapters of all computers perform this function.

Figure 27:
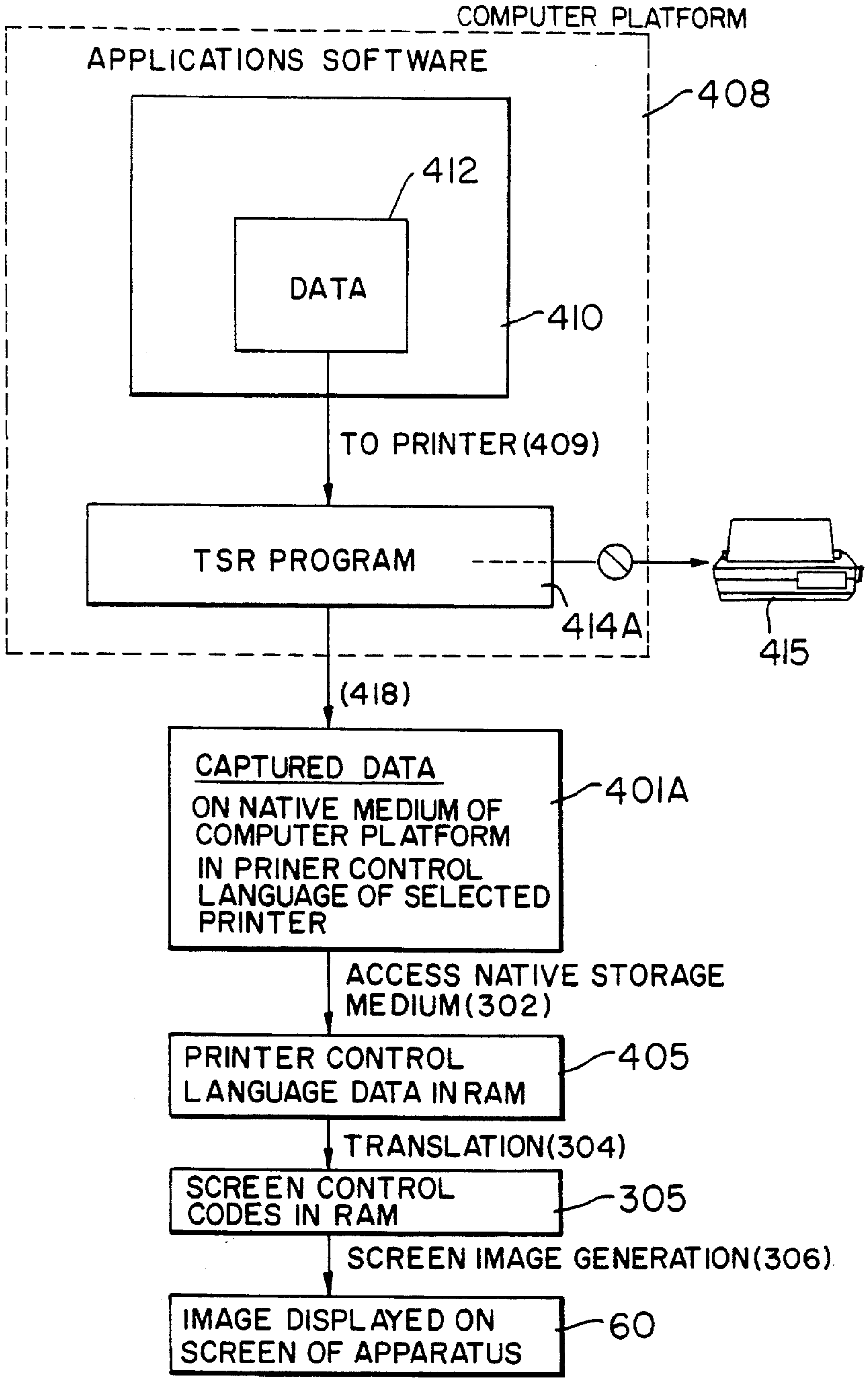
FIGS. 27 and 28 illustrate an example of an alternate method of getting data created by an applications program into a tablet.
Figure 28:
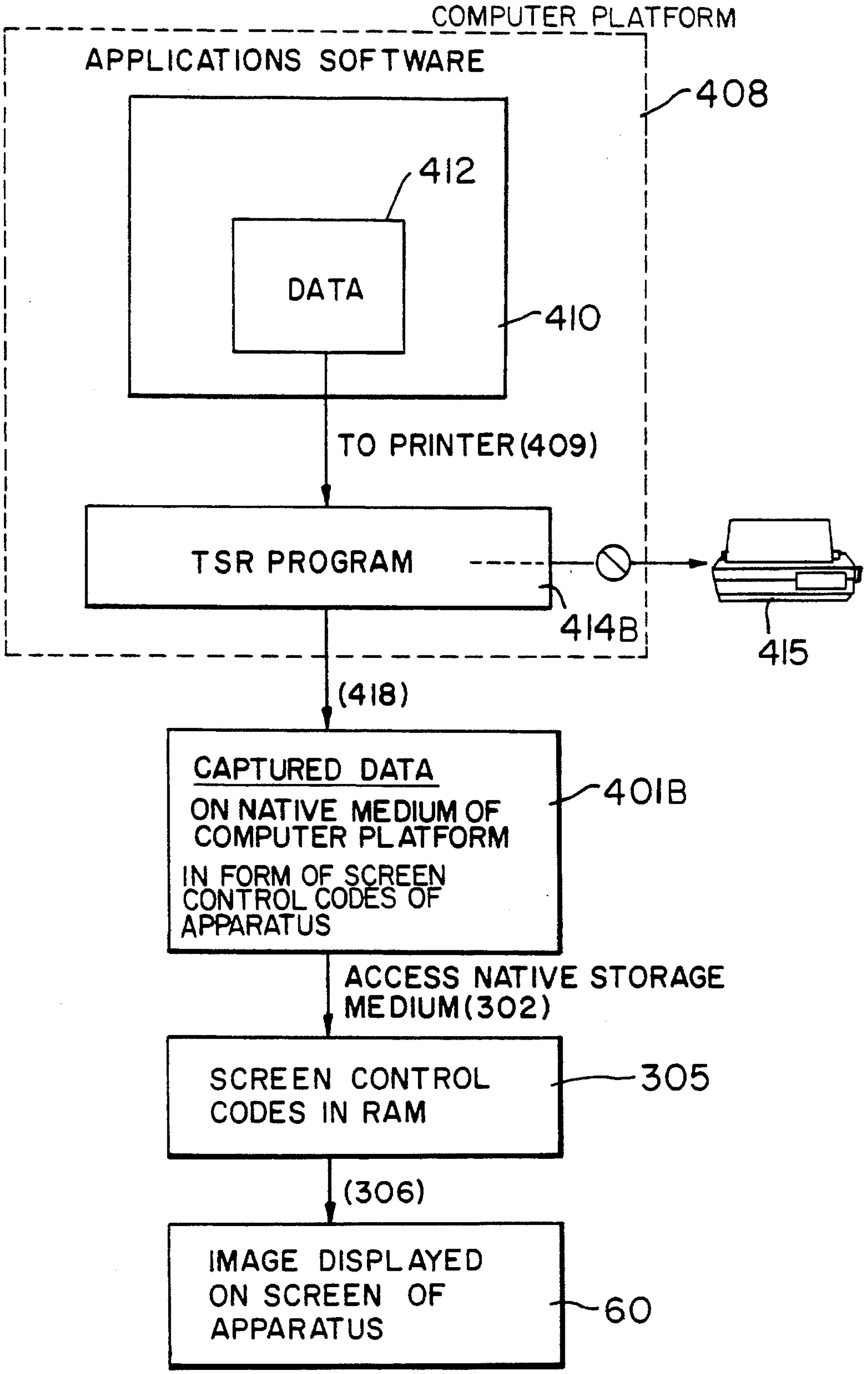

FIGS. 27 and 28 illustrate examples of alternate methods of getting data created by an applications program into the tablet. As illustrated in FIG. 27, a program 410 is run by a computer 408. As a result of running the program 410 on the computer 408, data 412 is created. The step 409 denotes the act of sending data to a printer 415, by way of executing a print command from within the program 410. The data 412, however, does not reach the printer 415, because it is intercepted by a TSR (Terminate but Stay Resident) Program 414*a*. The TSR program 414*a* redirects the print stream to a storage medium, such as a floppy diskette 401*a*. The data file recorded on the storage medium 401*a* may contain printer control language data, since the data stream was originally intended for a printer. The step 302 involves accessing the storage medium 401*a*, as in FIG. 26. When the storage medium 401*a* is read, the printer control codes are read into the memory of the tablet. The element 405 represents printer control codes in the RAM of the tablet. The step 304 involves translation of the printer control codes into the screen control codes 305. As in FIG. 26 screen image generation 306 causes the data to be displayed as an image 60 on the image display screen of the tablet.

FIG. 28 shows another technique for getting data into the tablet. As in FIG. 27, a computer 408 is shown running an applications program 410 (for instance, a spread sheet program)which generates data 412. The user executes a print command from within the program 410 to send the data to a printer 415. Step 409 represents the act of sending data to a printer from within the applications program. Instead of going to the printer 415, the data stream is translated by the computer 408 into the screen control codes 305 of the tablet 1 and then written to a storage medium. The element 401*b* represents a storage medium, such as a diskette, containing screen control codes representative of the data that was queued for printing. The element 414*b* represents a driver that emulates a printer driver, installed on the computer platform 408. Prior to executing the print command, the user selects from the printer setup menu of the applications program 410, "Copier Printer" as the print device. The driver 414*b* is then invoked when the print command is issued from the applications program 410. Rather than sending a stream of printer control language codes to the printer 415, the driver 414*b* writes screen control codes 305 to a storage medium, such as a magnetic diskette. Step 418 represents writing captured data to a storage medium such as a diskette.

Drivers are commonly used by software. For example, on an IBM/DOS platform running Microsoft "Windows", most applications programs have setup menus that permit the selection of any printers or devices that might be installed. By selecting a device from such a menu, a driver for controlling the selected device is selected behind the scene. When a print command is executed from within an application, the driver communicates the device control codes that operates the device. In the present case, a driver may be employed that emulates a printer driver and that sends screen control codes to a storage medium, such as a diskette, instead of sending printer control codes to a printer.

`After the screen control codes have been placed onto a diskette, as in element 401*b* in FIG. 28, the information may be accessed by reading the diskette, as in step 302. Reading the diskette places the screen control codes 305 into the tablet RAM. Step 306 involves generating an image, using the data, onto the image display screen 6*a* of the tablet 1. Element 60 in FIG. 28 represents the displayed image.

Figure 29:
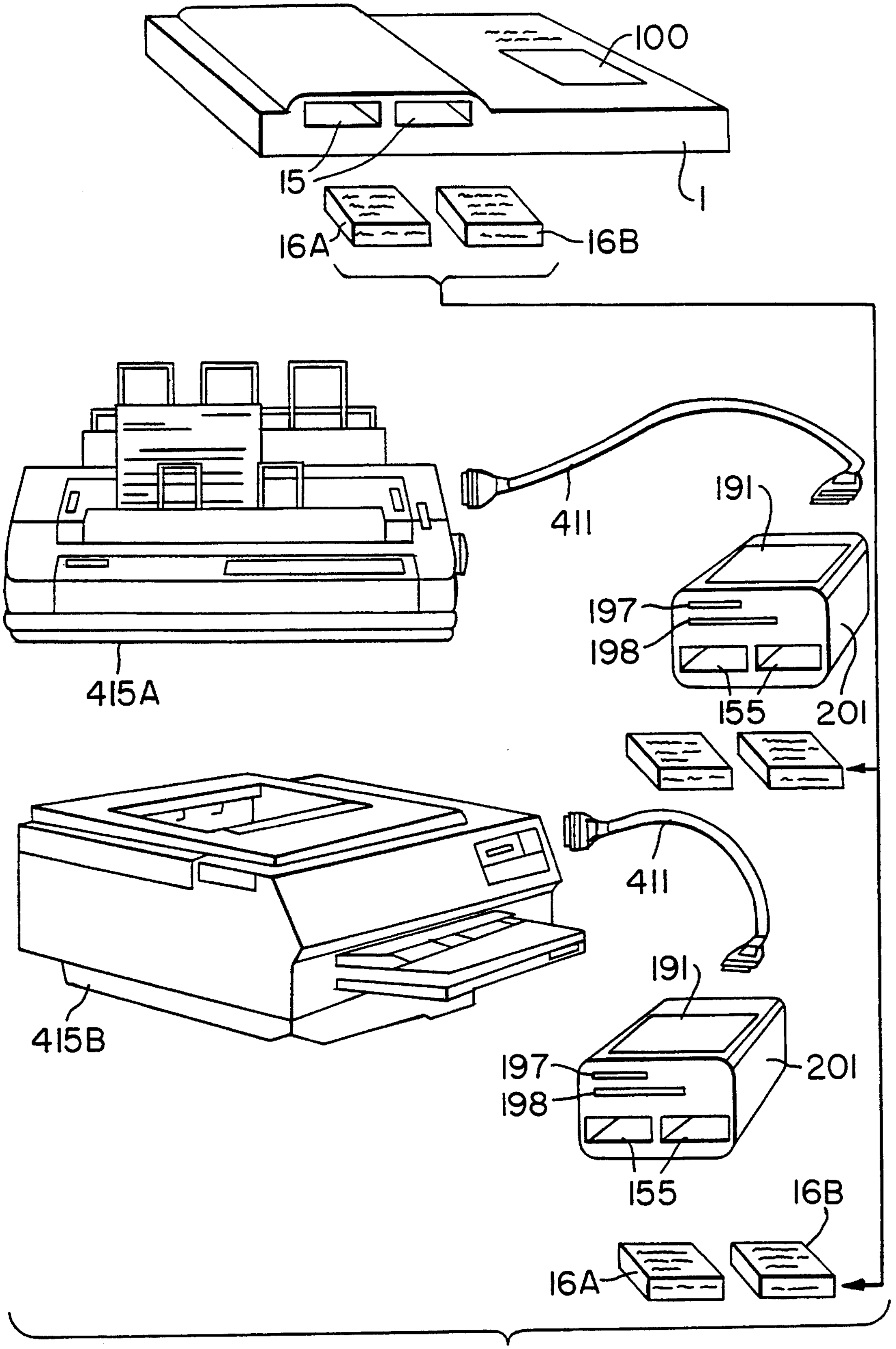
FIG. 29 illustrates an example of how a device controller module and a file interpreter module of a tablet might be "borrowed" by a conventional printer.

FIG. 29 illustrates an example of how the device controller module 16*a* and the file interpreter module 16*b* of the tablet 1 might be "borrowed" by a conventional printer. A printer interface adapter 201 is used to provide a means for the conventional printers 415*a* and 415*b* to acquire some of the functionality afforded by the option modules 16*a* and 16*b*. The printer interface adapter 201 is supplied with option module receiving means 155, which are analogous to the module receiving bays 15 found on tablet 1. In FIG. 29, the interface unit 201 is not furnished with storage device receiving means comparable to 177 of tablet 1. Instead, one 3.5" diskette drive 197 and one 5.25" diskette drive 198 are provided in a fixed mount. The dual format disk drives 197 and 198 may be of the 42 mm twin mount variety, to conserve space. An operator's console 191 may be found on the top of the unit 201. The operator's console 191 has similar characteristics to the operator's console 100 of tablet 1. The interface unit 201 is connected to a printer 415 by an electrical cable 411.

The device controller module 16*a* may supply the means to control diskette drives 197 and 198. The file interpreter module 16*b* may supply data interpretation means, so that the data files read by the disk drives 197 and 198 may be printed by the printers 415*a* and 415*b*. Because the file interpreter module 16*b* contains instructions for generating the screen control codes 305 of the tablet 1, a second level of translation may be required in order to properly control the printers 415*a* and 415*b*. The instructions for translating screen control codes into, for instance, HP-PCL (a printer control language) may be supplied by a user-installable ROM which may be installed at the outset, when the interface unit 201 is first attached to the printer 415*b*. Alternate embodiments of the file interpreter module 16*b* may, however, be equipped with "extended" interpretation capabilities that include instructions for translating native format data into either screen control codes, or printer control codes. When the screen control codes are comprised of a language such as Postscript, for example, and the printer control language is also Postscript, translation naturally would not be required. As would be recognized by persons skilled in the art, the principles of operation and construction of the interface unit 201 would be similar to the concepts presented above.

Figure 30A:
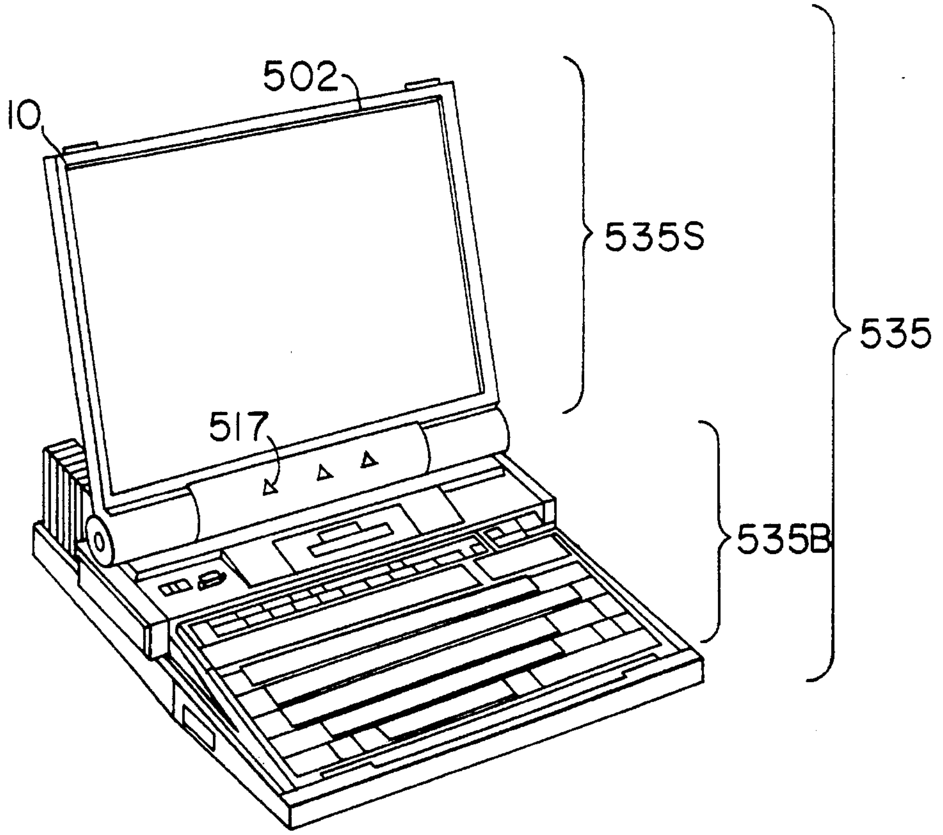
FIG. 30*a* shows a portable computer capable of producing hard copy using a conventional photocopier from applications software run thereon.
Figure 30B:
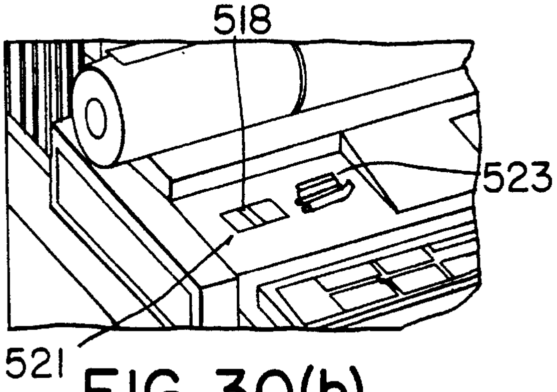
FIG. 30*b* shows a switch provided on the portable computer for enabling information to be printed using either a conventional photocopier, or a standard printer attached to the computer.
Figure 30C:
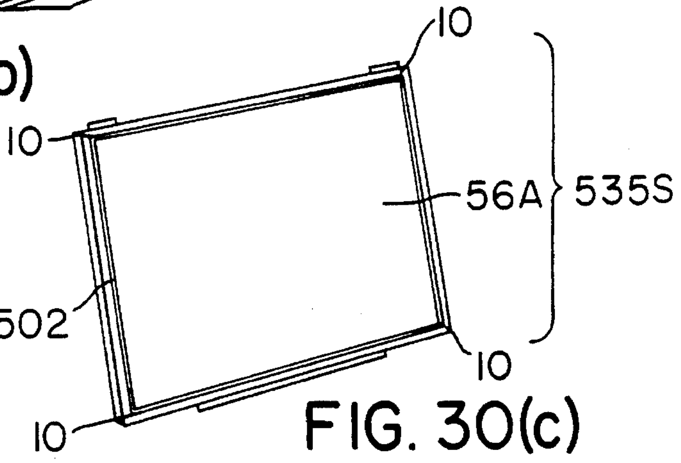
FIG. 30*c* shows the display screen of the portable computer, with photosensors and light gasketing.
Figure 31:
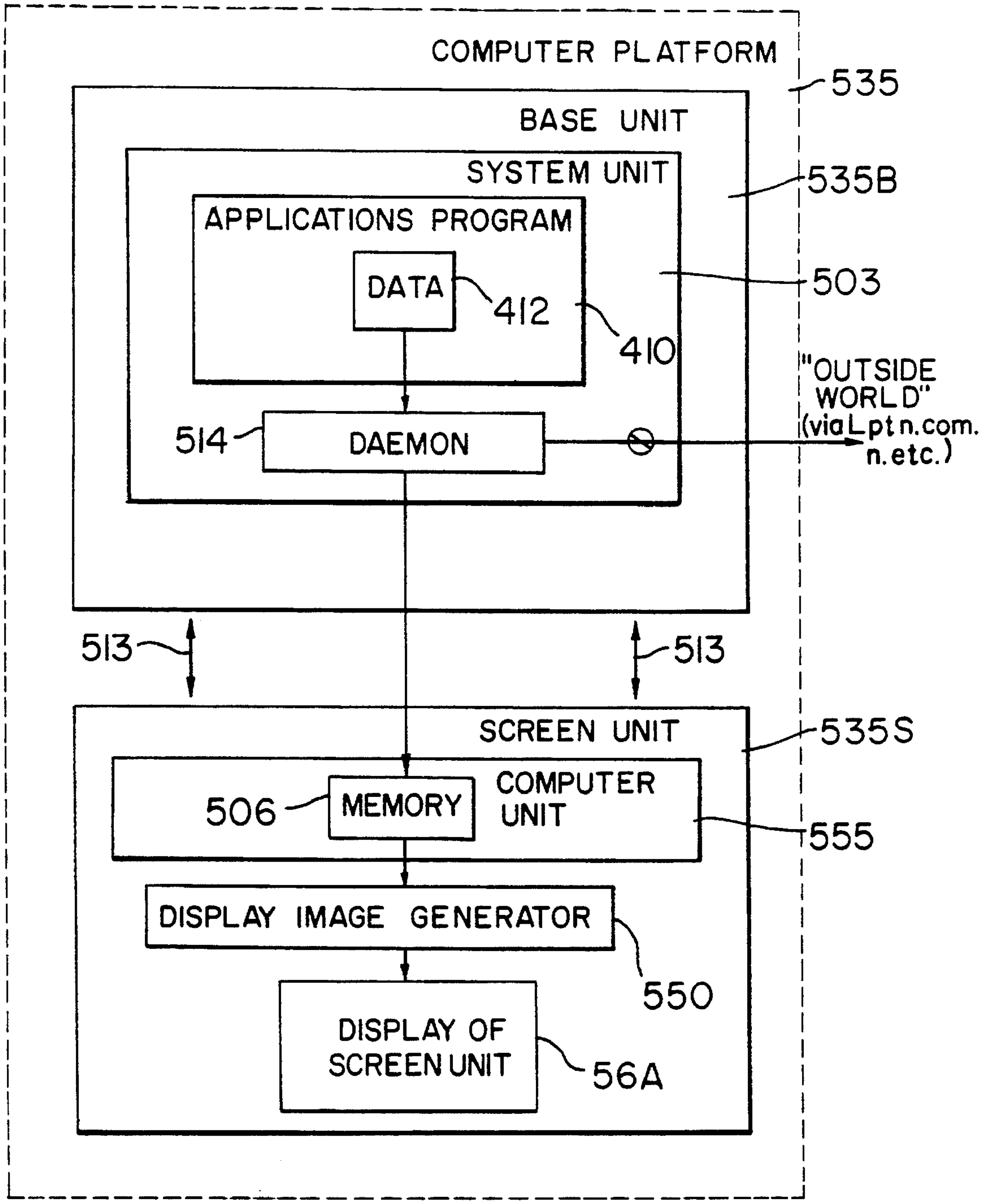
Figure 32:
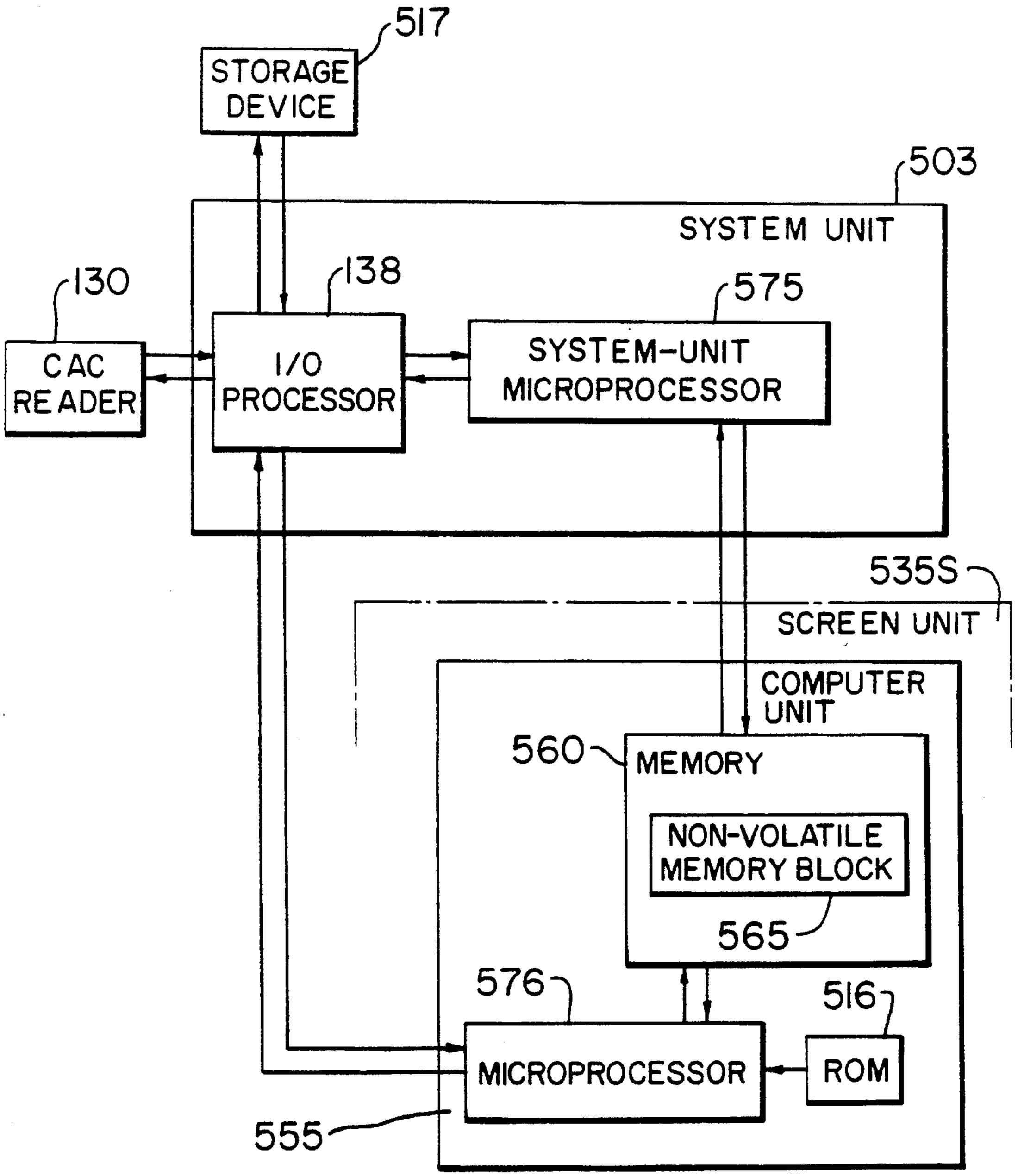

FIGS. 30 through 32 illustrate an embodiment of a portable computer constructed specifically to permit data to be "printed" by using its display screen with a copier. As shown in FIGS. 30(*a*) and 30(*c*), the portable computer 535 comprises a base unit 535B and a detachable screen unit 535S having a display 56A. Around the perimeter of the display element 56A is a light gasket 502 for keeping ambient light from leaking in between the display 56A and the copier window 5. The light gasket 502 may comprise any suitable, flexible material (e.g. rubber). At the corners of the display element 56A are a set of sensors 10 for detecting copy execution. A set of LED's 517 in the form of arrows point towards the screen unit 535S. Whenever print data is being diverted to the screen unit 535S, the LED's 517 blink to indicate that a data stream is being captured by the screen unit.

A spring-loaded switch 518 may be slid to the left or to the right of a detente, center position (see FIG. 30(*b*)). The "normal" setting 521 of the switch 518 allows data queued for printout by the computer 535 to be routed to the parallel or serial ports of the computer. In the "normal" setting 521, the execution of a print command from within an applications program would cause the data stream intended for printout to be sent to whichever output port or device has been selected in software. This is similar to what conventionally occurs when a print command is executed on an ordinary computer. The switch position 523, located to the right of the center, detente position, and having a small copier icon associated with it, causes a data stream queued for printout to be diverted to the screen unit 535S.

FIG. 31 illustrates an example of the data capture process of the portable computer 535. As shown, the portable computer 535 comprises a base unit 535B and a screen unit 535S. The arrows 513 indicate that the screen unit 535S may be detached from the base unit 535B. The base unit 535B includes a system unit 503 for running applications software 410. The software program 410 creates the data 412. In screen capture mode, whenever the computer operator executes a print command from within applications program 410 to send the data 412 to the "outside world" 357 (e.g. via Lpt 1 or 2), the data stream is instead intercepted by a software daemon 514 and sent to a capture unit 555 in the screen unit 535S. "Daemons" are a member of a larger class of RAM resident software processes that "transparently" perform specific tasks in the background. Daemons and TSR's (Terminate but Stay Resident programs) may be invoked by "Hot-Key" sequences, interrupts, or by conditions that may arise during the course of normal system operation. The entire length of object code required to perform the task for which the daemon is responsible need not be RAM resident. Rather, there may be a smaller portion of the complete code which, when activated, would load the remainder of the code which would subsequently perform the function. These concepts are familiar to software engineers. An example of a TSR (or daemon) might be a program that handles facsimile reception on a computer. When the facsimile hardware detects a call on its phone line, the TSR (or daemon) is invoked to service the incoming fax transmission. In the present case, the daemon 514 is invoked by the execution of a print command, or by an attempt to place data onto a serial or parallel port of the computer 535. The data stream that is queued for output via the serial or parallel port is instead sent to a capture unit, identified as 555 in FIG. 31. The capture unit 555 is described further in connection with FIG. 32.

Data sent to the memory 560 of the capture unit 555 may be in a number of different possible formats. It is possible to construct the daemon 514 to write the actual screen control codes 305 used by the video adapter into the memory 560. For instance, the daemon 514 may include a software driver that emulates a printer driver, but which is used to generate screen control codes instead of printer control codes. This is similar to a technique used by some computer facsimile programs to capture a print stream and to transmit it as a fax document, rather than to an actual printer. The Fax TSR of such devices includes a driver that writes the print data as transmission-ready fax data, rather than as a stream of printer control codes used to drive a printer. In the present case, where screen control codes are placed into the memory 560 of the screen unit 535S, the capture unit 555 would not have to perform further translation on the data before it may be interpreted by the video hardware. The capture unit may, in such instances, merely comprise the memory 560. In contrast, in some embodiments it may be preferable to have the daemon 514 place into the memory 560 print stream data in an intermediate format. For example, it may be desirable to perform compression on the data before it is placed into the memory unit 560. The purpose of writing compressed, intermediate format data into the screen unit memory may be to permit lengthier documents to be loaded into the detachable screen unit 535S. This intermediate format data would then need to be converted into usable screen control codes by the capture unit. Also shown in FIG. 31 are a video adapter 550 and a display screen 56A of the computer 535. The video adapter 550 uses the screen control codes 305 to generate displayable images on the display 56A.

FIG. 32 illustrates an embodiment of the computer 535 in which the capture unit 555 includes logic for converting intermediate format capture data into usable screen control codes. Such may be the case where the daemon print stream diverter 514 does not write usable screen control codes into the memory 560. The top of FIG. 32 illustrates the system unit 503 and some peripheral devices with which it may communicate. The peripheral devices include a storage device 517, such as a fixed disk drive, and a compatibility assurance card reader 130 (an example of which is described above in connection with FIG. 22). Also included is an I/O Processor 138, which acts as an intermediary between the peripheral devices 130 and 517 and the rest of the system. The capture unit 555 is illustrated as being within the detachable screen unit 535S. In the illustrated configuration, the capture unit 555 includes a microprocessor 576, a ROM 516, and a memory block 560. The applications software 410 shown in FIG. 31 may, in fact, be run by the system unit microprocessor 575. Moreover, the software daemon 514 may also be run by microprocessor 575. When daemon 514 re-directs print data to the capture unit 555, it is actually causing the microprocessor 575 to place the data into the memory unit 560. Using the instructions contained in the ROM 516, the capture unit processor 576 translates the captured data, that was earlier placed into the memory 560, into the usable screen control codes 305. Also present in FIG. 32 is a block of non-volatile memory 565. The non-volatile memory 565 may be used to retain supplements to the instructions stored in the ROM unit 516. Supplemental or update information may be introduced into the non-volatile memory 565 from a diskette, or it may come from a compatibility assurance card. In the latter case, the compatibility assurance card would be inserted into, and read by, the CAC reader 130.

The present invention enables detection of the amount of misalignment between a tablet and a copier window. The present invention further enables the use of image reorientation techniques, so that an image displayed by a tablet may be reoriented and printed by a copier as if the tablet and the copier window were in alignment, even if the tablet is initially misaligned relative to the copier window. Examples of systems for optimizing the orientation of a hard copy image generated by a tablet are discussed in greater detail below in connection with FIGS. 33 through 38.

Figure 33:
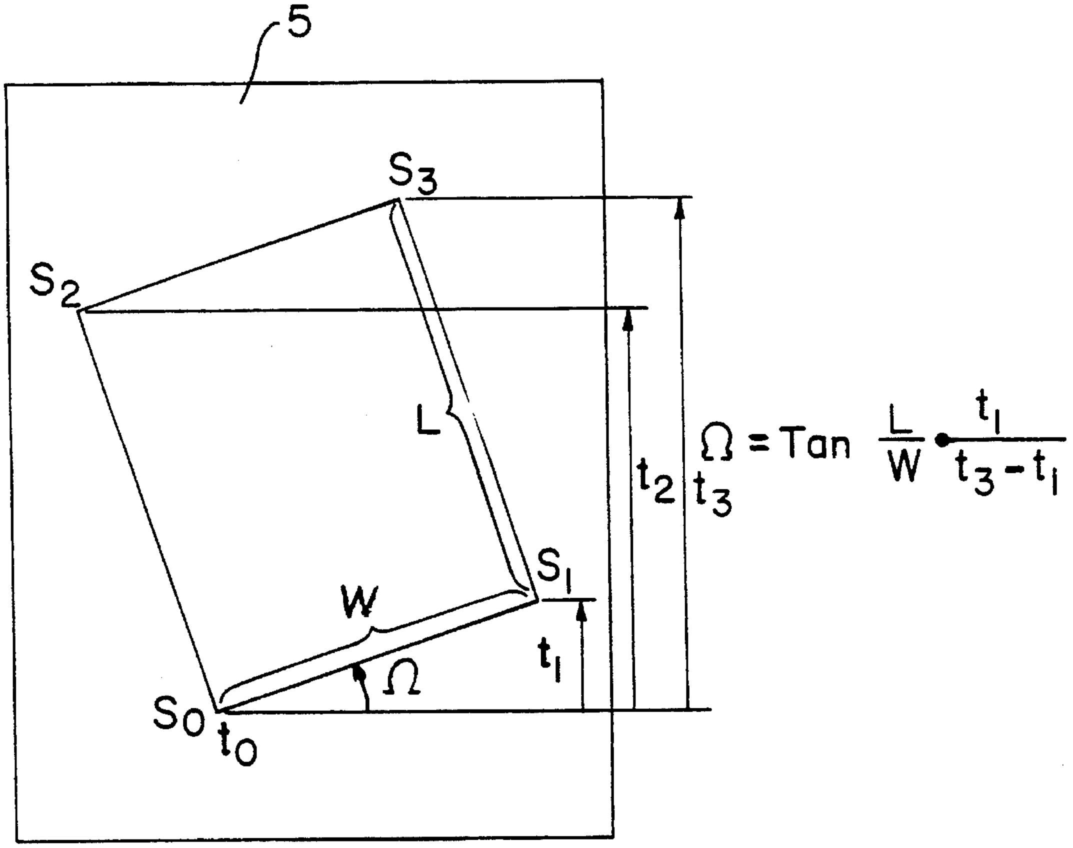
FIG. 33 illustrates an example of a system for optimizing the angular orientation of a hard copy image generated by an image display screen of a tablet.

FIG. 33 illustrates an example of a system for optimizing the angular orientation of a hard copy image generated by an image display screen of a tablet. FIG. 33 shows, in schematic form, the image display screen 6 of a tablet 1 in position on top of a copier window 5. The relative position of the image display screen 6 and the copier window 5 may be different each time the tablet 1 is placed on the copier window 5. Consequently, the image displayed by the tablet 1 may occasionally be skewed or misaligned relative to the copier window 5.

As shown in FIG. 33, the tablet 1 defines a rectangle. Each of the four corners of the rectangle may be provided with a corresponding light detecting sensor S. Each one of the four sensors S may provide information to the tablet's microprocessor.

As further shown in FIG. 33, the angle of skew or misalignment between the tablet 1 and the copier window 5 may be designated by Ω. If there is virtually no misalignment between the tablet 1 and the copier window 5, then Ω is approximately equal to zero.

In the embodiment illustrated in FIG. 33, the light source of the copier scans across the copier window 5 in an upward direction, from the bottom of the page towards the top of the page (as shown by the upward pointing arrows $t_1$, $t_2$ and $t_3$). Consequently, each of the four sensors S is first exposed to light from the copier light source at a different point in time. As shown in FIG. 33, for example, light from the copier light source will expose sensor $S_O$ first, sensor $S_1$ second, sensor $S_2$ third and sensor $S_3$ fourth. The time intervals between exposure of the different sensors S will be determined by the length L, width W and angular orientation of the tablet 1.

The time at which the first sensor $S_O$ is exposed to the copier 4 light source may be represented by $t_0$. The elapsed time between exposure of the first sensor $S_O$ and exposure of the second sensor $S_1$ may be represented by $t_1$. Similarly, the elapsed time between exposure of the first sensor $S_O$ and the third sensor $S_2$ may be represented by $t_2$, and the elapsed time between exposure of the first sensor $S_0$ and the fourth sensor $S_3$ may be represented by $t_3$.

The width W and length L of the tablet 1 are known constants that may be stored in the tablet's microprocessor. The angle Ω between the actual angular position of the image and the desired angular position of the image may be calculated by the microprocessor, based upon the information received from the sensors S, in accordance with the following formula:

$$\Omega=\text{Tan}^{-1}\ (L/W)*(t_1/(t_3-t_1))$$

The microprocessor thus uses the information received from the sensors S to electronically calculate the angle Ω. Once Ω has been determined, the tablet 1 may be physically rotated by the calculated angle Ω to thereby move the image to the desired angular orientation. Alternatively, the microprocessor may use the information received from the sensors S to electronically rotate the image by an angle Ω, from the image's present angular orientation to the image's desired angular orientation. Any number of known techniques may be used to electronically rotate the image by the calculated angle Ω.

Figure 34:
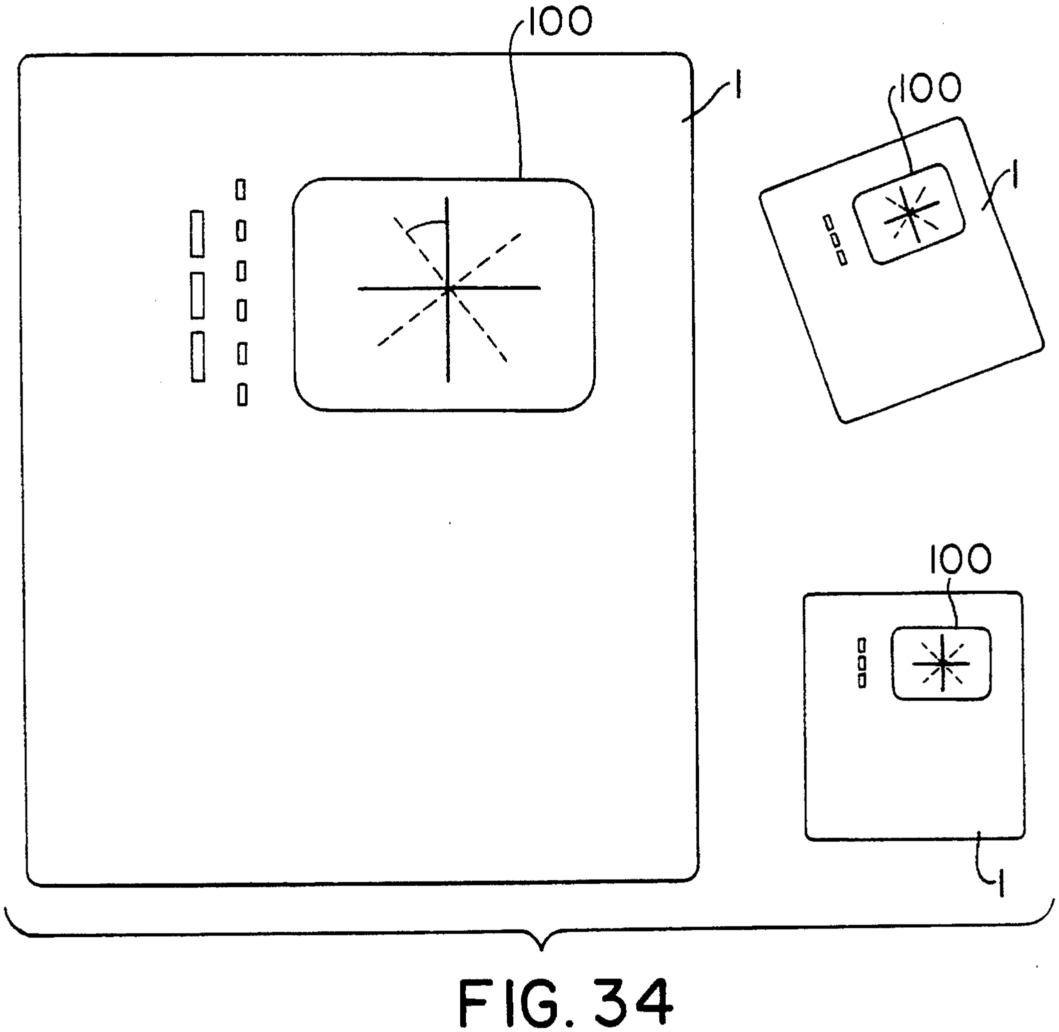
FIG. 34 illustrates an example of an operator's console screen that may be provided on the back of a tablet to visually illustrate a calculated skew angle.

FIG. 34 illustrates an example of an operator's console screen 100 that may be provided on the back of the tablet 1 to visually illustrate the calculated angle Ω. The unbroken cross bars in FIG. 34 depict the image's desired angular orientation. The broken cross bars depict the image's present angular orientation. The angle between the unbroken and broken cross bars corresponds to the skew angle Ω.

Figure 35:
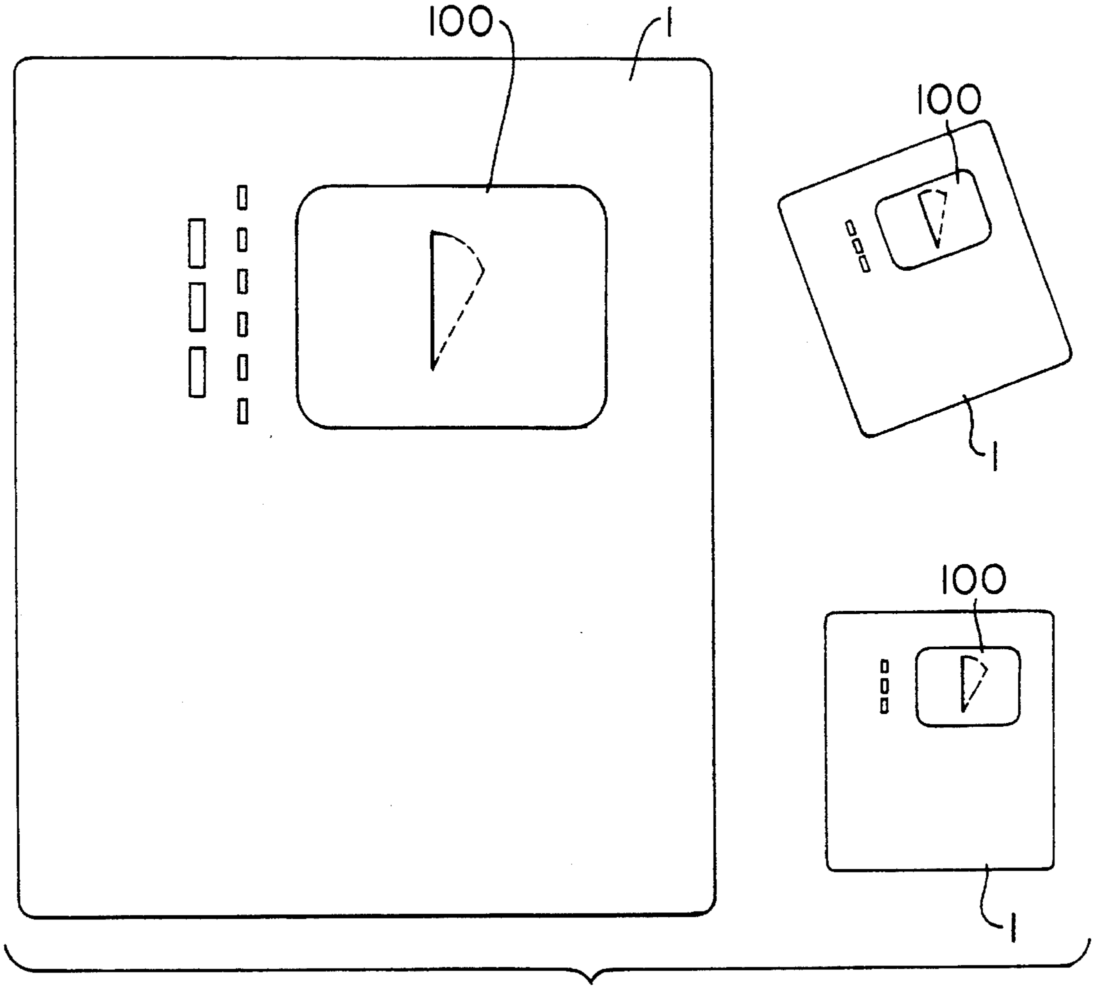
FIG. 35 illustrates an example of an alternative display in which a skew angle $\Omega$ is depicted as an arc of a circle.
Figure 36A:
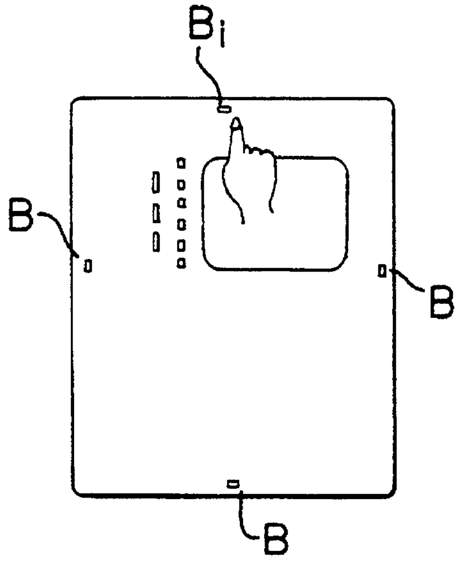
FIG. 36*a* shows a set of buttons used to assist in producing hard copy on a copier.
Figure 36C:
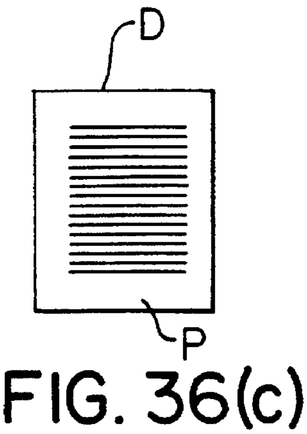
FIG. 36*c* shows a hard copy page that has been correctly imaged by the copier, with alignment dot D at the upper margin of the printed sheet.
Figure 36B:
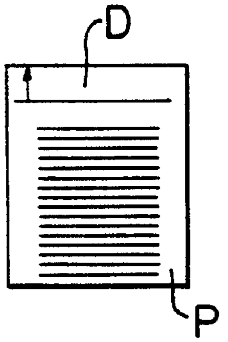
FIG. 36*b* shows a hard copy page with an improperly positioned image. The dot D is below the top margin of the printed sheet, so the tablet must be shifted upward.
Figure 36D:
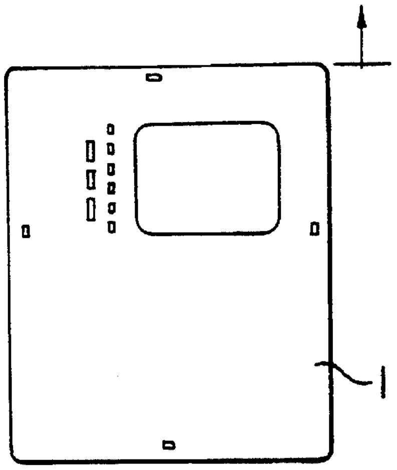
FIG. 36*d* shows a tablet being shifted in a direction to form a correctly aligned image by a copier.

FIG. 35 illustrates an example of an alternative display in which Ω is depicted as an arc of a circle.

FIG. 36 illustrates an example of a system for optimizing the rectilinear orientation of a hard copy image generated by an image display screen of a tablet. The illustrated system enables the user to define one or more points on the printed page, and then move the image and/or tablet relative to the copier window so that the rectilinear orientation of the image may be optimized.

As shown in FIG. 36(*a*), four buttons B may be provided on the back of the tablet 1. Each one of the four buttons B is associated with a corresponding one of the four edges of the tablet 1. The buttons B provide data input to the tablet's microprocessor. Depressing any one of the buttons B will cause the tablet 1 to produce an image of a dot D on the image display screen. The dot image will be located on the edge of the image display screen, at a position substantially corresponding to the location of the depressed button B. The hard copy output P of the copier will then include a printed dot D at a location on the page P corresponding to the depressed button B, as illustrated in FIG. 36(*b*). Optionally, each button B on the back of the tablet 1 may include a small LED or other light generating device, so that the button B is illuminated after it is depressed.

If the image is optimally aligned, then the dot D printed on the hard copy output P will appear substantially adjacent the edge of the printed page (see FIG. 36(*c*)). The degree to which the printed dot D is spaced from the edge of the printed page P indicates the degree to which the image must be shifted to correct the rectilinear alignment of the image (see FIG. 36(*b*)).

Once the distance of the dot D from the edge of the page P has been determined, the tablet 1 may be physically shifted by the indicated distance to thereby move the image to the desired rectilinear orientation (see FIG. 36(*d*)). Alternatively, the image may be shifted electronically from the image's present rectilinear orientation to the image's desired rectilinear orientation. Any number of known techniques may be used to electronically shift the image by the required distance.

Figure 37:
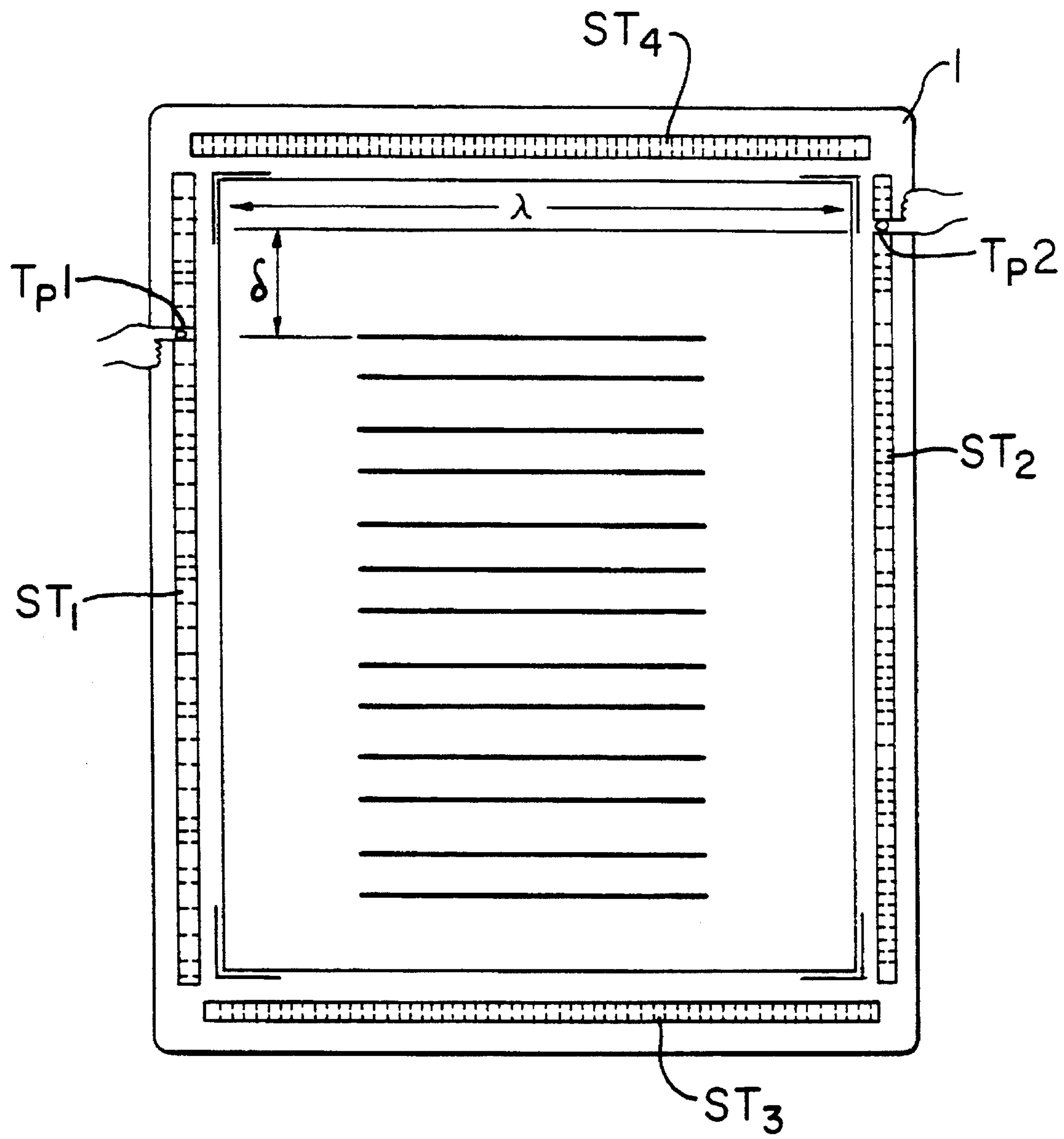
FIG. 37 illustrates an example of an alternative system for optimizing the rectilinear orientation of an image on a printed page.

FIG. 37 illustrates an example of an alternative system for optimizing the rectilinear orientation of the image on the printed page. As shown in FIG. 37, the back of the tablet 1 defines a rectangular frame configured to receive a printed page P from a copier. The rectangular frame defines four edges. Each of the four edges is provided with a corresponding electronic touch sensitive strip ST. The touch sensitive strips TS provide information to the tablet's microprocessor.

In the example shown in FIG. 37, the strip $TS_1$ illustrated on the left hand edge of the frame is designated as a "FROM" strip. The strip $TS_2$ illustrated on the right hand edge of the frame is designated as a "TO" strip. Similarly, the strip $TS_3$ illustrated on the lower edge of the frame is designated as a "FROM" strip, while the strip $TS_4$ illustrated on the upper edge of the frame is designated as a "TO" strip.

In operation, a printed page P from a copier is first placed into the frame on the back of the tablet 1. In the example illustrated in FIG. 37, the printed page P contains several lines of printed text. If the user wishes to shift the image upward, as shown in FIG. 37, then the user first touches a point on the left hand "FROM" strip $TS_1$ corresponding to the actual location of the first line of text on the printed page P. This sends an electronic signal to the microprocessor indicating the present position of the printed image. Next, the user touches a point on the right hand "TO" strip $TS_2$ corresponding to the desired location of the first line of text on the printed page P. This sends an electronic signal to the microprocessor indicating the desired position of the printed image. The microprocessor than uses the information received from the "FROM" and "TO" strips to electronically shift the image upward, from the image's present orientation (as indicated by the "FROM" strip signal) to the image's desired orientation (as indicated by the "TO" strip signal). Pages that are subsequently printed by the copier will provide images that are shifted upward by the indicated amount.

In a similar manner, the top and bottom edge strips may be used to reorient the printed image horizontally. If, for example, the user wishes to shift the image rightward, as shown in FIG. 37, then the user first touches a point on the lower edge "FROM" strip $TS_3$ corresponding to the actual location of the text on the printed page P. Next, the user touches a point on the upper edge "TO" strip $TS_4$ corresponding to the desired location of the text on the printed page P. The microprocessor than uses the information received from the "FROM" and "TO" strips to electronically shift the image rightward, from the image's present orientation (as indicated by the "FROM" strip signal) to the image's desired orientation (as indicated by the "TO" strip signal). Pages that are subsequently printed by the copier will provide images that are shifted rightward by the indicated amount.

It should be appreciated that either strip of the pair of strips parallel to the length of the tablet, or of the pair of strips parallel to the width of the tablet, may serve as a "FROM" strip or as a "TO" strip. The designation of "FROM" or "TO" is relative to which strip of the pair is touched first.

Figure 38:
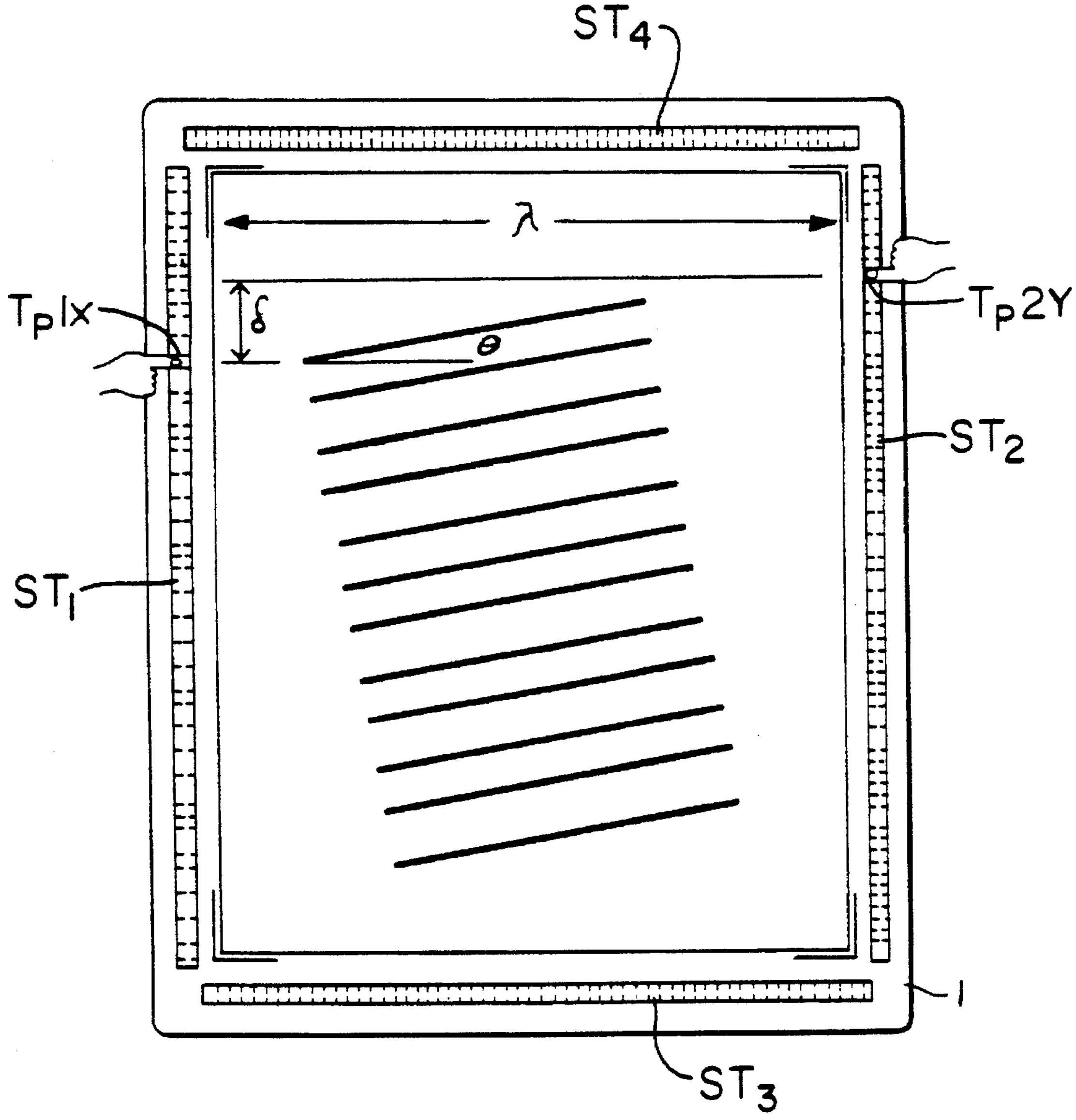
FIG. 38 illustrates an example of an alternative system for optimizing the angular orientation of an image on a printed page.

FIG. 38 illustrates an example of an alternative system for optimizing the angular orientation of the image on the printed page P. The system for optimizing angular orientation shown in FIG. 38 is essentially similar to the system for optimizing rectilinear orientation shown in FIG. 37.

As shown in FIG. 38, the back of the tablet 1 defines a rectangular frame configured to receive a printed page P from a copier. The rectangular frame defines four edges. Each of the four edges is provided with a corresponding electronic touch sensitive strip ST. The touch sensitive strips TS provide information to the tablet's microprocessor.

In the example shown in FIG. 38, the strip $TS_1$ illustrated on the left hand edge of the frame is designated as a "FROM" strip. The strip $TS_2$ illustrated on the right hand edge of the frame is designated as a "TO" strip. Similarly, the strip $TS_3$ illustrated on the lower edge of the frame is designated as a "FROM" strip, while the strip $TS_4$ illustrated on the upper edge of the frame is designated as a "TO" strip.

In operation, a printed page P from a copier is first placed into the frame on the back of the tablet 1. In the example illustrated in FIG. 38, the printed page P contains several lines of printed text. If the user wishes to rotate the image clockwise by an angle θ as shown in FIG. 38, then the user first touches a point on the left hand "FROM" strip $TS_1$ corresponding to the actual location of the first line of text on the printed page P. This sends an electronic signal to the microprocessor indicating the present position of the printed image. Next, the user touches a point on the right hand "TO" strip $TS_1$ corresponding to the desired location of the first line of text on the printed page P. This sends an electronic signal to the microprocessor indicating the desired position of the printed image.

The width λ of the printed page P is a known constant that may be stored in the microprocessor memory. The vertical distance between the actual location of the image and the desired location of the image may be calculated by the microprocessor, based upon the information received from the "FROM" and "TO" strips. The desired angle of rotation θ may also be calculated by the microprocessor in accordance with the following formula:

$$\theta = \mathrm{Tan}^{-1}\delta/\lambda$$

The microprocessor thus uses the information received from the "FROM" and "TO" strips to electronically rotate the image clockwise by an angle θ from the image's present angular orientation to the image's desired angular orientation. Pages that are subsequently printed by the copier will provide images that are rotated by the indicated amount.

Embodiments of the present invention enable a conventional copier to function as a "receiving end" facsimile printer. In one embodiment a facsimile module may be plugged into the tablet to enable fax data transmitted over standard telephone lines to be intercepted, interpreted, and converted into displayable form. Once present on an image forming screen, the graphical data may be reproduced by a copier. The facsimile information may be directly viewed off of the image forming screen, and thus need not be printed unless desired.

In this manner the present invention provides for both "optical fax" and conventional "hard copy fax" and permits the user to inspect a transmitted document in its entirety before deciding whether all or only portions are to be printed. Variations on this theme include embodiments possessing document scanning capabilities, so that data transmission is possible, in addition to data reception. Other embodiments may be equipped with storage means so that incoming data may be saved, then printed in a time-shifted fashion at another moment. The information received via fax transmission may include both visual information as well as audio information.

Examples of systems that use the present invention as a fax device are discussed in greater detail below in connection with FIGS. 39 through 52.

Figure 39:
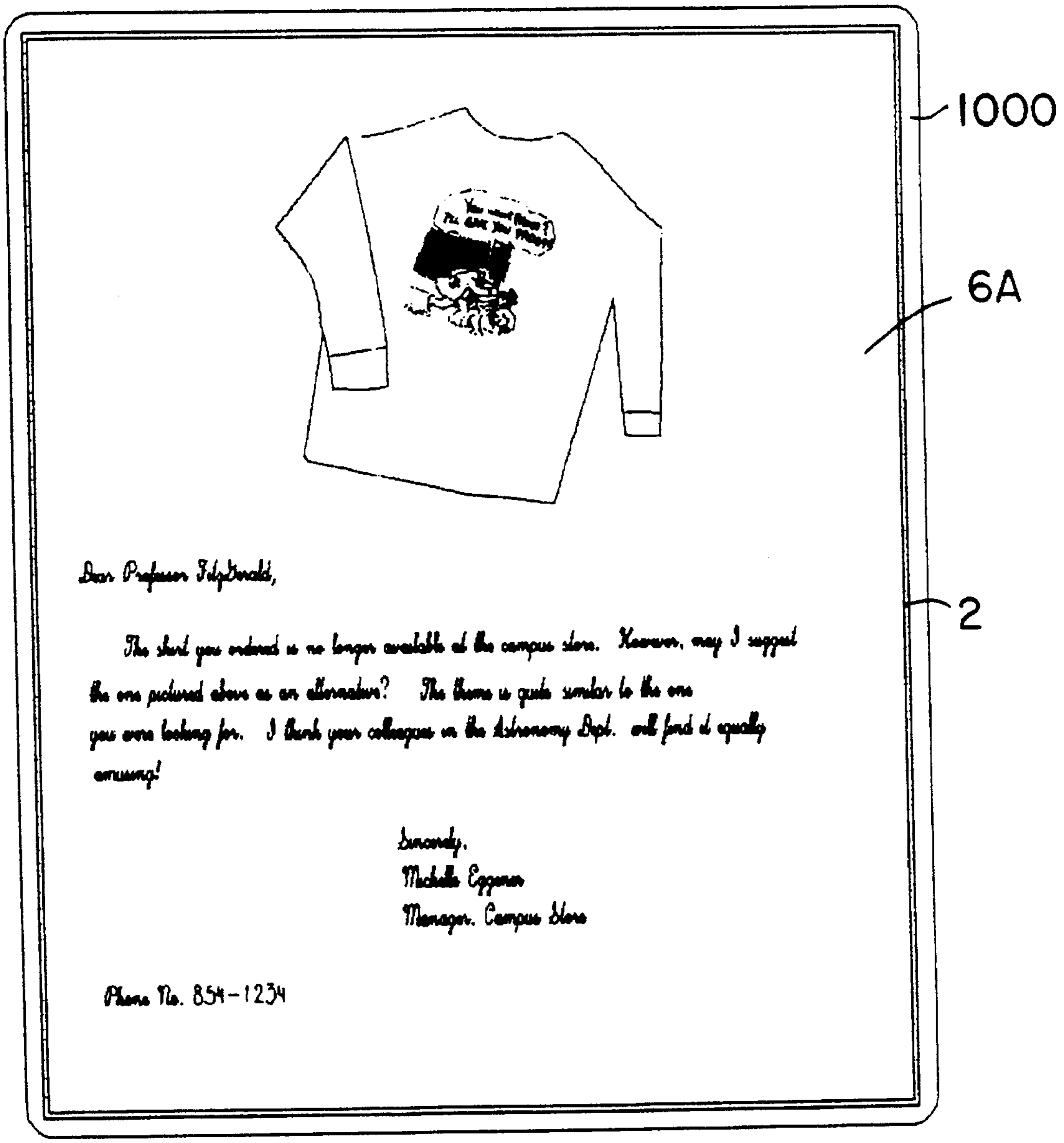
FIG. 39 illustrates an example of how a fax document might appear displayed on an image display screen of a fax tablet.

FIG. 39 illustrates an example of how a fax document might appear displayed on the image display screen 6A of a fax tablet 1000. As shown in FIG. 39, the fax document includes the image of a shirt, a body of handwritten text, and a telephone number. Also represented in the figure is a light gasket 2, located along the perimeter of the display element 6A. The light gasket performs the function of keeping stray, ambient light from leaking in between the display 6A of the tablet and the copier window of the copier while the tablet 1000 is being used with a copier to create hard copy.

Figure 40:
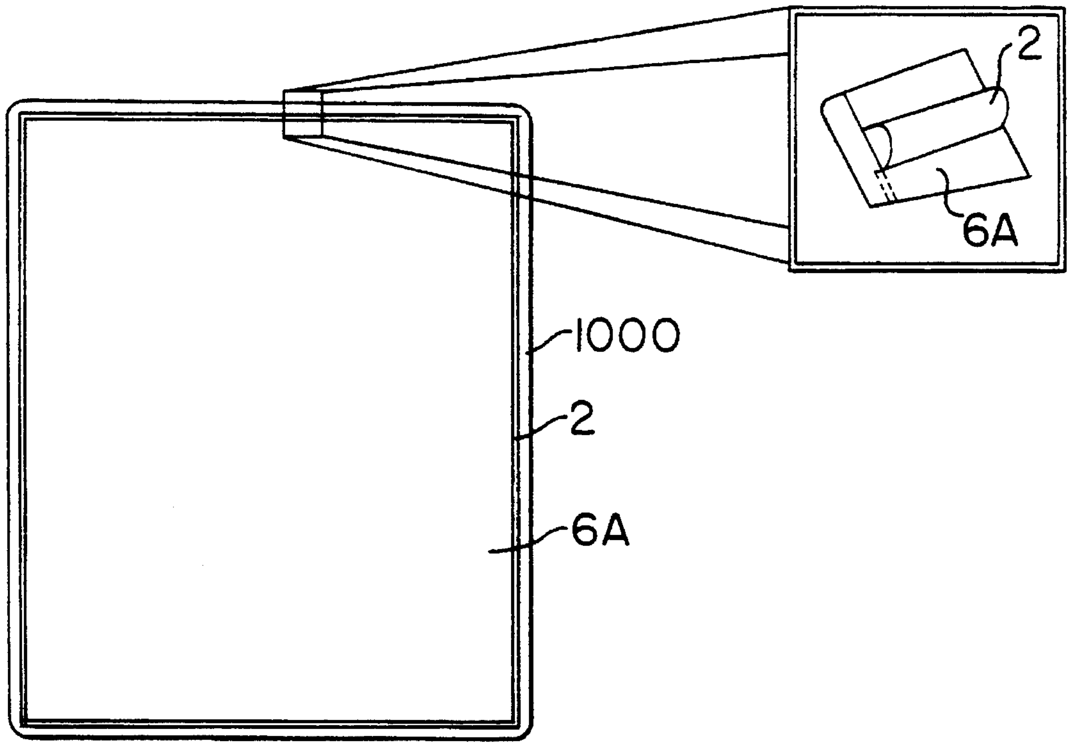
FIG. 40 illustrates an example of a light gasket of a fax tablet.

FIG. 40 illustrates an example of the light gasket 2 of the fax tablet 1000. A portion of the tablet 1000 is shown in an enlarged view to better illustrate the light gasket 2. As shown, the light gasket 2 is in the form of a soft, deformable material layer situated along the perimeter of the display element 6A, that is minutely elevated above the surface of the display screen. The light gasket 2 may be constructed of any suitable, flexible material (e.g. rubber).

Figure 41A:
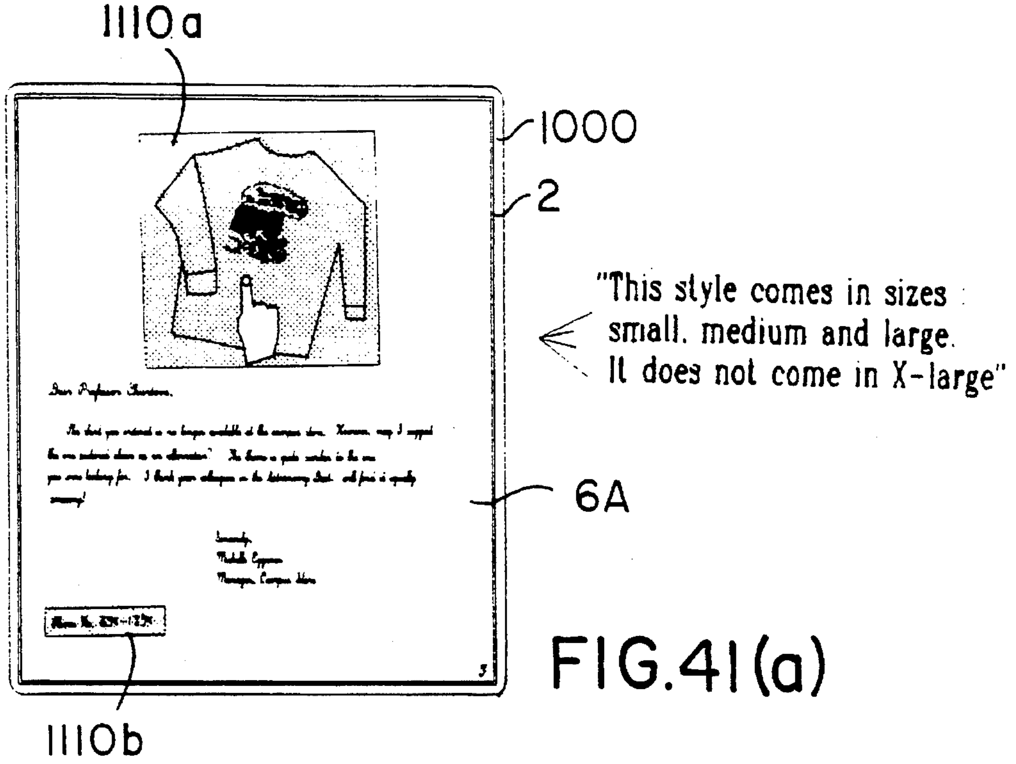
FIG. 41*a* shows a fax document that has been received by the apparatus. Electronic audio information linked to one portion of the document is being played back.
Figure 41B:
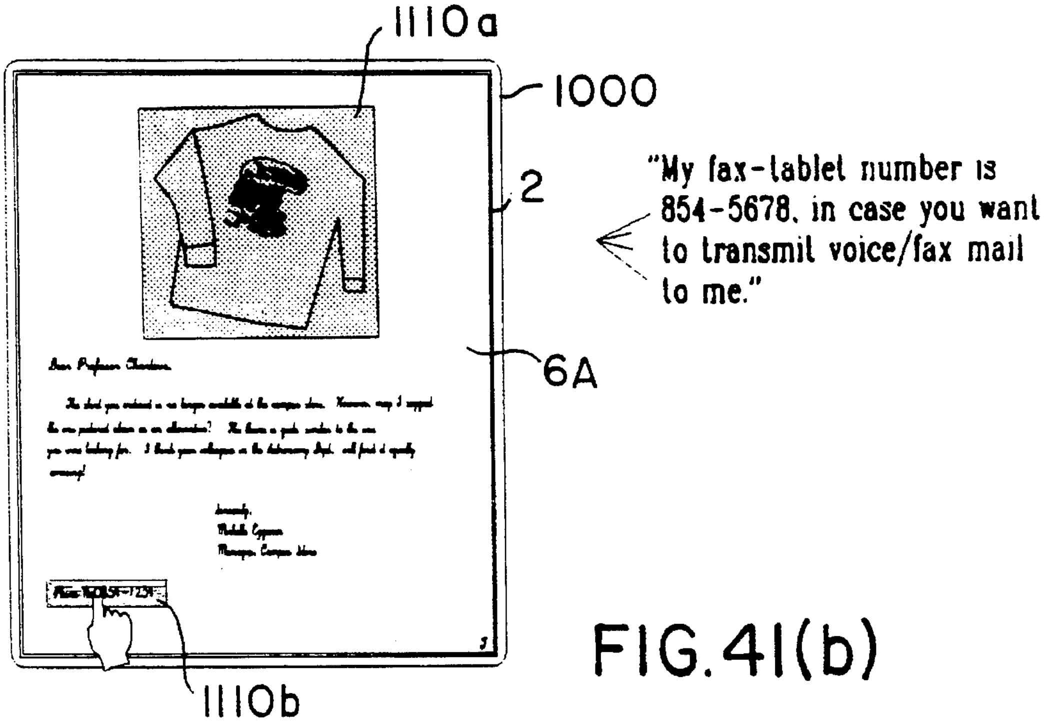
FIG. 41*b* shows the playback of another linked audio message.

FIGS. 41(*a*) and (*b*) illustrate an example of a procedure for retrieving "Voice Notes" from fax documents containing audio components. "Voice Notes" and "Audio Overlays" are novel features of the present fax unit. They permit an audio component, such as a note or memo dictated in the voice of a person sending a fax document, to be incorporated into otherwise conventional fax transmissions. The present invention enables audio overlays to be incorporated into hard copy fax documents. This permits voice notes to be accessible not only from just-received fax documents, but from fax documents that may have been received long ago, as well as from ones that may have been received by fax units other than the one currently in use. As will be seen, a preferred method employed by the present invention to incorporate audio signals into hard copy fax documents preserves the "look and feel" of the conventional, plain paper fax documents.

Looking now at FIG. 41(*a*), the fax document first appearing in FIG. 39 may again be seen on the display screen 6A of the fax tablet 1000. Depicted are a picture of a shirt, a body of handwritten text, and a telephone number. Both the image of the shirt 1110*a* and the telephone number 1110*b* are graphically enclosed by boxes that are darkened or otherwise highlighted. These highlighted boxes indicate that there are audio messages associated with the highlighted portions of the fax letter.

The image-forming screen 6A of the fax tablet 1000 is an ATM-style touch-sensitive screen. By touching any of the highlighted regions appearing on the screen 6A, the user may play back the audio message associated with the highlighted portion of the document. A loudspeaker (not shown) included in the tablet may be used to play back the audio messages.

FIGS. 41(*a*) and (*b*) illustrate an example of a procedure for playing back the audio component of a fax message. By touching the highlight box 1110*a* enclosing the image of the shirt as shown in FIG. 41(*a*), the user causes the tablet 1000 to play back an audio message stating that "This style comes in sizes small, medium and large. It does not come in extra large." By touching the highlight box enclosing the telephone number 1110*b* as shown in FIG. 41(*b*), the user will cause the tablet 1000 to play back a received audio message stating that "My fax tablet number 854-5678, in case you want to transmit voice/fax mail to me."

Figure 42A:
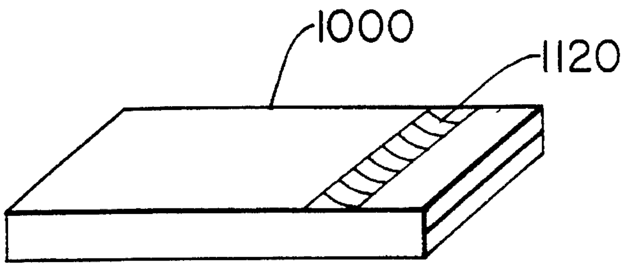
FIG. 42*a* shows a fax tablet equipped with a document scanner for scanning hard copy documents.
Figure 42:
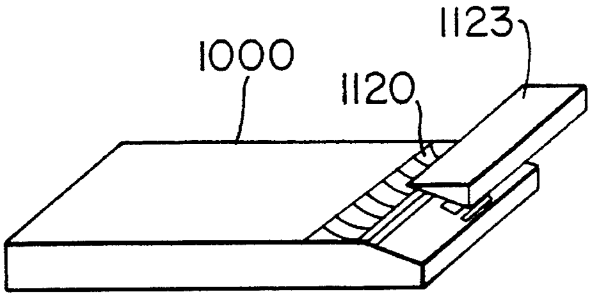
FIG. 42*b* shows a cutaway view of the fax tablet to reveal the scanning assembly.
FIG. 42*c* shows the portion of the scanner assembly that processes electronic data storage media associated with hard copy documents.
FIG. 42*d* shows the portion of the scanner assembly that processes the optical component of hard copy documents.
Figure 42:
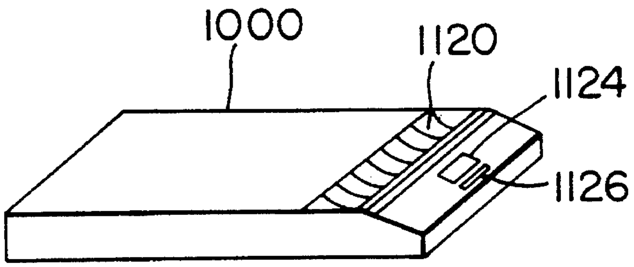
Figure 42:
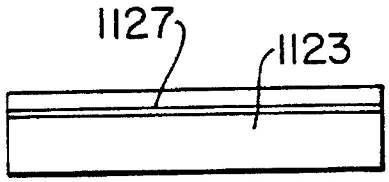

FIGS. 42(*a*)–(*d*) illustrate an example of the document scanner facility of the fax tablet 1000. The document scanner facility includes both an audio subassembly and a conventional graphic sub-assembly. The audio assembly includes two sub-components: an audio read/write head, and an "audio patch" applicator.

In FIG. 42(*a*), a document input tray 1120 is shown. The user would place a document into the document input tray 1120 to have the document processed by the document scanner facilities. A document input through the document scanner tray 1120 is transported through the scanner assembly and exits at exit slit 1121. FIG. 42(*b*) illustrates the removal of a part 1123 of the tablet 1000 so as to reveal the components of the scanner assembly. FIG. 42(*c*) shows the audio components of the scanner assembly. Audio read/write means 1126 are pictured as well as an "audio patch" applicator 1124. The audio read/write means 1126 performs the function of reading from and/or writing to an audio patch as a document is being transported through the scanning assembly. The audio read/write means 1126 may comprise a magnetic read/write head, similar to those used in tape recording equipment or to those employed to store and to retrieve data onto an from computer diskettes. The "audio patch" applicator 1124 is in essence a label applicator that applies adhesive labels, having, for instance, a magnetic recording surface layer coated onto the non-adhesive face, onto documents passing through the scanner pathway. FIG. 42(*d*) shows an optical scanner 1127 on the cut-away portion 1123 of the fax tablet 1000. The optical scanner 1127 may comprise a linear photodetector array similar to those found in optical scanners currently available.

The audio patch retains information for the audio component of a fax document, when the document possesses such a component. In a preferred embodiment, an audio path may comprise a small strip of flexible magnetic material, although other types of recording media may be used (e.g. optical). The substrate of an audio patch might be constructed of a flexible polymer, of treated paper, or it might be constructed of a flexible metal such as aluminum, onto which a recording medium may be applied. The audio patch applicator 1124 applies the audio patch to the back of a document sheet, generated by a copier. The audio patch technique of the present invention enables a fax document to retain the "look and feel" of a conventional, plain paper fax document. Yet it permits the document to retain audio information in addition to the conventional, graphical information.

An entire fax transmission, including both audio and visual information, may be received by the tablet 1000 from a remote audio-capable fax unit and stored in the tablet's memory. The visual information may be played back on the tablet's image display screen, while the audio information may be played back on the tablet's loudspeaker.

Figure 43A:
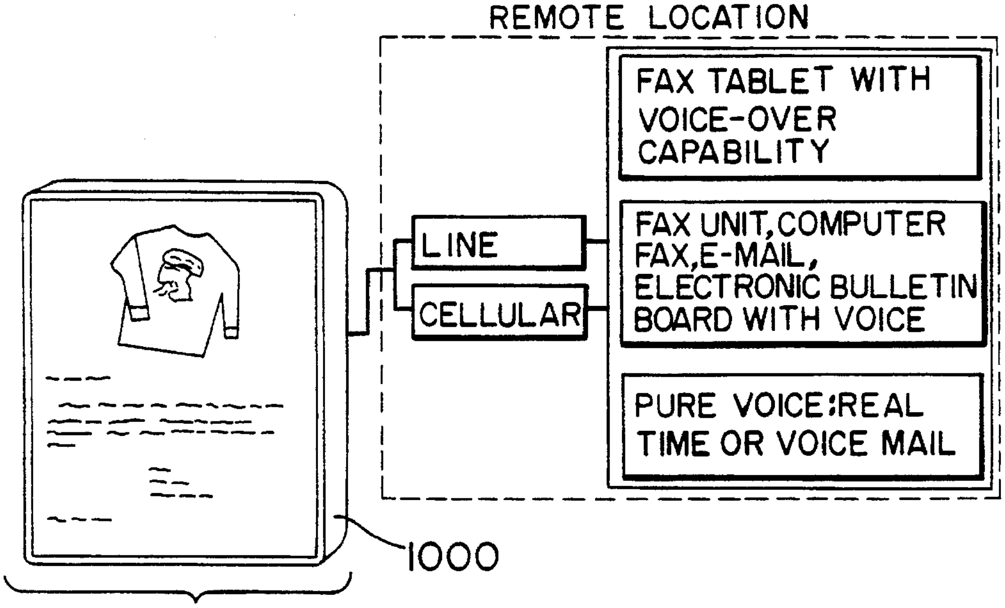
Figure 43B:
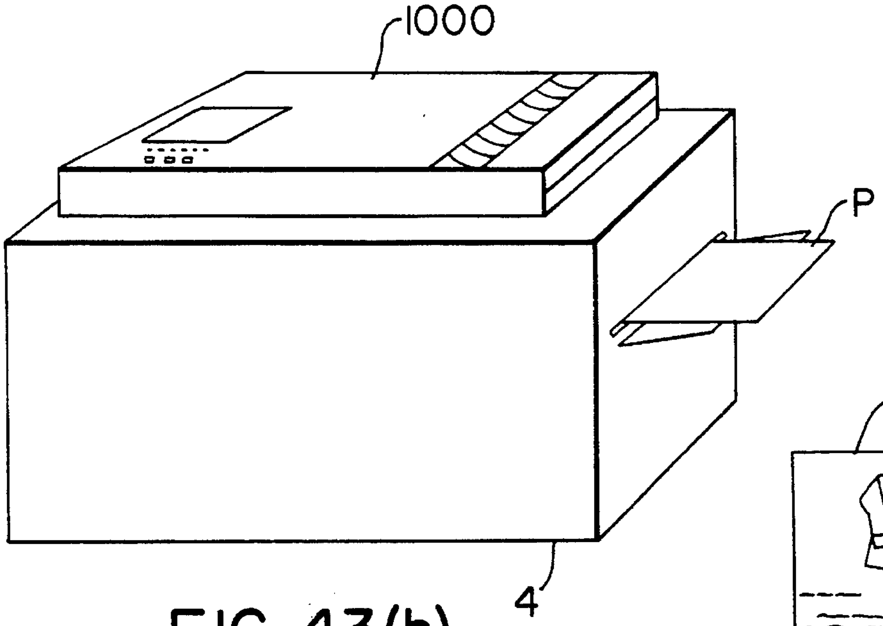
FIG. 43*b* shows the apparatus being used with a copier.
Figure 43C:
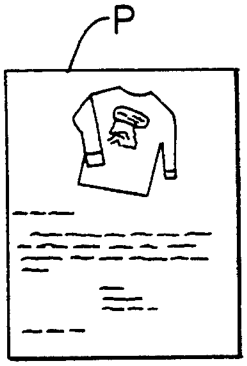
FIG. 43*c* shows a hard copy document produced by the apparatus with the copier.
Figure 44A:
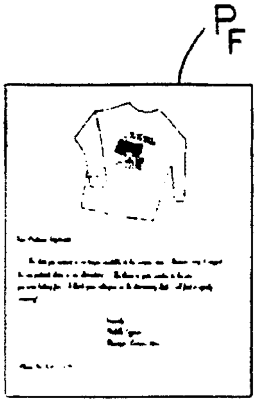
FIG. 44*a* shows the front face of a hard copy document produced by the apparatus.
Figure 44B:
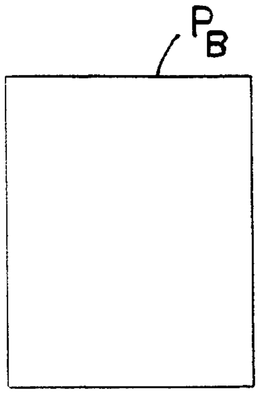
FIG. 44*b* shows the back face of a hard copy document produced by the apparatus.
Figure 44C:
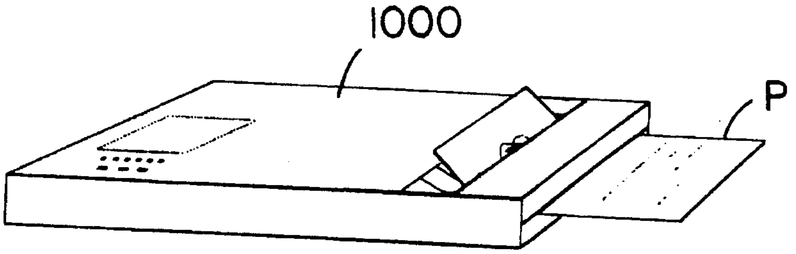
FIG. 44*c* shows the hard copy document of FIGS. 44*a* and 44*b* being processed by the scanner assembly of the apparatus.
Figure 44D:
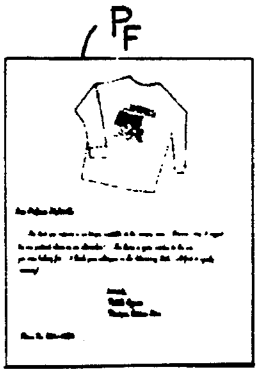
FIG. 44*d* shows the front face of the hard copy document after it has been processed by the apparatus.
Figure 44E:
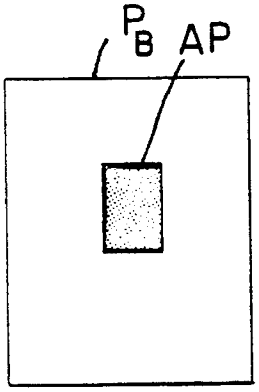
FIG. 44*e* shows the back face of the hard copy document after it has been processed by the apparatus, with an electronic data storage medium applied thereto.
Figure 45A:
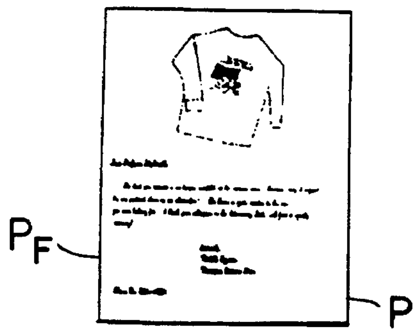
FIG. 45*a* shows the front face of a hard copy document, which already has an electronic data storage medium.
Figure 45B:
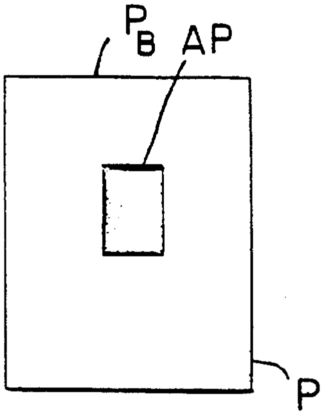
FIG. 45*b* shows the back face of a hard copy document which already has an electronic data storage medium.
Figure 45C:
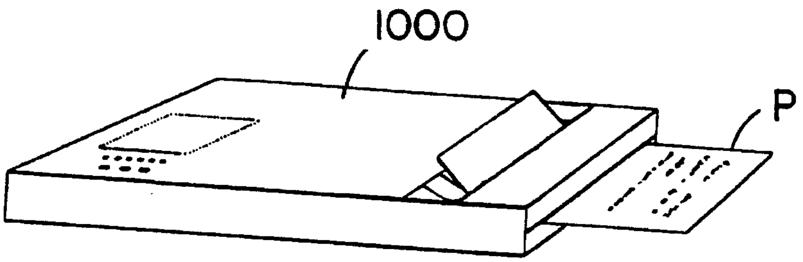
FIG. 45*c* shows the apparatus processing a hard copy document which already has an electronic data storage medium.
Figure 45D:
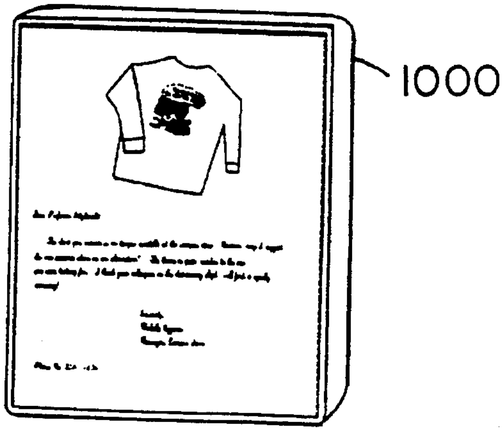
FIG. 45*d* shows an image on the display screen of the apparatus, which corresponds to the image on the front face of the hard copy document processed by the apparatus.
Figure 45E:
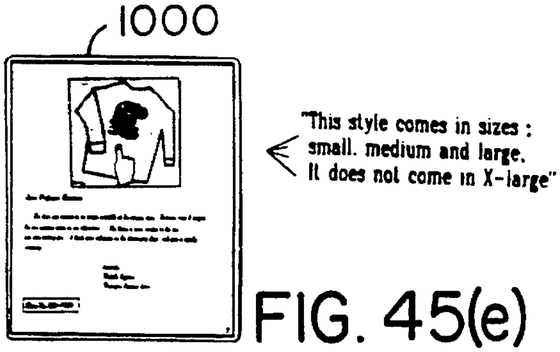
FIG. 45*e* shows access of one piece of linked electronic reference information.
Figure 45F:
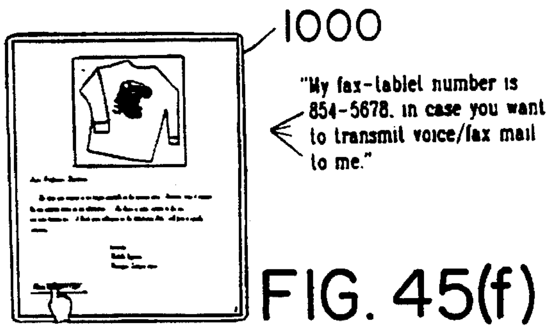
FIG. 45*f* shows access of another piece of linked electronic reference information.
Figure 46A:
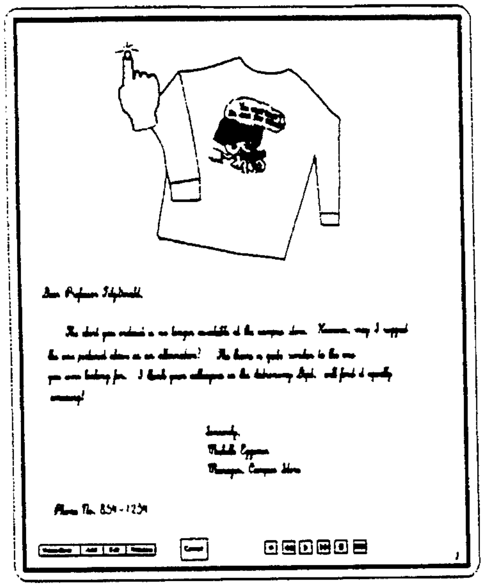
FIG. 46*a* shows a document to which audio messages may be added.
Figure 46B:
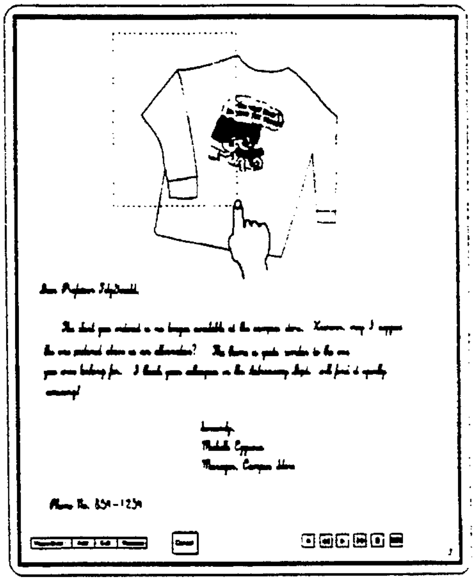
FIG. 46*b* shows defining a highlight box enclosing a portion of the document to which an audio passage may be added.
Figure 46C:
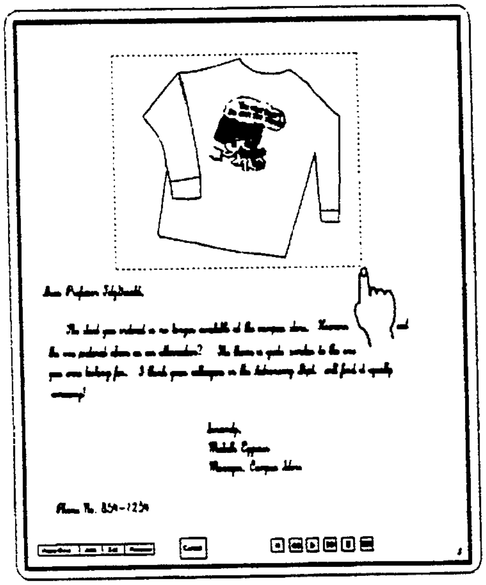
FIG. 46*c* shows a highlight box enclosing a portion of the document to which an audio passage may be added.
Figure 46D:
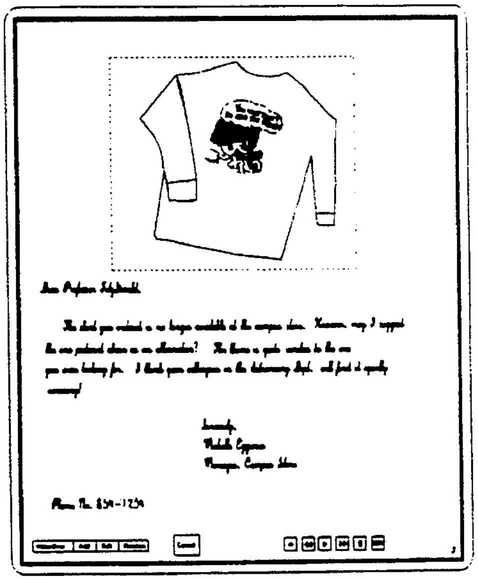
FIG. 46*d* shows a completed highlight box.

FIGS. 43 and 44 illustrate an example of the process of producing hard copy of an entire audio-fax document that includes the associated audio messages. The tablet 1000 may first be placed on a copier 4 and plain paper hard copy P may be generated by the copier in a manner previously described. The plain paper hard copy P (which is similar in appearance and mechanical properties to that produced by a conventional plain paper fax machine) may then be taken from the copier 4 and fed through the scanning assembly of the fax tablet 1000. As the sheet P is being fed through the scanning assembly, the audio patch applicator 1124 will generate an appropriate audio patch AP (based on the audio information in the tablet's memory) and will apply the audio patch AP to the back of the fax document P. The audio patch AP enables the user to keep the recording of the audio portion of the fax transmission.

FIGS. 44(*a*) and (*b*) respectively illustrate an example of the front and back of a page P printed by the copier 4. The back of the page P is blank and has not yet received an audio patch. The printed page P is fed into the scanning assembly as if the user were scanning the page for transmission. The audio patch AP is then applied to the back of the printed page P, as shown in FIG. 44(*e*).

In an alternative embodiment, the tablet may simply create an audio patch but not apply the audio patch to the back of the printed page. In such an embodiment, the audio patch may be manually applied to the back of the printed page as a separate procedure. The back of the printed page may be provided with printed guide markers to assist in positioning the audio patch.

FIG. 45 illustrates an example of a system for playing back a printed page P having an audio patch AP. FIG. 45(*a*) illustrates the front of the printed page P containing both text and graphic information. FIG. 45(*b*) illustrates the back of the printed page P to which an audio patch AP has been applied. The printed page P may be fed through the scanning assembly of the tablet 1000, as shown in FIG. 45(*c*). The text and graphic information on the front of the printed page P may be scanned by an optical scanner 1127, in a manner well known in the art. The text and graphic information scanned by the optical scanner 1127 may be stored in the memory and displayed on the display image display screen 6 (see FIG. 45(*d*)).

The audio patch AP on the back of the printed page P may be read by an audio read/write head 1126. The audio information read by the audio read/write head 1126 may be stored in the tablet's memory and played back through the tablet's loudspeaker.

The text and graphic information displayed by the image display screen may include highlight boxes (see FIGS. 45(*e*) and (*f*)). Touching a highlight box on the tablet's touch sensitive image display screen causes an associated audio message to be played back through the tablet's loudspeaker. This system enables the user to access the audio information of a fax transmission that may have been received years earlier, or that may have been received by another fax machine.

Figure 47A:
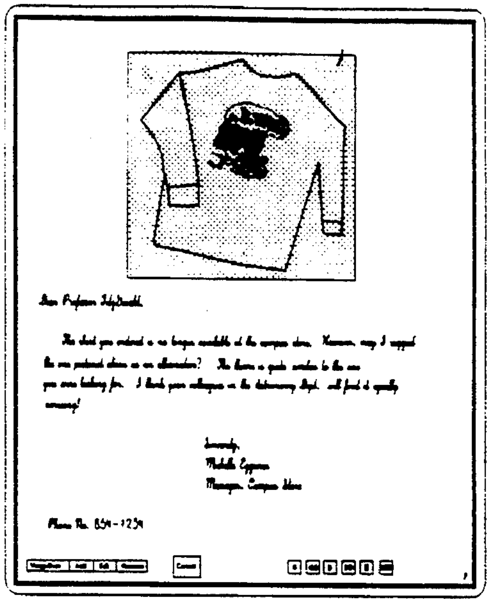
FIG. 47*a* shows a highlight box that is ready to be linked to an audio passage.
Figure 47B:
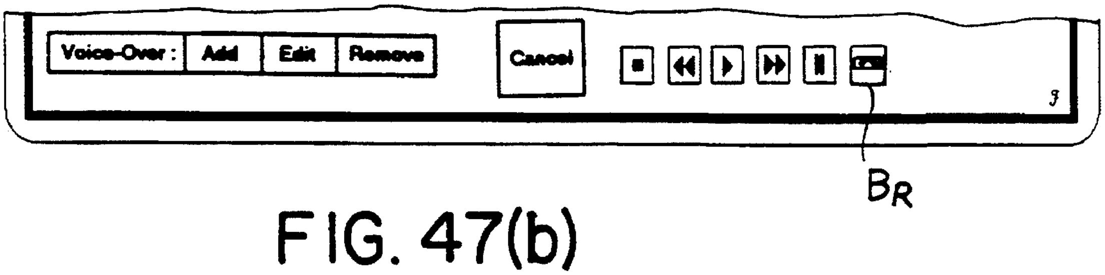
FIG. 47*b* shows buttons used in connection with audio passages.

FIGS. 46 and 47 illustrate an example of how the audio portion of a fax document may be recorded. In FIGS. 46(*a*) a user's finger is shown on the upper left corner of what will be an audio highlight box. In FIG. 46(*b*) the user's finger is shown dragging the bottom right corner of the forming highlight box to enclose the image of the shirt. In FIGS. 46(*c*) the image of the shirt has been completely enclosed within the borders of a highlight box. FIG. 46(*d*) portrays a completed highlight box defining a region of a fax document for which an audio message may now be recorded.

FIG. 47(*b*) shows an enlargement of several on-screen buttons, including a screen button having the icon of a tape cassette. The screen button may blink to indicate that a region of the document has been selected (highlighted) and is awaiting the recording of an audio message. The user touches the screen button having the icon of the tape cassette, to initiate the audio recording sequence, and begins speaking into a microphone supplied with the tablet. When the dictation of the audio message has been completed, the same screen button is again pressed. An audio overlay message has now been created for that particular, highlighted portion of the document. In FIG. 47(*a*) the highlight box is darkened to indicate that an audio message is present. In contrast, in FIG. 46(*d*) the highlight box is clear, and is formed of dotted lines. This indicates that a region has been defined for incorporation of an audio overlay, but that no audio message has yet been recorded.

While the audio overlay examples described above have involved human voice dictations, it is possible for audio overlays to comprise other forms of acoustic material. For example, a fax document containing a list of musical recordings, such as a listing of compact discs, may have a few seconds of sample music included with each title listed. Other varieties of acoustical information may also be with the audio overlays of the present fax unit.

A fax tablet in accordance with the present invention may communicate via either a cellular link or a conventional wire link. A fax tablet in accordance with the present invention may communicate with other, conventional fax machines that do not have audio message capabilities and that do not have image display screen capabilities.

Figure 48:
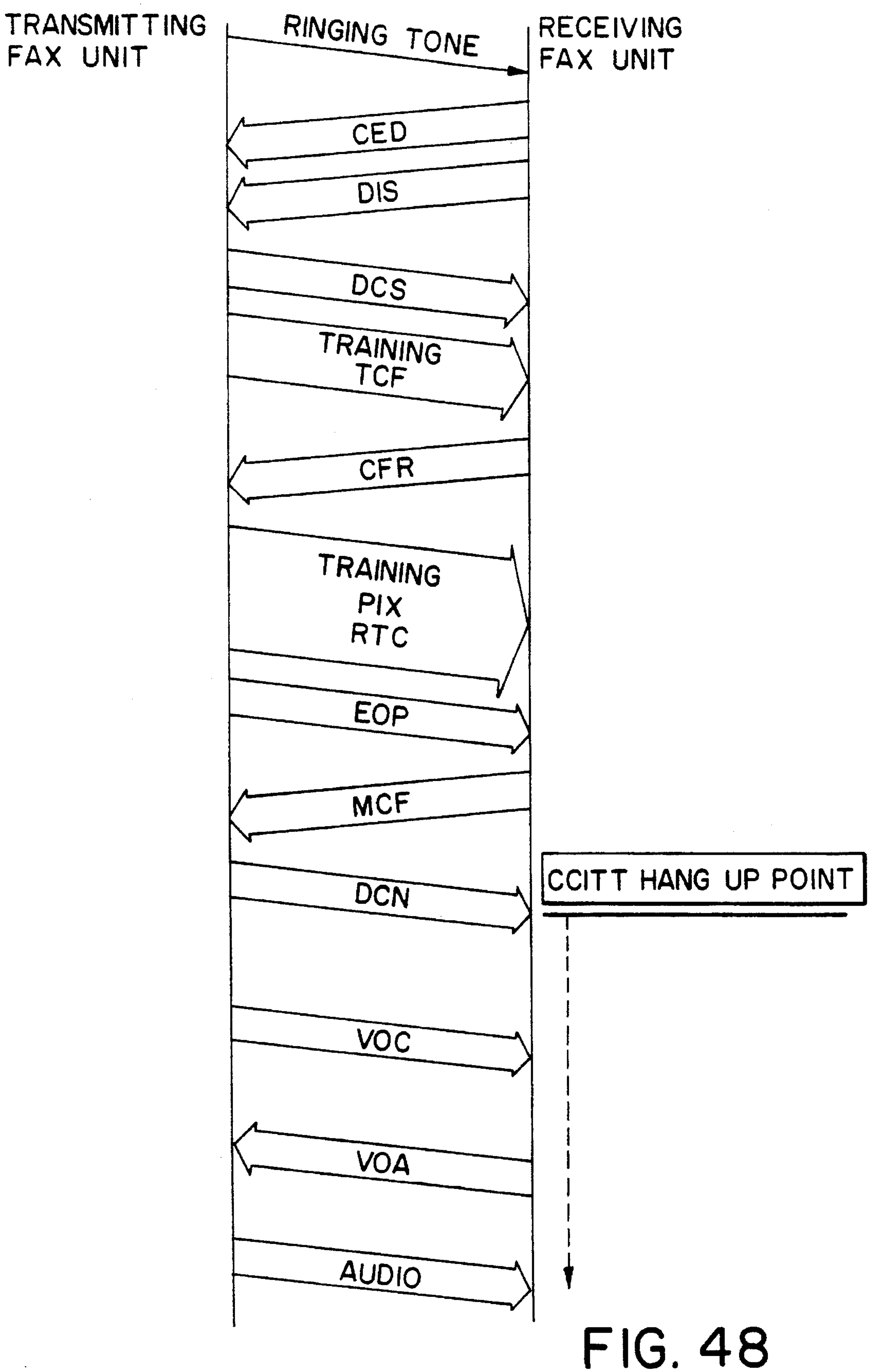
FIG. 48 illustrates an example of a communications protocol for fax transmission.

FIG. 48 illustrates an example of a communications protocol for fax transmission. The illustrated protocol enables a receiving fax unit having audio capability in accordance with the present invention to be used with both prior art transmitting fax units as well as transmitting fax units having audio capability.

As illustrated in FIG. 48, when the transmitting fax unit has completed transmitting conventional (i.e., non-audio) fax information, the transmitting fax unit transmits a disconnect signal ("DCN") to the receiving fax unit. A conventional receiving fax unit will hang up upon receipt of such a disconnect signal.

In the illustrated example, a receiving fax unit having audio capability in accordance with the present invention will not hang up immediately upon receipt of the disconnect signal. Instead, the receiving fax unit waits for a predetermined period of time (for example, fifteen seconds). If the transmitting fax unit is an audio capable unit, then the transmitting fax unit transmits an audio capable signal ("VOC") shortly after transmitting the conventional disconnect signal ("DCN"). If the audio capable receiving fax unit receives the audio capable signal from the transmitting fax unit, then the receiving fax unit sends an audio acknowledge signal ("VOA") back to the transmitting fax unit. Then, the transmitting fax unit begins transmitting the audio component of the fax transmission. After transmission of the audio component is completed, the transmitting unit sends another disconnect signal. The disconnect signal may be identical to the previously sent conventional disconnect signal ("DCN"), with the receiving fax unit being designed to hang up after receiving two cycles of disconnect signals.

Figure 49A:
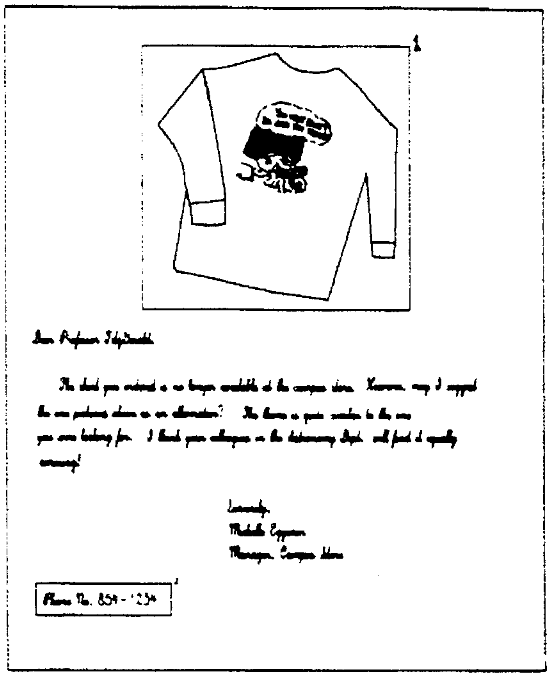
FIG. 49*a* shows a document having frames and numerals to indicate the linked portions.
Figure 49B:
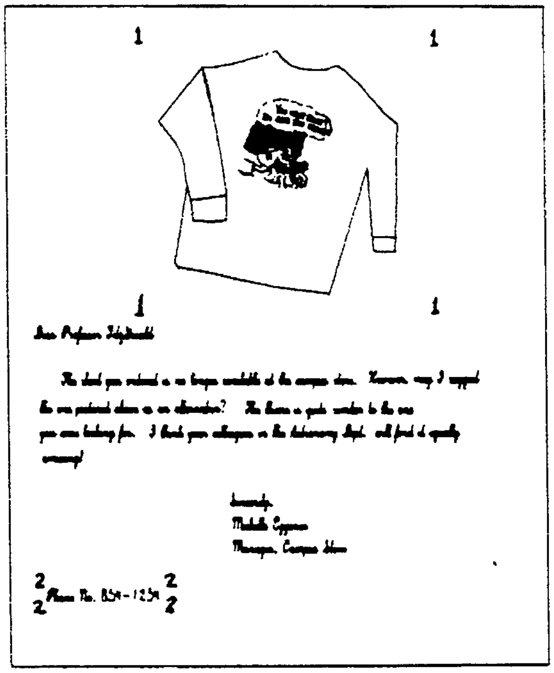
FIG. 49*b* shows a document having numerals delimiting the linked portions.

When a fax tablet displays a fax transmission, it may also be programmed to label each separate highlight box with a corresponding identification letter or numeral. FIGS. 49(*a*) and (*b*) illustrate examples of highlight boxes that are labeled with small superscript identification numerals. In the illustrated example, the highlight box containing the image of the shirt has been labeled with a superscript identification numeral "1", and the highlight box containing the telephone number has been labeled with superscript identification numeral "2". The primary purpose for such identification numerals is to allow a user to identify and play back specific audio messages without requiring the use of a touch sensitive image display screen.

Figure 50:
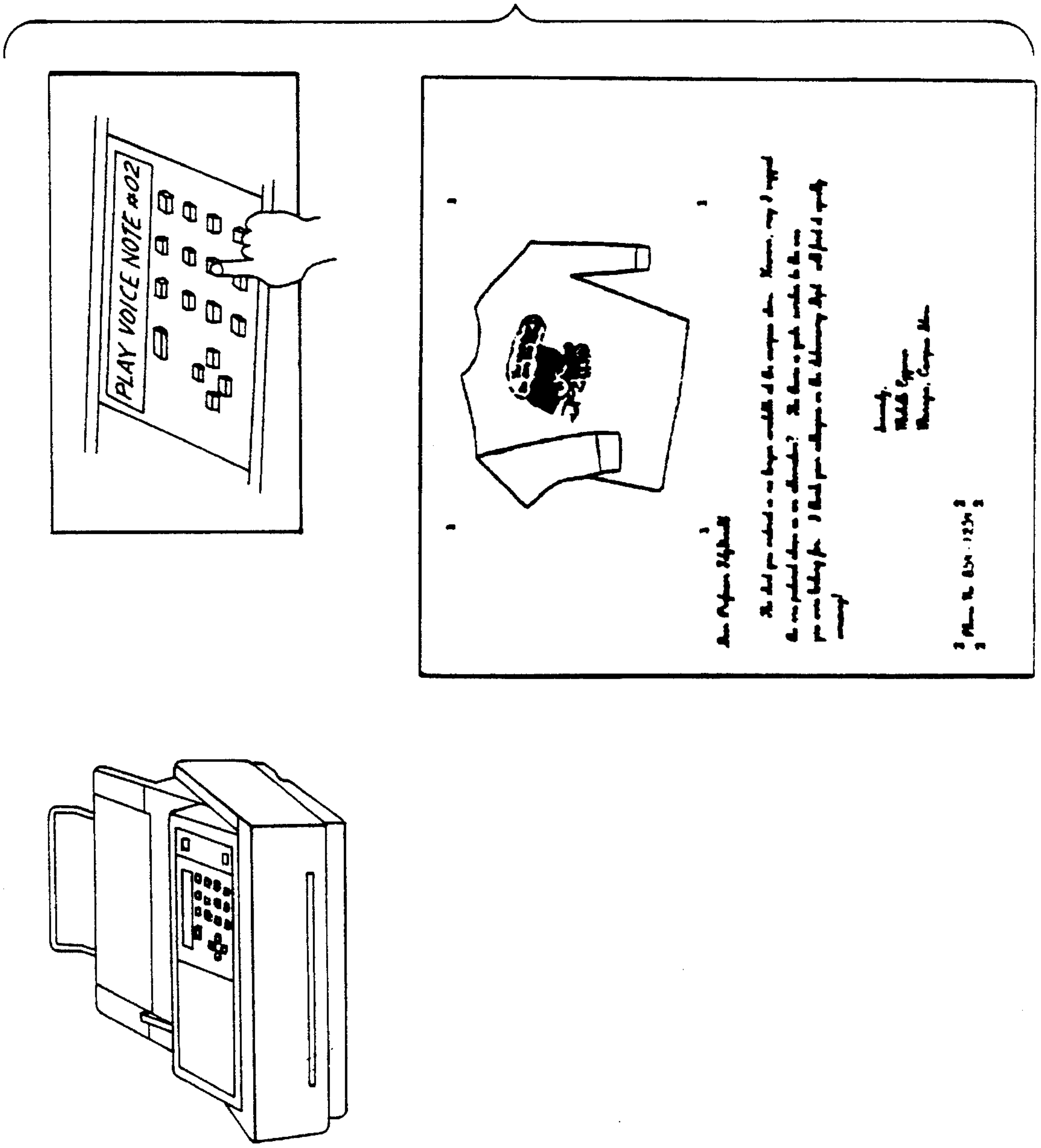
FIG. 50 illustrates an example of a voice capable desktop fax unit containing an image display screen that is not touch sensitive.

FIG. 50 illustrates an example of a voice capable desktop fax unit containing an image display screen that is not touch sensitive. In the illustrated example, if the user wanted to hear the audio message identified by the numeral "2" then the user would first place the fax document having an audio patch in the scanning tray of the desktop fax unit. The user would then push a button on the operator's console that says "play voice note #02". The document would be transported through the scanning assembly and an audio read/write means in the desktop fax unit would read and play back the audio message identified by the numeral "2".

Figure 51:
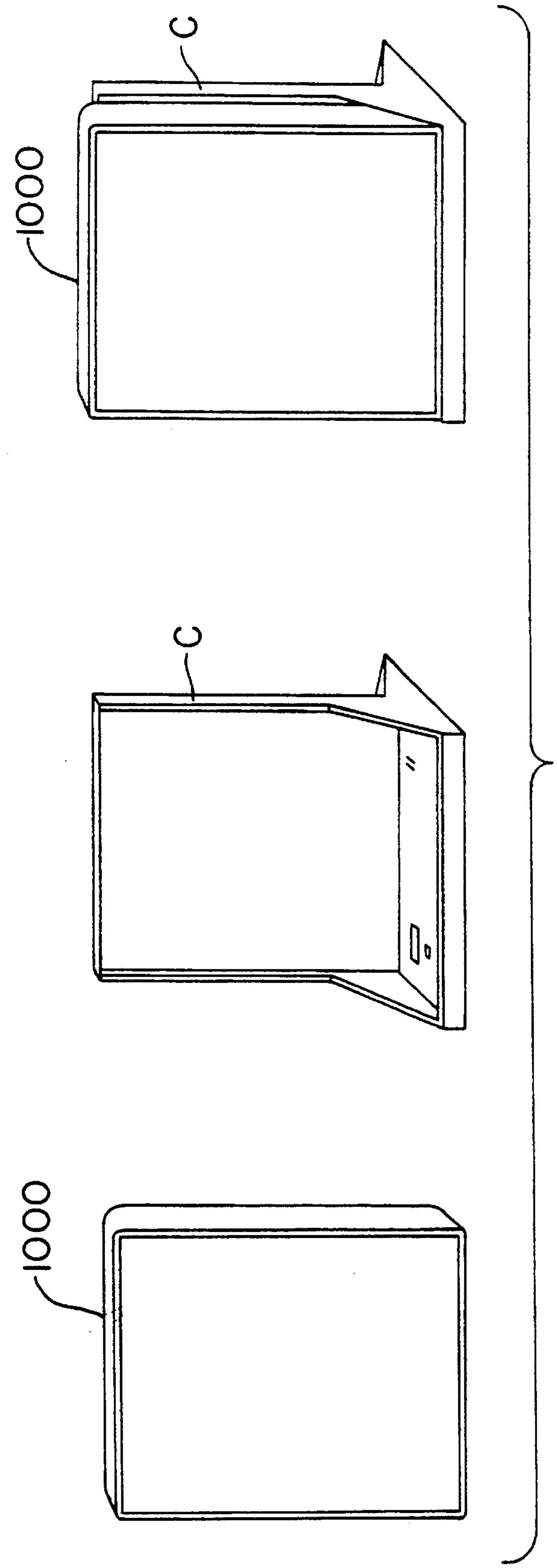
FIG. 51 illustrates an example of a cradle into which a fax tablet may be placed.

FIG. 51 illustrates an example of a cradle C into which a fax tablet 1000 may be placed. The cradle C may provide many or all of the electrical connections between the tablet 1000 and the outside environment. For example, the cradle C may include a phone connector for connecting the fax tablet 1000 to a phone line. The cradle C may include a computer connector for connecting the tablet 1000 with a computer or computer printer. The cradle C may also include a power supply for powering and/or charging the tablet 1000.

Figure 52:
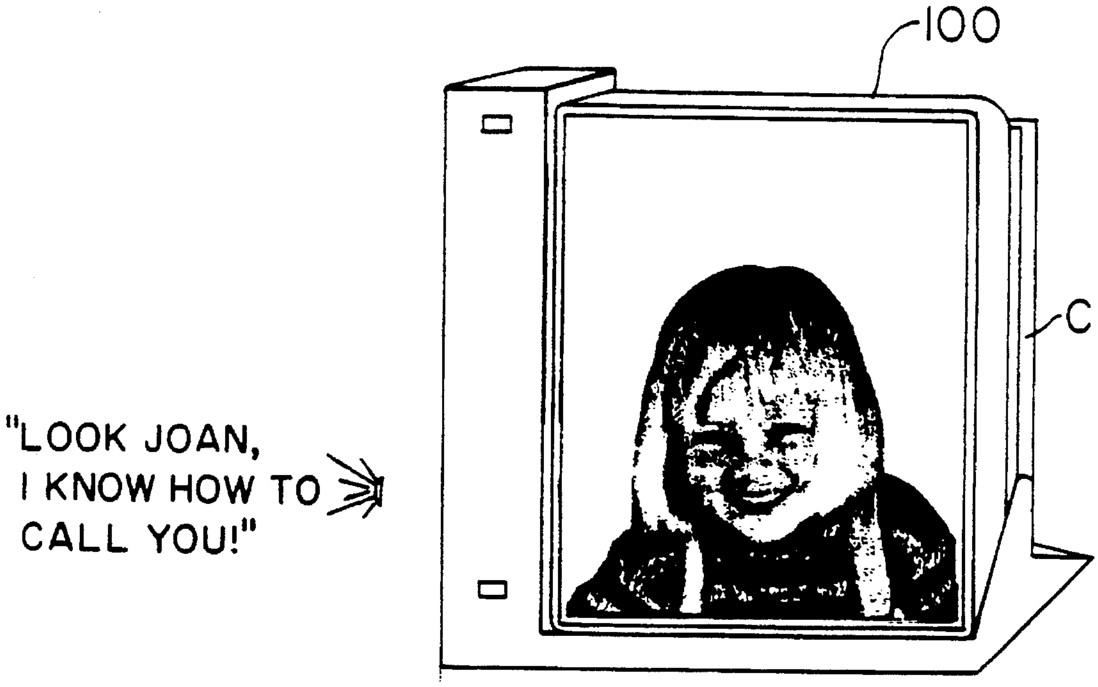
FIG. 52 illustrates an example of a cradle equipped with a video camera which enables the fax tablet docked in the cradle to send, receive and display video images.

FIG. 52 illustrates an example of a cradle C equipped with a video camera VC which enables the fax tablet 1000 docked in the cradle to send, receive and display video images.

Figure 53:
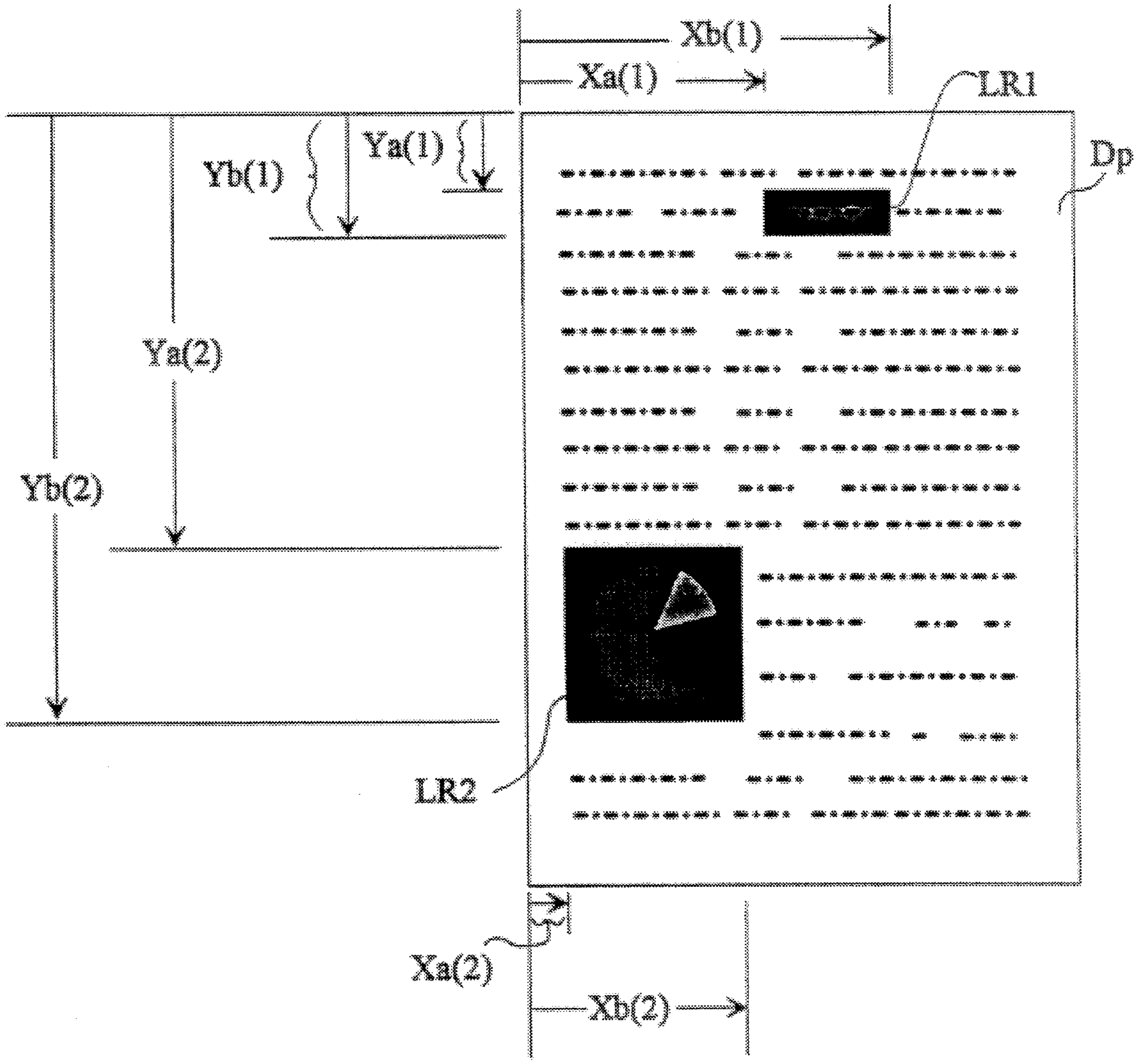
FIG. 53 illustrates the use of coordinates to identify positions of link regions contained in a document having electronically linked electronic reference information associated therewith.
Figure 54A:
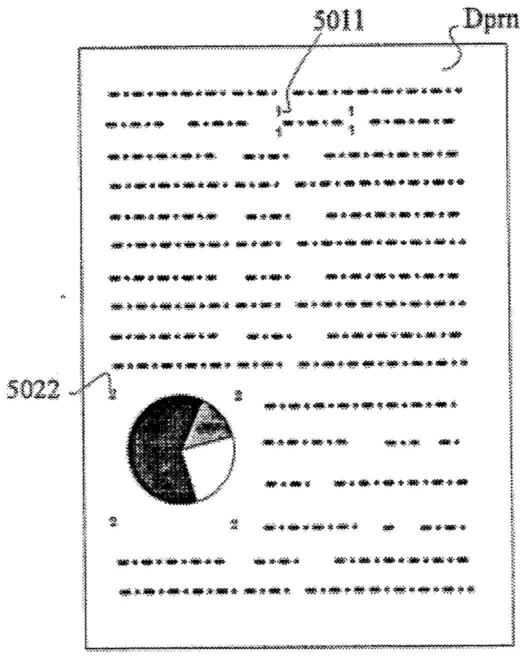
FIG. 54*a* illustrates a predetermined attribute of a document image in the form of numerals delimiting linked portions of the document.
Figure 54D:
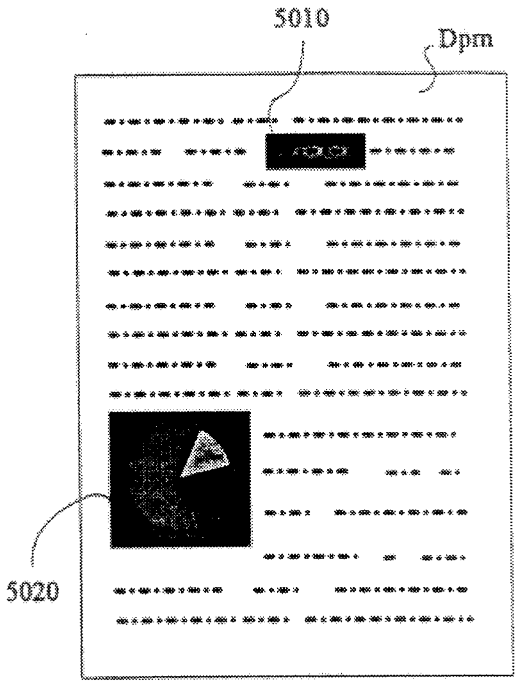
FIG. 54*d* illustrates the identified link regions in a document based on the portions of the document image found to have the predetermined attribute.
Figure 54B:
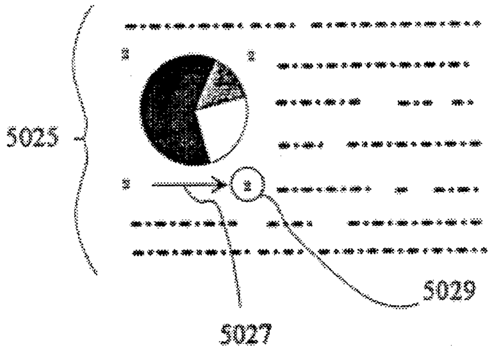
FIG. 54*b* illustrates the step of electronically scanning the electronic representation of the document image to locate the linked portion of the document.
Figure 54C:
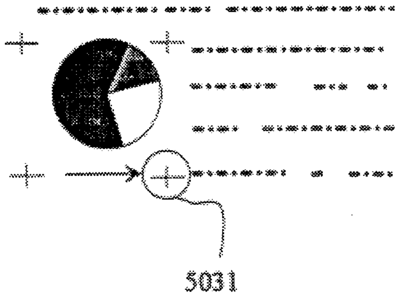
FIG. 54*c* illustrates the recording of the positions in the document where the predetermined attribute has been detected through scanning.

FIG. 53 shows a page $D_p$ which may either be a page of an electronic document as it appears on the display screen of a device such as 1000, or an actual printed page. Portions of the page, as indicated by the dark bounding boxes, contain information that is electronically linked to electronic reference information.

A characteristic of every link region, such as LR1 and LR2 in FIG. 53, is a set of information that defines its position within the document. There are many ways to represent the location of a link region. One method is to employ coordinates. The zero-point of the coordinate system may be a reference position such as the top or left margin of the document page. In FIG. 53 the link region LR1 is defined by the coordinates [Xa(1) ,Ya(1); Xb(1) ,Ya(1); Xb(1) ,Yb(1); Xa(1) ,Yb(1) ], starting at the top left vertex of the bounding box and going around the quadrangle in a clockwise direction.

Position information defining a link region is obtained whenever, for example, an audio highlight box is defined as illustrated in FIGS. 46(*a*) through (*d*). There are many ways to convey the position of a link region besides through coordinates, for instance with markers, embedded codes, recorded patterns, etc..

FIG. 54 illustrates how link information stored on a printed document in the manner illustrated in FIG. 50 may be used to regenerate the electronic bounding boxes 1110*a* and 1110*b* of FIGS. 41(*a*) and 41(*b*). In FIG. 54, $D_{prn}$ represents a printed document. Like in FIG. 50, portions of the printed page contain information that is electronically linked to electronic reference data. Those portions of the page may be enclosed by printed markings having a predefined appearance. In both FIGS. 50 and 54 small superscript identification numerals are used as the delimiters of link regions.

For example, the superscript numeral 1 is used to identify the first link region 5011 on hardcopy page $D_{prn}$, and the superscript numeral 2 is used to identify the second link region 5022 on $D_{prn}$. When the printed page $D_{prn}$ is scanned by a tablet 1000 as in FIG. 45(*c*), or similarly when it is scanned by a desktop fax unit like the one pictured in FIG. 50, electronic information representative of the image appearing on the printed page is obtained.

In FIG. 54 5025 represents the electronic information representative of only the bottom portion of page $D_{prn}$. The concepts surrounding digital image representation are appreciable to individuals skilled in the art and the electronic representations may, for example, be in the form of bitmaps. Optical character recognition, or more generally, pattern matching, may be performed on the electronic image data. This is illustrated using image information 5025. When the image data 5025 is scanned 5027 for the presence of patterns used to denote link region boundaries, the positions of the patterns that are successfully recognized 5029 are recorded 5031. The small superscript numeral 2 is identified 5029 as a link region delimiter, and its position is recorded 5031, as symbolized by the placement of the crosshair. The other crosshairs shown in FIG. 54 correspond to, and are similarly derived from, the other numeral 2 superscripts in document $D_{prn}$.

Figure 55:
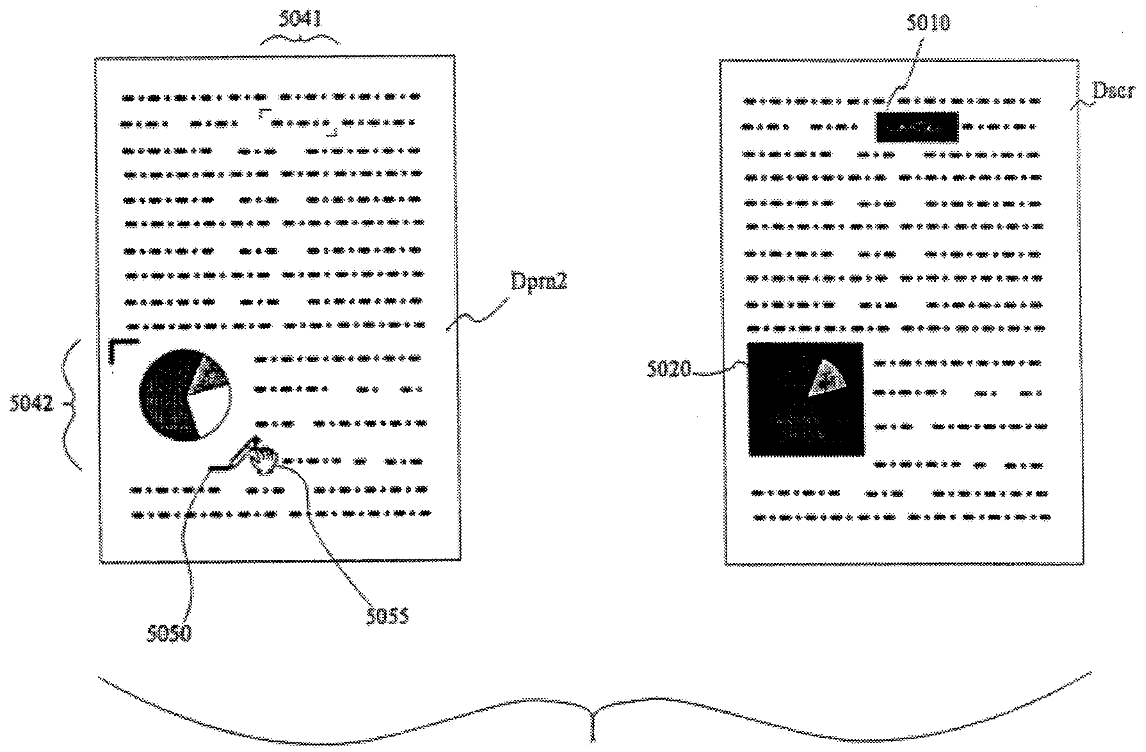
FIG. 55 illustrates the manual inscription of graphical identifiers in a document to designate portions of the document to be linked to electronic reference information and the resulting document with link regions where the graphical identifiers were manually placed.

The actual geometric shapes employed to designate link region boundaries may be arrived at by agreement. For example, whereas in FIGS. 49, 50, and 54 the shapes used are in the form of small superscript numerals, they are by no means limited to these. Indeed FIG. 55 illustrates an alternative in which the delimiters are in the form of brackets drawn by hand.

After all of the link region delimiters of a given group, for instance those involving the superscript numeral 2, have been identified, error detection procedures may be performed. As an example if, by convention, link regions are always confined within geometric boxes, then a software routine may be included to confirm that the shape traced out by the sum of the identified link region delimiters is in fact quadrangular.

Once a link region has been identified it may be electronically associated with a piece of electronic reference information. Different linking conventions are possible. An example of an implicit method might be to associate the first link region identified on a page, where "first" may be interpreted in the top-down/left-right sense, with the first piece of electronic reference information (electronically) associated with the document.

In FIG. 54 the link region 5010 is electronically linked to a first piece of electronic reference information, and the link region 5020 is electronically linked to a second piece of electronic reference information. An example of an explicit link mechanism might be to connect the link region having the numeral 2 for delimiters on $D_{prn}$ with the second piece of available electronic reference information, regardless of the physical position of this link area on the page. Therefore, link region 5020 could be electronically linked to the second piece of electronic reference information even if it were located on top of link region 5010 in $D_{scr}$ in FIG. 54.

FIG. 55 illustrates how printed documents do not have to be originally created with electronically linked electronic references in mind in order to accommodate this feature. Printed document $D_{prn2}$ may have been taken from a magazine, or in the extreme may even be a historical document—and can still be used with electronically linked electronic reference information.

In FIG. 55, 5041 denotes a designated first link region, and 5042 denotes a designated second link region. The link regions are identified by brackets 5050, which may be hand drawn 5055. It is not a requirement that the link area identifiers be brackets. For instance, the superscript numerals of FIG. 50 and FIG. 54 may also be penciled in by hand. Similarly, the identifiers do not have to be manually drawn. They may be stamped onto $D_{prn2}$, or superimposed using overlays or other techniques, etc.

The concept illustrated in FIG. 55 is the addition of link region identifiers in a step separate from the generation of the printed matter to which the identifiers are being added. After $D_{prn2}$ is scanned as in FIG. 45(*c*), pattern matching may be performed as described in connection with FIG. 54. Bounding boxes such as 5010 and 5020 may be generated, and these may be electronically linked to electronic reference information in the manner practiced throughout this disclosure.

Figure 56A:
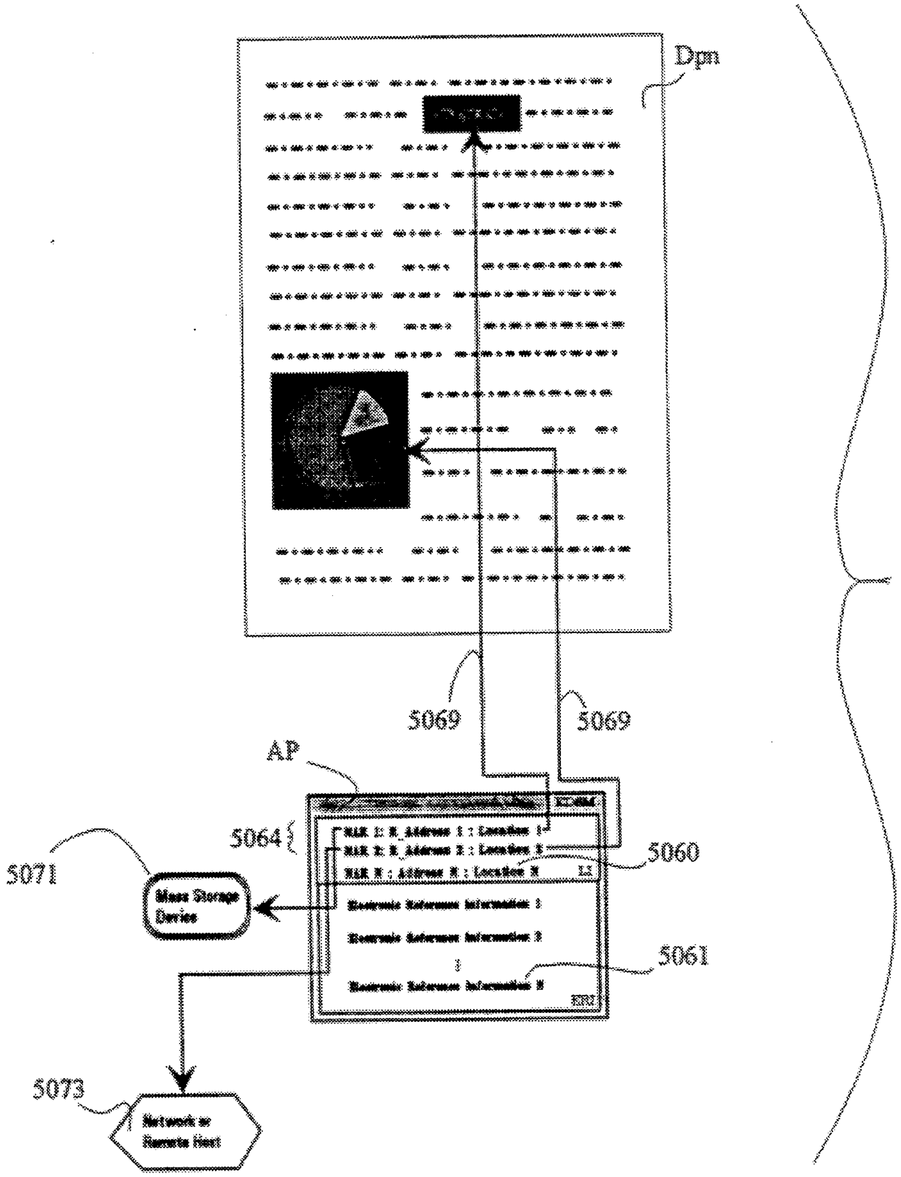
FIGS. 56(*a*) and (*b*) illustrate the concept of a remote link, and ways of storing this information in an electronic data storage medium capable of being included on a printed document.
Figure 56B:
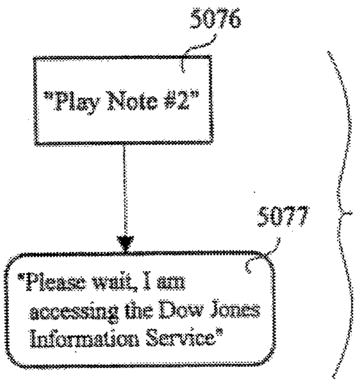

FIGS. 56(*a*) and (*b*) illustrate the storage of a remote link to electronically linked electronic reference information in an electronic data storage medium capable of being included on a printed document $D_{pn}$. The term "Electronic Data Storage Medium" (or EDSM) offers a more accurate description of the device element that is capable of being included on printed documents to retain or to convey electronically linked electronic reference information. Where the electronic reference information is comprised of electronic audio information, the EDSM may also be referred to as an "Audio Patch". The electronically linked audio information of FIG. 41 was stored in the audio patch AP of FIG. 44(*e*) with a local link.

It is not a limitation, though, of the links stored in the Electronic Data Storage Media described herein to be of the local variety. As shown in FIG. 43(*a*) the apparatus 1000 can communicate with a variety of devices situated at remote locations via wired (line) or cellular connections. In response to such capability, it will sometimes be necessary to store remote links in the EDSM so that (portions of) printed documents may reference information that may not be saved on the EDSM included with the document.

FIG. 56(*a*) shows an electronic data storage medium AP capable of being included on a printed page $D_{pn}$. The (EDSM) electronic data storage medium includes link information (LI) and electronic reference information (ERI). A local link 5060 is shown which points to reference information 5061. In FIG. 56(*a*) both the link information and the electronic reference information are depicted as being stored in a series of fields. It is preferable that at least the link information be saved in this manner, or in some other comparable fashion whose objective is to enable each piece of electronic reference information to be accessible independently of any extraneous data.

As shown in FIG. 50 the storage structure should permit convenient access to the electronic reference information even in the absence of a (Graphical User Interface) GUI Pointer (e.g.. touch sensitive screen, mouse, electronic pen, etc.). Furthermore, it should be possible to access any piece of electronic reference information without the need to refer to the original body of electronic data having the electronic links to the electronic reference information. The structure of FIG. 56(*a*) permits this.

Two remote links are shown in FIG. 56(*a*) and they are indicated as 5064. The first remote link is depicted as pointing to electronic reference information residing in a mass storage device. Mass storage device 5071 may be a hard drive included with the desktop fax machine of FIG. 50. Or, it may be a PCMCIA card present in the tablet 1000 of FIG. 45. These are but two examples.

The remote link information recorded in AP includes node access requirement information (NAR). The node access requirement information may include instructions, passwords, etc. in addition to the identities of any hardware or software which may be needed to enable the electronic reference information saved in the mass storage device 5071 to be retrieved.

The saved link information also includes the remote address (R_Address) of the electronic reference information such as the physical and logical drive names, directory paths, etc. where they are located. Information identifying the portion of the document making the reference call may also be supplied. This is represented as 5069. A second remote link is shown in FIG. 56(*a*). This time it points to electronic reference information located on a network or on a remote host 5073.

The tablet 1000 may be in communications with such devices as seen in FIG. 43(*a*). To illustrate this, the video sequence in FIG. 52 may constitute information deposited in a voice mail box which is electronically linked to, for instance, the name appearing on a printed copy of the little girl's report card. The tablet 1000, docked in video cradle C (as in FIG. 52), may access the voice mail box (as in FIG. 43(*a*)) using a remote link stored in the electronic data storage medium AP.

As another example, in FIG. 56(*b*), the execution of the command "Play Note #2", 5076 causes the second field of link information stored in AP to be read. Here, the information comprises a remote link to an on-line service 5073. NAR2 of this stored link may include the phone number of the desired on-line service, as well as any communications protocols or passwords which may be needed to establish the connection.

"R_Address 2" may include the sequence of commands required to enter the portion of the on-line service providing the desired reference information. Or, in an abbreviated arrangement which requires less storage space on the electronic data storage medium AP, the NAR frame may indicate the name of a complete applications module or batch file which must be available to the document playing apparatus, in order for the sought-after remote-linked reference information to be obtained.

5077 in FIG. 56(*b*) represents a message which may be issued by an apparatus that is playing a document $D_{pn}$ during the time that a remote connection is being established via a remote link. Also, 5076 may be an actual voice command spoken by the person playing document $D_{pn}$ to, for example, a tablet 1000. This may be the case where the tablet 1000 possesses voice recognition capability.

Figure 57:
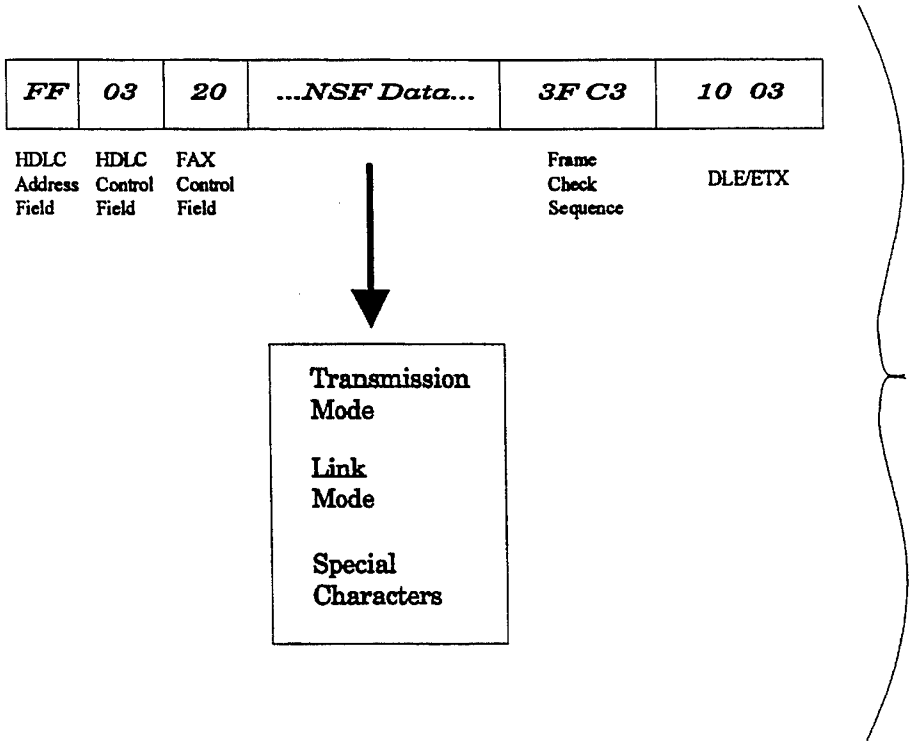
FIG. 57 illustrates the use of a non-standard facilities frame to modify a facsimile transmission for transmitting linked electronic reference information.
Figure 58A:
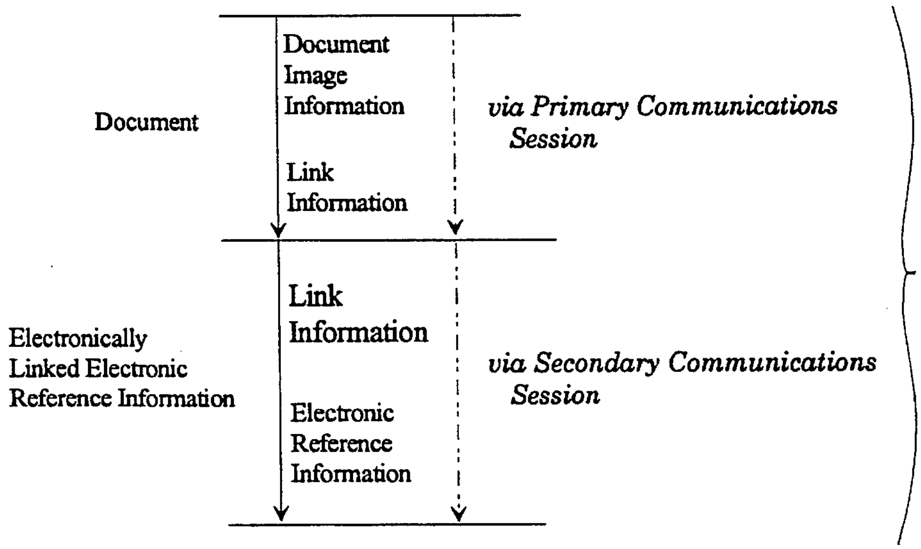
FIGS. 58(*a–d*) illustrate the communications scheme of FIG. 48 in greater detail.
Figure 58B:
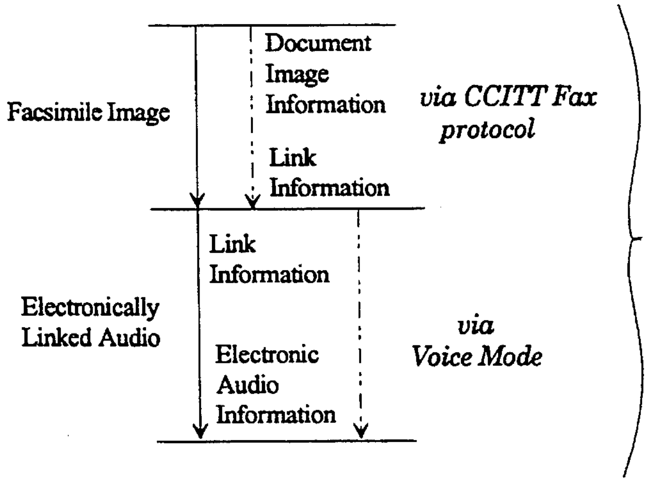
Figure 58C:
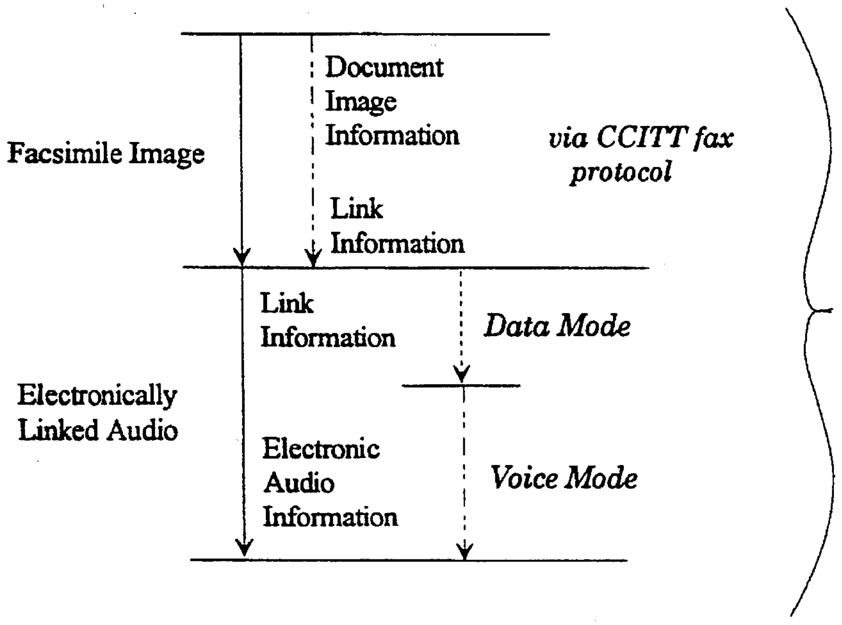
Figure 58D:
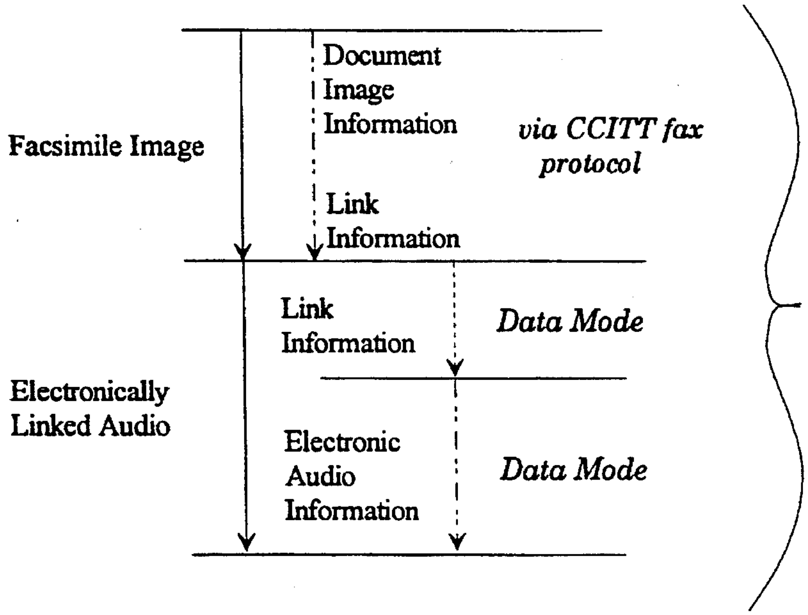

FIG. 57 shows the use of a Non-Standard Facilities frame by a facsimile apparatus, to tell a comparable apparatus how it will be conducting a modified facsimile session. The NSF frame is included as an optional feature of the CCITT fax communications protocol. In FIG. 57, the NSF data may include codes for designating the transmission mode, link mode, special characters in use, etc.. For example, the document image data as well as the linked reference data may be encoded as fax data and transmitted. Whereas the document image data dispatched in this fashion may still be intelligible to an unsuspecting receiving apparatus, the linked reference data may be useless unless the receiving apparatus is aware that such a (modified) transmissions scheme is being employed.

FIGS. 58(*a–d*) show the communications protocol of FIG. 48 in greater detail.

FIG. 58(*a*) outlines the general scheme of the communications protocol. The method utilizes two communications sessions, executed typically, although with some exceptions, in back-to-back sequence. The first session is referred to as the Primary Communications Session, and the second session is referred to as the Secondary Communications Session.

During the Primary Communications Session the document will typically be transmitted, by way of a conventional data transmission technique such as one of the CCITT fax protocols. During the Secondary Communications Session the electronically linked electronic reference information will typically be transmitted. This was seen in connection with FIG. 48 where electronically linked audio information was sent. While the Primary Communications Session may involve one of the CCITT fax protocols, this is not a limitation of the present method, whose objective is to enable bi-directional communications of electronically linked electronic reference information with existing communications schemes not intended to accommodate this capability.

The document which is transmitted during the Primary Communications Session of FIG. 58(*a*) may optionally include link information embedded with the document information. The electronically linked electronic reference information which is transmitted during the Secondary Communications Session will usually include link information; although the link information need not be conveyed in an explicit form. That is, the link information may be manifest in the transmission and storage structure of the electronically linked electronic reference information.

For example, a pre-defined period of silence may separate two successive pieces of electronic reference information during their transmission; and, when stored in the electronic data storage medium which will be included on a printed document, each piece of electronic reference information may be assigned a separate storage field. For instance, the third piece of electronic reference information may be located in the third storage location.

FIGS. 58(*b*)–(*d*) illustrate how the presently taught communications procedure enables otherwise conventional fax transmissions to include electronically linked audio information. In FIG. 58(*b*) a document containing electronically linked electronic audio information is being sent using an existing fax protocol, such as the CCITT Group 2 or Group 3 facsimile communications protocol. In the primary communications session a facsimile image of the document is transmitted in a manner consistent with the CCITT standard. Electronic data representative of the original document image is transmitted.

A novel (optional) addition of the present method involves transmitting electronic data not just representative of the original document, but representative of the original document with superimposed link region delimiters like the ones shown in FIGS. 49, 50, 54 and 55. If the transmitting station comprises an apparatus such as the communications tablet 1000 in FIG. 43, or the desktop fax unit shown in FIG. 50, then the link information may be electronically superimposed onto the electronic representation of the original document by the apparatus. In the case where the transmitting station comprises a conventional, current-art fax machine, the above-mentioned link information may be hand drawn as described in connection with FIG. 55.

The linked audio information communicated during the secondary communications session in FIG. 58(*b*) is being transmitted in what will be referred to as Voice Mode. After the fax transmission of the primary communications session has been successfully completed, the sending facsimile apparatus disengages the line. If the sending station comprises a conventional fax machine, then it simply hangs up. If the sending station is an apparatus such as the tablet 1000 of FIG. 43(*a*), then the apparatus 1000 does not hang up but instead disengages the use of the fax component of the equipment. The linked audio information is then sent as "voice data". If the sending station employed a conventional fax machine to transmit the fax portion in the primary communications session, then a telephone on the same line as that fax machine may be used to send the linked audio information.

To illustrate the method, consider sending the two linked audio sequences depicted in FIG. 47. After the fax machine has hung up, the sender may press a key on the key pad of the telephone she is using—for instance, the "*" key. In accordance with the DTMF (Dual Tone Multifrequency) method, this generates a tone which is actually comprised of two frequency components: 941 Hz and 1209 Hz. A receiving apparatus such as 1000 of FIG. 43(*a*) will detect the tone and interpret it as designating the start of transmission (in the voice band) of electronically linkable electronic (audio) reference information.

The remote apparatus may respond with a voice prompt such as "Ready to receive". The sender may then press the "#" button followed by the number of the linked electronic reference that will be sent, for example "1", and again followed by the "#" button. The sender then dictates the voice note over the phone, for example: "This style comes in size small, medium and large. It does not come in X-large." After the dictation of the linked audio message has been completed the "#" button is again pressed. The first linked voice note has now been communicated to the remote, receiving station.

Similarly, to send the second linked audio reference shown in FIG. 47, the sender would press "#2#" and speak into the phone: "My fax-tablet number is 854-5678, in case you want to transmit vice/fax mail to me." This is again followed by pressing the "#" button on the telephone keypad. After all of the linked electronic audio references have been dictated, the sender presses the "*" button on the telephone keypad. The receiving apparatus 1000 will respond by offering a set of options: "Would you like to replay your voice notes?", etc.. Some versions of the receiving apparatus may hang up upon receipt of the terminal "*" tone.

The audio passages received by the apparatus 1000 may be stored in a memory unit included with the apparatus, whether the memory is in the form of semiconductor RAM, magnetic or optical disk drive, or magnetic or optical tape, etc.. The apparatus may also proceed to immediately store the audio information in an electronic data storage medium AP which can be included on a printed document, as illustrated in FIG. 44(*e*).

In the manner just described, it is possible to create and to send, using a conventional facsimile machine, a document having electronically linked electronic reference information (e.g. audio passages), to a receiving apparatus such as the tablet 1000 of FIG. 41 or FIG. 43(*a*).

The present method also accommodates the situation where the sending station comprises an apparatus such as the tablet 1000 of FIG. 41, and the receiving apparatus comprises a conventional fax machine with telephone answering machine capability. In such a case the tablet 1000 will first transmit the document image information to the receiving station as an ordinary facsimile transmission. The actual electronic representation of the document that is transmitted may include link region delimiters such as those depicted in FIG. 49 superimposed onto the original document. In this way embedded links may be stored on the printed document such that portions of the printed document may be electronically re-linkable to electronic reference information at a later time. (In some versions machine readable optical codes may be superimposed onto the original document.) This permits the linking step to be time-shifted.

After the document has been successfully transmitted to the receiving station, both stations hang up. The sending station then redials the receiving station and waits for the outgoing announcement played by the telephone answering machine component of the receiving station to be completed. When the sending apparatus detects that the audio signal level coming over the telephone line from the receiving apparatus has dropped, the outgoing announcement is interpreted as complete. The sending apparatus then begins playing to the answering machine of the receiving station- (over the telephone line) the audio passages associated with portions of the already faxed document . The "#" tone may be played over the telephone line by the sending apparatus between successive audio passages.

Some versions of the apparatus may identify each audio passage by including the audio note number, for example, by playing the "#2#" tone prior to playing audio note 2. Other versions of the apparatus may even identify each audio note by playing an identifier using a synthetic voice, for example, "Voice Note 3 follows", followed by playing voice note 3.

The present method therefore enables an ordinary fax machine working in conjunction with an ordinary telephone answering machine to send, receive, store, and to generate printed documents having portions that are electronically linked to electronic reference information. Furthermore, by re-inputting the information received by the telephone answering machine into the apparatus 1000 of FIG. 41, and by scanning (as in FIG. 45(*c*)) the fax document received by the ordinary fax machine into the apparatus 1000, the linked audio information may again be accessed as illustrated in FIGS. 41(*a*) and 41(*b*).

FIG. 58(*c*) illustrates a variation of the communications method in which a document having electronically linked electronic reference information is transmitted using three communications modes. First, the document itself is transmitted using, for example, the CCITT Group 3 fax protocol. The transmitted document may include embedded link information in any of the ways described earlier. Next, the electronically linked electronic reference information (for example voice notes) is transmitted using two modes. A data mode is used to send data including link data and a voice mode is used to send audio passages.

In accordance with FIG. 58(*c*), two pieces of equipment (like 1000 of FIG. 43(*a*)) may implement a multimode transmissions scheme to communicate documents having electronically linked electronic reference information. After the document portion has been successfully transmitted using, for example the CCITT Group 3 fax protocol, a data modem using pre-defined settings may be used to transmit data such as that shown in FIG. 56(*a*) stored in AP. Other forms of data may also be sent, such as computer files.

Following the data mode a transition to voice mode may be made, in which the data modem releases the line without hanging up. In the AT Command Set a modem command such as "AT+FVo", "AT+FVoice", and "ATG" will bring about a transition to voice. Spoken information may be transmitted using voice mode, as described above in connection with FIG. 58(*b*). The "VOC" command of FIG. 48 may be transmitted at the start of data mode in FIG. 58(*c*) by the data modem of the sending station.

One form the "VOC" command may take is a set of "*" tones of the form "*N" where "N" is a one digit number from 0 to 9. For example "*1" may comprise a tone of 941 Hz and 1209 Hz followed by a tone of 697 Hz and 1209 Hz. Then minimum duration of each tone may be 75 milliseconds, and the minimum interdigit interval may also be 75 milliseconds. The tone of "*" without a following numeral may default to signify that a transition to voice mode will be made. This was seen in connection with FIG. 58(*b*) where, after the fax hardware released the telephone line, the "*" tone was used to signal the start of dictated voice notes.

The tones associated with "*3" (941 Hz and 1209 Hz plus 697 Hz and 1477 Hz) indicate to the tablet 1000 of FIG. 43 that data mode is being used. This simply means that a data modem will be transmitting data over the line, which is still active, although the fax component has already disconnected from the line.

FIG. 58(*d*) shows a version of the communications scheme in which two modes are employed: a facsimile mode and a data mode. The document having the electronic links to electronic reference information is sent using the facsimile mode; and the linked audio information is sent using the data mode. The fax portion of the scheme is as described earlier. The data portion is similar to the data portion in FIG. 58(*c*), except that in FIG. 58(*d*) the audio passages themselves are transmitted as electronic data. This requires that the audio information, which may have been obtained as illustrated in FIG. 47(*b*), be in digital form. The conversion of audio signals into digital form is well known in the art and, other than placing greater requirements on the data processing and transmissions overhead of the present method, offers many conveniences to the user. It is possible to transmit many forms of electronic data besides electronic audio or video information. For example, computer files may be sent instead.

Using the methods described above it is possible to transmit documents having electronic links to a vast array of types of electronic reference information, and to do so while making use of existing equipment which otherwise would not have this capability. Variations of the methods described above are also possible. For example, the electronic reference information may be transmitted prior to the transmission of the facsimile image.

Finally with regard to the presently taught communications method, it is possible for the Non-Standard Facilities (NSF) feature which is a part of the CCITT facsimile protocol to be utilized to enable an apparatus such as the tablet 1000 of FIG. 43 to communicate with another similar apparatus. It is also possible for the audio information, which comprises link information and audio data, to be transmitted as NSF data.

For example, a non-standard setup may involve sending audio data encoded as facsimile data. In some instances this method may even be desirable. However, to enable bi-directional compatibility between the devices presently taught and conventional devices such as ordinary fax machines, the scheme described in conjunction with FIGS. 48 and 58 is believed to be better. The NSF feature which is an integral part of the CCITT facsimile standard may be resorted to when it is known that comparable equipment will be used at both sending and receiving stations. The NSF feature may also be applied to supplement the methods described herein, as between two similar devices such as 1000 in FIG. 43(*a*).

Figure 59:
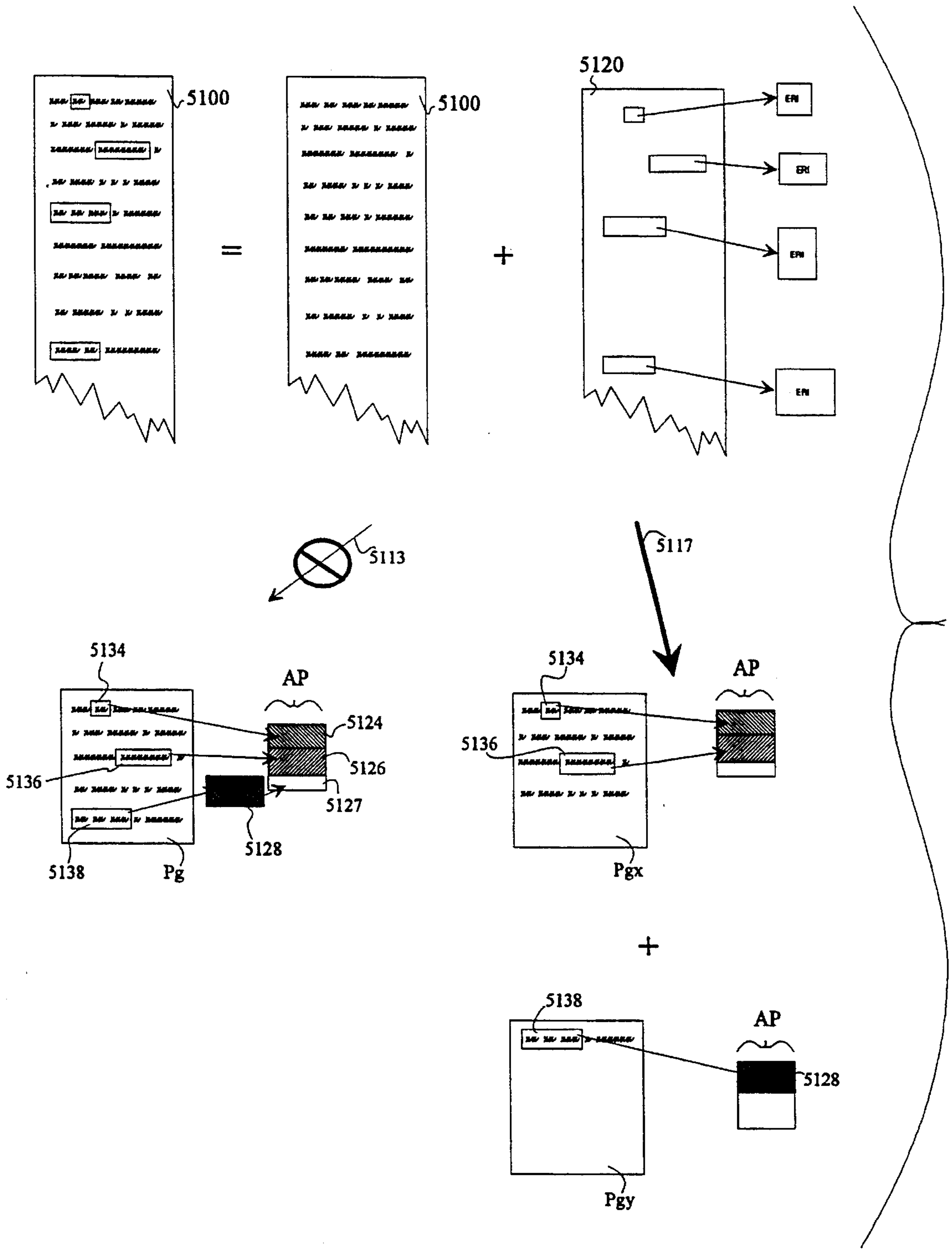
FIG. 59 illustrates the benefit of synchronizing the formatting of the hard copy document with the storage of information to an EDSM (5117) and the potential result if synchronization is not utilized (5113).

FIG. 59 illustrates the synchronization of information storage (into an EDSM to be included on a printed document) with the formatting of the associated document. 5100 represents electronic data having portions that are electronically linked to electronic reference information. Some of the electronic data, represented by 5110, will be used to generate printed copy. Other parts of the electronic data, indicated by 5120, comprise electronic reference information and link information. Pathway 5113 illustrates what may occur without synchronization. AP is an electronic data storage medium capable of being included on a printed document. The data printed onto page Pg includes three reference calls to electronically linked reference information: 5134, 5136, and 5138. 5124 represents the electronic reference information associated with reference call 5134; 5126 represents the electronic reference information associated with reference call 5136; and 5128 represents the electronic reference information associated with reference call 5138. After storing the data associated with 5124 and 5126 in the electronic data storage medium AP, the remaining storage space 5127 on AP is insufficient for retaining the data associated with electronic reference information 5128.

Pathway 5117 illustrates formatting the hardcopy and partitioning the storage of electronic reference information in synchronization. Printed page Pgx has been formatted to include the information containing reference calls 5134 and 5136. The electronic reference information 5124 and 5126, which are respectively linked to 5134 and 5136, is stored on a first electronic data storage medium AP capable of being included on page Pgx. The data which includes the reference call 5138 is printed on another page Pgy. The electronic reference information 5128 which is electronically linked to 5138 is stored in a second electronic data storage medium capable of being included on the second printed page Pgy.

Figures 60A, 60B:
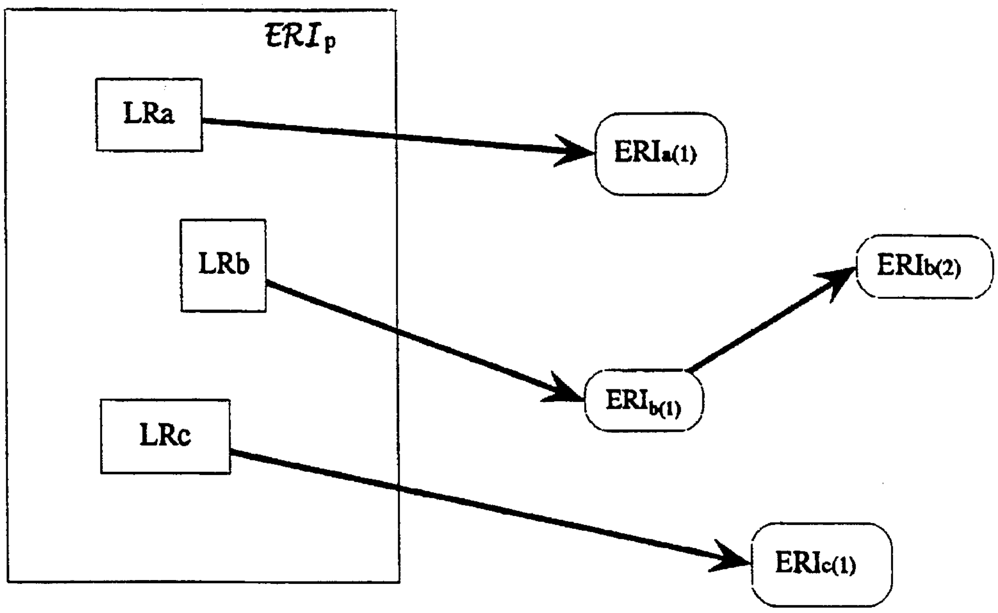
FIGS. 60(*a*) and (*b*) illustrate the organization of linked electronic reference information for convenient and independent accessibility.

FIGS. 60(*a*) and (*b*) illustrates an example of how information may be organized so that it will not be necessary to acquire an entire body of electronic data in order to access to the electronic reference information that is electronically linked to portions of that body of electronic data.

FIG. 60(*a*) represents the electronic data having portions that are electronically linked to electronic reference information. Three link regions $LR_a$, $LR_b$, and $LR_c$ are shown within a "primary" block of electronic reference information $ERI_p$. Link region $LR_a$ is linked to electronic reference information $ERI_{a(1)}$. Similarly link region $LR_b$ is linked to $ERI_{b(1)}$, and $LR_c$ is linked to $ERI_{c(1)}$. $ERI_{b(1)}$ itself includes a link to an electronic reference $ERII_{(2)}$.

Given the electronic data shown in FIG. 60(*a*), the information shown in FIG. 60(*b*) may be (electronically identified and) obtained. The table of FIG. 60(*b*) is offered only as an example. Other organizational schemes are possible.

The first horizontal row in the table identifies the access requirements of each of the nodes in the complete body of electronic data shown in FIG. 60(*a*). The first row may be considered a Node Access Requirement Header. It may be more efficient for a printed document that includes a data storage medium containing complex, linked electronic reference information to have the information shown in FIG.

60(*b*) readily accessible. A table as shown in FIG. 60(*b*) may be stored in the electronic data storage medium that is included on the printed document. It may also be retained in the memory of a device such as 1000 in FIG. 41, or in the memory of the desktop fax apparatus of FIG. 50.

The Node Access Requirement Header may reveal the requirements which must be met in order for each of the electronic references to be accessed; for example, any supplemental hardware or software needed by the electronic reference data. Each column in the table furnishes information used to access (and to establish the link to) a piece of electronic reference information. For instance, looking at the second column, the first entry identifies any special hardware or software which may be needed to access the electronic reference information labeled ERIa(1) in FIG. 60(*a*); and the second entry enables a link to $ERI_{a(1)}$ to be established. Each piece of electronically linked electronic reference information may be retrieved independently of any other information contained in the original body of electronic data. Similarly, GUI pointers are not required for access to be achieved. The example supplied in FIG. 50 may make use this feature: "Play Voice Note #02".

Figure 61A:
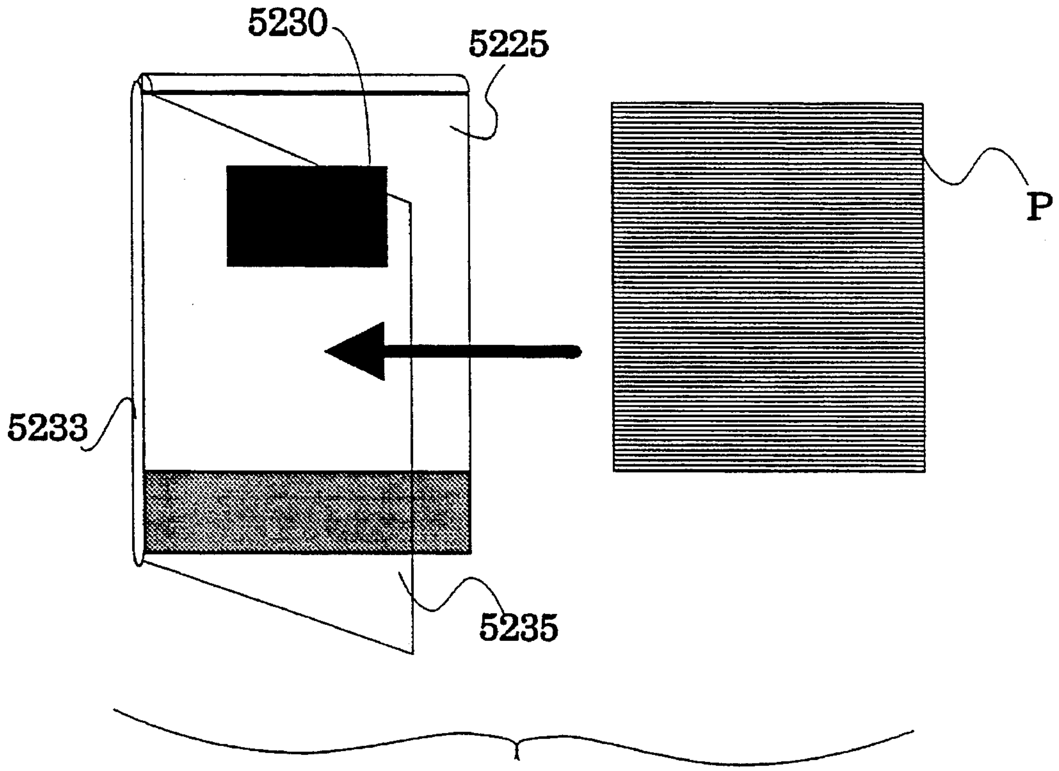
FIGS. 61(*a*) and (*b*) illustrate an apparatus for playing documents having linked electronic reference information.
Figure 61B:
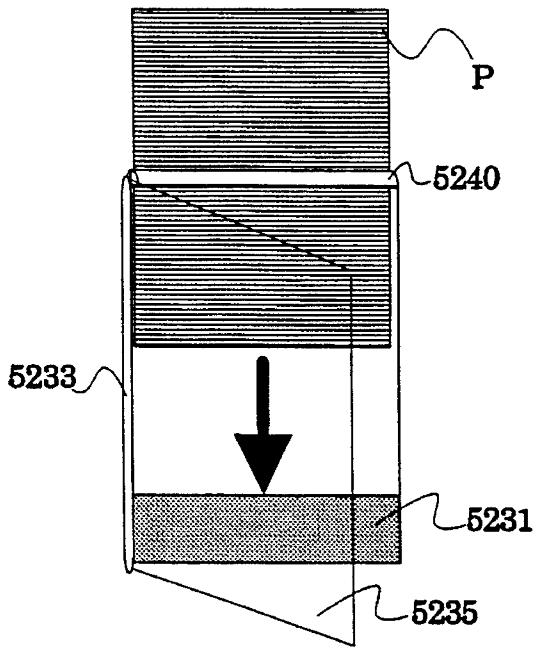

FIGS. 61(*a*) and (*b*) illustrate an apparatus for playing printed documents that have electronic data storage media included thereon, such as the page P of FIGS. 45(*a*) and (*b*). In FIG. 61(*a*) a printed document P is being inserted into the playing apparatus 5225. Scan window 5230 includes an optical or magnetic read head for reading the electronic data storage medium AP included on the rear surface $P_b$ of the printed document P (as in FIG. 45(*b*)). Cover plate 5235, which is attached to playing apparatus 5225 by a hinge 5233, comprises a liquid crystal display means. Cover plate 5235 is substantially optically transparent, and thus when closed shut over a printed document P which has been placed into the playing apparatus 5225, will permit information formed on the printed document to be viewed.

Images generated on the liquid crystal display means 5235 may be superimposed onto images formed on the printed document P. This allows graphics derived from electronic reference information linked to portions of the printed document P to be overlaid onto the printed document. FIG. 61(*b*) illustrates a printed document being optically scanned by playing apparatus 5225. The optical scanning mechanism 5240 may include a linear photodetector array like 1127 in FIG. 42(*d*). FIG. 61(*b*) also shows a backlit portion 5231 of the playing apparatus 5225.

Figure 62:
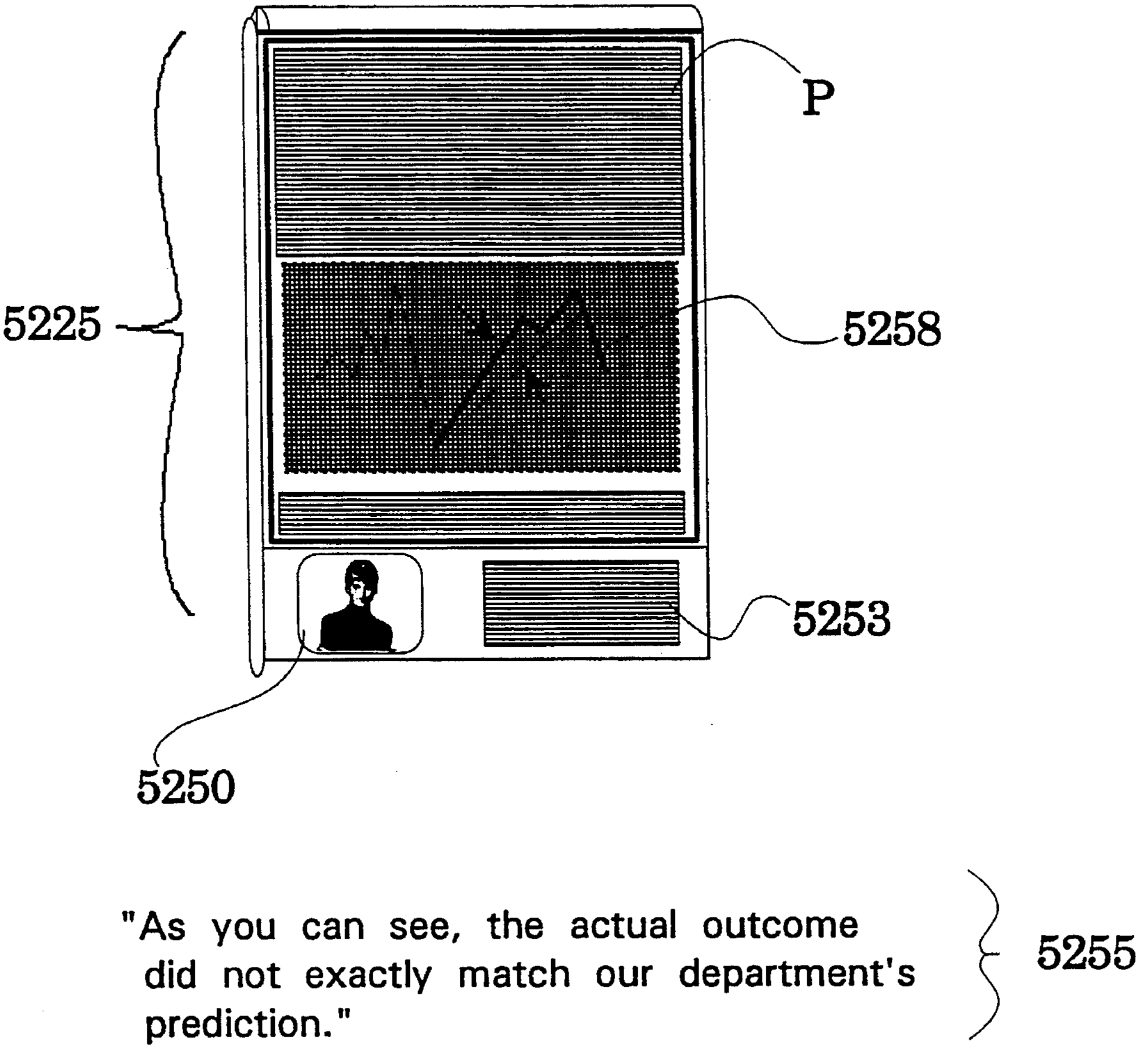
FIG. 62 illustrates the dynamic interaction between electronic reference information and printed information appearing on a page for documents retaining electronic links to electronic reference information.

FIG. 62 shows the playing apparatus 5225 playing a printed document P. The dark portion of the graph 5258 in the center of the page is formed on the liquid crystal display means of the cover plate, and is being superimposed onto the printed information of page P. The two arrows are also electronically formed images overlaid onto the printed page.

The data and instructions for forming these images comprise electronic reference information saved in an electronic data storage medium affixed to the page P. The video sequence 5250 pictured at the bottom of the apparatus 5225 is similarly being formed from electronic reference information on the liquid crystal member. The person shown in the video sequence is explaining the printed document P. The audio portion 5255 of the video sequence 5250 is being played in coordination with the graphical plot 5258 and the appearance of the arrows. The lower arrow is pointing to the part of the graph on the printed page, which represents "the department's prediction". The upper arrow is pointing to the part of the graph formed on the liquid crystal display means. It represents the "actual outcome" spoken of by the person in the video sequence 5250.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An apparatus for linking a document with reference information associated therewith comprising:

means for receiving an electronic graphical representation of a document image, said document having a portion to be linked to electronic reference information, wherein said portion is designated by a predetermined attribute of the received document image;

means for electronically scanning and performing pattern matching on the electronic graphical representation of the document image to locate said predetermined attribute of the document image;

means for identifying the linked portion of the document based on the location of said predetermined attribute;

means for acquiring the electronic reference information associated with the linked portion;

means for correlating the linked portion of the document with the associated electronic reference information; and means for providing a pointer from the linked portion in the document to each piece of electronic reference information associated therewith.

2. An apparatus as in claim 1 wherein said means for electronically scanning the electronic graphical representation of the document image comprises means for locating identifiers graphically added to the document image.

3. An apparatus as in claim 2 wherein the document comprises a paper document.

4. An apparatus as in claim 2 wherein the added identifiers are manually inscribed.

5. An apparatus as in claim 2 wherein the added identifiers are mechanically imprinted.

6. An apparatus as in claim 1 wherein said acquiring means comprises means for acquiring audio information.

7. An apparatus as in claim 1 wherein said receiving means comprises means for receiving a document image transmitted over telephone lines.

8. An apparatus as in claim 1 wherein said receiving means comprise means for receiving a document using a first communications method and said acquiring means comprise means for acquiring the reference information using a second communications method.

9. An apparatus as in claim 8 wherein said acquiring means comprises means for acquiring the electronic reference information using voice-channel telephony.

10. An apparatus as in claim 1 wherein said receiving means comprises means for receiving a document transmitted according to a conventional facsimile protocol.

11. A method for linking a document with reference information associated therewith comprising:

receiving an electronic graphical representation of a document image, said document having a portion to be linked to electronic reference information, wherein said portion is designated by a predetermined attribute of the received document image;

electronically scanning and performing pattern matching on the electronic graphical representation of the document image to locate said predetermined attribute of the document image;

identifying the linked portion of the document based on the location of said predetermined attribute;

acquiring the electronic reference information associated with the linked portion;

correlating the linked portion of the document with the associated electronic reference information; and providing a pointer from the linked portion in the document to each piece of electronic reference information associated therewith.

12. A method as in claim 1 wherein said scanning and pattern matching step comprises locating identifiers graphically added to the document image.

13. A method as in claim 12 wherein the document comprises a paper document.

14. A method as in claim 12 wherein the locating step comprises locating manually inscribed identifiers.

15. A method as in claim 12 wherein the locating step comprises locating mechanically imprinted identifiers.

16. A method as in claim 11 wherein said acquiring step comprises acquiring audio information.

17. A method as in claim 11 wherein the receiving step comprises receiving a document image transmitted over telephone lines.

18. A method as in claim 11 wherein the electronic reference information comprises audio information.

19. An apparatus for linking a document with associated reference information comprising:

means for receiving, in a first telecommunications session, an electronic graphical representation of a document image, said document having a portion to be linked with electronic reference information, wherein said portion is designated by markers added to the document image;

means for acquiring, in a second telecommunications session, electronic reference information associated with the linked portion of the document;

means for electronically scanning and performing pattern matching on the electronic graphical representation of the document image to determine the locations of the markers added to the document image;

means for identifying the linked portion in response to the locations of the markers;

means for correlating each linked portion of the document with the associated reference information;

means for providing a pointer from the linked portion of the document to each piece of electronic reference information associated therewith.

20. An apparatus as in claim 19 wherein the second telecommunications session comprises voice-channel telephony.

* * * * *